(12) United States Patent
Huang

(10) Patent No.: US 11,675,169 B2
(45) Date of Patent: Jun. 13, 2023

(54) IMAGE PICKING-UP SYSTEM, IMAGE CAPTURING APPARATUS AND ELECTRONIC DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 8 days.

(21) Appl. No.: 17/536,182

(22) Filed: Nov. 29, 2021

(65) Prior Publication Data
US 2022/0082804 A1 Mar. 17, 2022

Related U.S. Application Data

(63) Continuation of application No. 16/666,513, filed on Oct. 29, 2019, now Pat. No. 11,215,797, which is a continuation of application No. 15/642,447, filed on Jul. 6, 2017, now Pat. No. 10,502,931.

(30) Foreign Application Priority Data

Jan. 4, 2017 (TW) ................. 106100190

(51) Int. Cl.
*G02B 13/00* (2006.01)
*G02B 9/64* (2006.01)
*H04N 23/54* (2023.01)

(52) U.S. Cl.
CPC .......... *G02B 13/0045* (2013.01); *G02B 9/64* (2013.01); *H04N 23/54* (2023.01)

(58) Field of Classification Search
CPC ....... G02B 13/0045; G02B 9/64; H04N 23/54
USPC ....................... 359/713, 751, 755
See application file for complete search history.

(56) References Cited

U.S. PATENT DOCUMENTS

| 4,976,525 | A | 12/1990 | Matsumura et al. |
| 5,371,628 | A | 12/1994 | Shimoda et al. |
| 6,862,408 | B2 | 3/2005 | Watanabe |
| 8,780,464 | B2 | 7/2014 | Huang |
| 9,753,258 | B2 | 9/2017 | Hashimoto |
| 9,835,831 | B2 | 12/2017 | Tang et al. |
| 10,114,197 | B2 | 10/2018 | Kubota et al. |
| 10,247,913 | B2 | 4/2019 | Tang et al. |

(Continued)

FOREIGN PATENT DOCUMENTS

| CN | 101408664 A | 4/2009 |
| CN | 204065539 U | 12/2014 |

(Continued)

*Primary Examiner* — William Choi
(74) *Attorney, Agent, or Firm* — McClure, Qualey & Rodack, LLP

(57) ABSTRACT

An image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element. The third lens element has positive refractive power. The fourth lens element has an image-side surface being concave in a paraxial region thereof. At least one surface of object-side surfaces and image-side surfaces of the seven lens elements includes at least one inflection point.

22 Claims, 33 Drawing Sheets

(56) References Cited

U.S. PATENT DOCUMENTS

| | | |
|---|---|---|
| 2015/0043091 A1 | 2/2015 | Bone et al. |
| 2016/0109687 A1 | 4/2016 | Son |
| 2016/0170180 A1 | 6/2016 | Son |
| 2016/0202452 A1 | 7/2016 | Kuo et al. |
| 2016/0223790 A1 | 8/2016 | Liao et al. |
| 2016/0377839 A1 | 12/2016 | Chen et al. |
| 2017/0082834 A1 | 3/2017 | Tang et al. |
| 2017/0082835 A1 | 3/2017 | Tang et al. |
| 2017/0090157 A1 | 3/2017 | Tang et al. |
| 2017/0090158 A1 | 3/2017 | Tang et al. |
| 2017/0108662 A1 | 4/2017 | Lee |
| 2017/0168267 A1 | 6/2017 | Tang et al. |
| 2017/0168268 A1 | 6/2017 | Tang et al. |
| 2017/0184819 A1 | 6/2017 | Shi |
| 2017/0184820 A1 | 6/2017 | Shi |
| 2017/0336605 A1 | 11/2017 | Lai et al. |
| 2017/0336606 A1 | 11/2017 | Lai et al. |
| 2017/0357081 A1* | 12/2017 | Dai .................... G02B 9/64 |
| 2018/0164553 A1 | 6/2018 | Son |
| 2018/0196235 A1 | 7/2018 | Chang et al. |
| 2018/0314036 A1 | 11/2018 | Li |

FOREIGN PATENT DOCUMENTS

| | | |
|---|---|---|
| CN | 105388592 A | 3/2016 |
| CN | 205091499 U | 3/2016 |
| CN | 105676422 A | 6/2016 |
| CN | 106556913 A | 4/2017 |
| CN | 106556914 A | 4/2017 |
| JP | H04218012 A | 8/1992 |
| JP | H07-218834 A | 8/1995 |
| JP | H10-115778 A | 5/1998 |
| JP | H11-305117 A | 11/1999 |
| JP | 2003-177316 A | 6/2003 |
| JP | 2015072403 A | 4/2015 |
| JP | 2015-158587 A | 9/2015 |
| JP | 2016065954 A | 4/2016 |
| JP | 2016188895 A | 11/2016 |
| WO | 2018045607 A1 | 3/2018 |

* cited by examiner

IMAGE PICKING-UP SYSTEM, IMAGE CAPTURING APPARATUS AND ELECTRONIC DEVICE

RELATED APPLICATIONS

The present application is a continuation of the application Ser. No. 16/666,513, filed Oct. 29, 2019, which is a continuation of the application Ser. No. 15/642,447, filed Jul. 6, 2017, U.S. Pat. No. 10,502,931 issued on Dec. 10, 2019, and claims priority to Taiwan application serial number 106100190, filed Jan. 4, 2017, the entire contents of which are hereby incorporated herein by reference.

BACKGROUND

Technical Field

The present disclosure relates to an image picking-up system and an image capturing apparatus. More particularly, the present disclosure relates to a compact image picking-up system and an image capturing apparatus which are applicable to electronic devices.

Description of Related Art

With the usage of the image capturing apparatus in different applications expanding, having these applications in various smart electronic devices, on-board devices, identification systems, entertainment devices, sports devices and smart home systems becomes a trend of the technology development in the future, particularly portable electronic devices which the market demands. In order to satisfy common users' various experiences, the smart electronic devices equipped with one, two, or even more than three image capturing apparatuses gradually become the mainstream in the market, so that the image picking-up system with various features has been developed based on the different requirements.

The image picking-up system in the conventional image capturing apparatus featured with high quality is often equipped with glass lens elements being spherical, thus these lens elements thereof being overly large for receiving light lead to difficulties in size reduction of the image capturing apparatus to achieve lens compactness, and the electronic device is in term becoming unfavorably large and thick. Accordingly, the conventional image picking-up systems have deviated from the trends of the current technology development.

SUMMARY

According to one aspect of the present disclosure, an image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element. The third lens element has positive refractive power. The fourth lens element has an image-side surface being concave in a paraxial region thereof. At least one surface of object-side surfaces and image-side surfaces of the seven lens elements includes at least one inflection point. When a focal length of the image picking-up system is f, a focal length of the first lens element is f1, a focal length of the second lens element is f2, a focal length of the third lens element is f3, an axial distance between the first lens element and the second lens element is T12, and a minimum among central thicknesses of all the lens elements of the image picking-up system is CTmin, the following conditions are satisfied:

$$|f/f1|+|f/f2|<0.35;$$

$$0.50<f/f3<4.50; \text{ and}$$

$$T12/CTmin<4.50.$$

According to another aspect of the present disclosure, an image capturing apparatus includes the image picking-up system according to the aforementioned aspect and an image sensor, wherein the image sensor is disposed on an image surface of the image picking-up system.

According to another aspect of the present disclosure, an electronic device includes the image capturing apparatus according to the foregoing aspect.

According to another aspect of the present disclosure, an image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element. The second lens element has an object-side surface being convex in a paraxial region thereof. The third lens element has positive refractive power. At least one surface of object-side surfaces and image-side surfaces of the seven lens elements includes at least one inflection point. When a focal length of the image picking-up system is f, a focal length of the first lens element is f1, a focal length of the second lens element is f2, a focal length of the third lens element is f3, an axial distance between the first lens element and the second lens element is T12, an axial distance between the second lens element and the third lens element is T23, an axial distance between the third lens element and the fourth lens element is T34, and a minimum among central thicknesses of all the lens elements of the image picking-up system is CTmin, the following conditions are satisfied:

$$|f/f1|+f/f2<0.50;$$

$$0.50<f/f3<4.50; \text{ and}$$

$$(T12+T23+T34)/CTmin<5.50.$$

According to another aspect of the present disclosure, an image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element. The second lens element has an object-side surface being convex in a paraxial region thereof. The third lens element has positive refractive power. At least one surface of object-side surfaces and image-side surfaces of the seven lens elements includes at least one inflection point. When a focal length of the image picking-up system is f, a focal length of the first lens element is f1, a focal length of the second lens element is f2, a focal length of the third lens element is f3, a maximum among axial distances between every two of the lens elements that are adjacent to each other is ATmax, and a minimum among central thicknesses of all the lens elements of the image picking-up system is CTmin, the following conditions are satisfied:

$$|f/f1|+f/f2<0.50;$$

$$0.50<f/f3<4.50; \text{ and}$$

$$0<ATmax/CTmin<7.50.$$

According to another aspect of the present disclosure, an image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element. The third lens element has positive refractive power. The fourth lens element has negative refractive power. At least one surface of object-side surfaces and image-side surfaces of the seven lens elements includes at least one inflection point. When a focal length of the image picking-up system is f, a focal length of the first lens element is f1, a focal length of the second lens element is f2, a focal length of the third lens element is f3, a focal length of the fourth lens element is f4, and a focal length of the fifth lens element is f5, the following conditions are satisfied:

$$|f/f1|+|f/f2|<0.50;$$

$$0.50<f/f3<4.50;$$

$$-2.80<f/f4<-0.40; \text{ and}$$

$$-2.50<f/f5<0.70.$$

DETAILED DESCRIPTION

Figure 1:
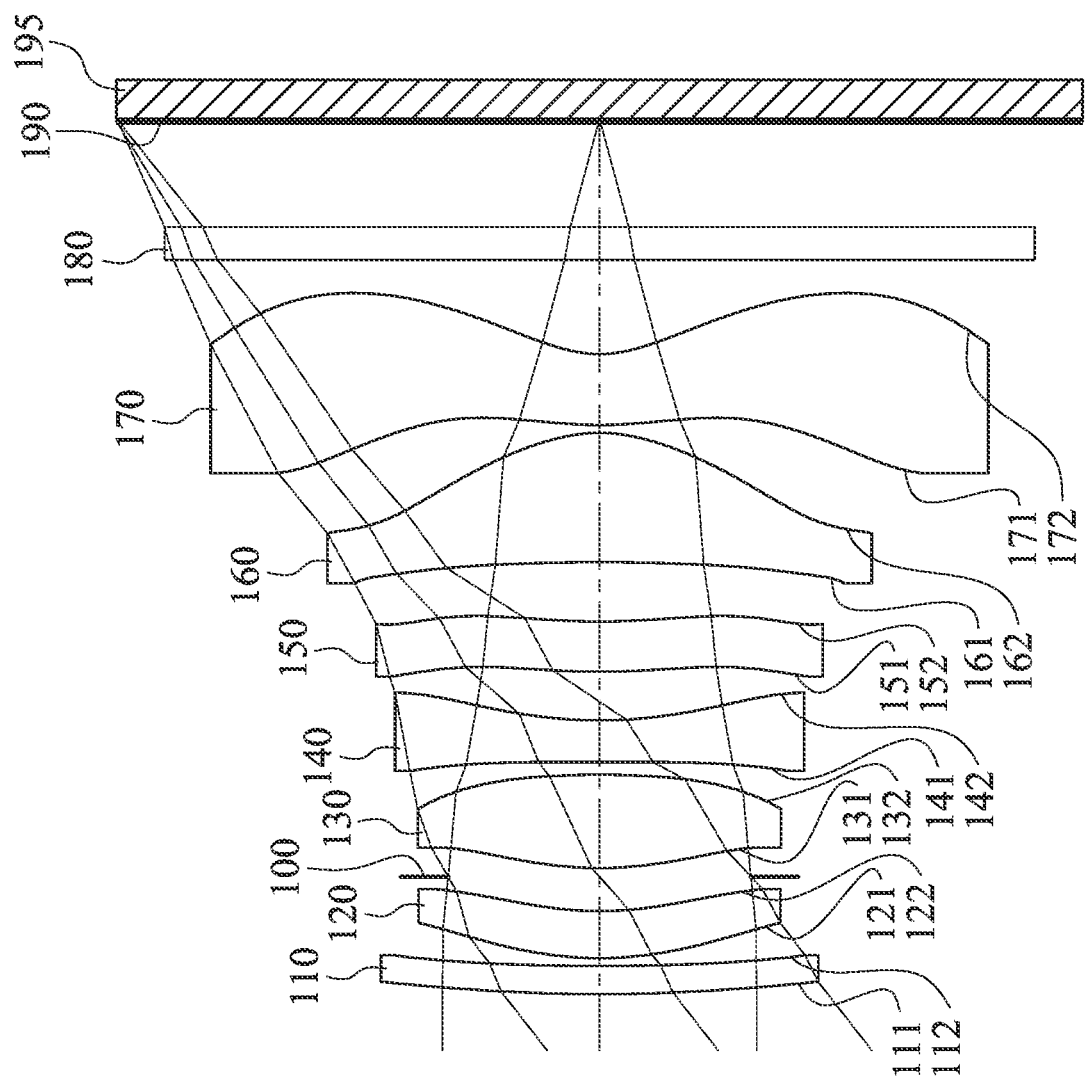
FIG. 1 is a schematic view of an image capturing apparatus according to the 1st embodiment of the present disclosure.

An image picking-up system includes seven lens elements, which are, in order from an object side to an image side, a first lens group including a first lens element and a second lens element, a second lens group including a third lens element and a fourth lens element, and a third lens group including a fifth lens element, a sixth lens element and a seventh lens element.

At least one surface of object-side surfaces and image-side surfaces of the seven lens elements includes at least one inflection point. Therefore, it is favorable for correcting off-axial aberrations and Petzval field curvature of the image picking-up system effectively.

At least one of an object-side surface and an image-side surface of the first lens element can include at least one inflection point. Therefore, it is favorable for effectively reducing the space proportion occupied by the first lens element, so that the image picking-up system can be prevented from being excessively large, and can be further applied in electronic devices with a thin form factor.

The second lens element can have an object-side surface being convex in a paraxial region thereof. Therefore, it is favorable for balancing aberrations of the image picking-up system so as to enhance the image quality and provide a clear image. The second lens element can have an image-side surface being concave in a paraxial region thereof. Therefore, it is favorable for correcting aberrations, such as astigmatism.

The third lens element has positive refractive power. Therefore, it is favorable for providing the main portion of light convergence of the image picking-up system by the third lens element, so as to effectively control the total track length thereof and achieve the compact size of the image capturing apparatus. The third lens element can have an object-side surface being convex in a paraxial region thereof. Therefore, it is favorable for enhancing the symmetry of the image picking-up system so as to avoid excessive aberrations.

The fourth lens element can have negative refractive power. Therefore, it is favorable for balancing positive refractive power of the third lens element while correcting chromatic aberration of the image picking-up system. The fourth lens element can have an image-side surface being concave in a paraxial region thereof. Therefore, it is favorable for providing the main portion of light divergence of the image picking-up system so as to balance aberrations generated while reducing the total track length.

The sixth lens element can have positive refractive power. Therefore, it is favorable for enhancing the light converging ability of the image side of the image picking-up system so as to enlarge the field of view and thereby be applicable to various electronic devices. The sixth lens element can have an image-side surface being convex in a paraxial region thereof, so that the light converging ability of the third lens element can be effectively distributed to avoid a single lens element with excessively large surface curvature, which would reduce the manufacturability.

The seventh lens element can have negative refractive power. Therefore, it is favorable for the principal point being positioned towards the object side so as to control the total track length of the image picking-up system and thereby avoid the image capturing apparatus being excessively large. The seventh lens element can have an object-side surface being convex in a paraxial region thereof and an image-side surface being concave in a paraxial region thereof. Therefore, it is favorable for correcting coma, field curvature and distortion so as to reduce the deformation of the image periphery, while effectively controlling the back focal length of the image picking-up system and maintaining the compact size thereof. Furthermore, the image-side surface of the seventh lens element can include at least one convex shape in an off-axial region thereof. Therefore, it is favorable for the image-side surface of the seventh lens element to avoid the total reflection resulted from the incident angle in the off-axial region thereof being too large, so as to reduce the unwanted light spots in the image.

At least one surface of object-side surfaces and image-side surfaces of the sixth lens element and the seventh lens element can include at least one inflection point. Therefore, it is favorable for reducing the distortion so as to correct off-axial aberrations of the image picking-up system.

Object-side surfaces and image-side surfaces of at least five of the seven lens elements can be aspheric. Therefore, it is favorable for correcting aberrations of the image picking-up system and reducing the total track length thereof so as to be applicable to the electronic devices with a thin form factor.

The image picking-up system can further include an aperture stop disposed in an object side of the fourth lens element. Therefore, it is favorable for enhancing the symmetry of the image picking-up system so as to prevent excessive aberrations.

When a focal length of the image picking-up system is f, a focal length of the first lens element is f1, and a focal length of the second lens element is f2, the following condition is satisfied: $|f/f1|+|f/f2|<0.50$. Therefore, it is favorable for effectively controlling the variation of refractive power on the object side of the image picking-up system, so that the first lens element and the second lens element can act as correction lenses to enhance the aberrations correction on the object side. Preferably, the following condition is satisfied: $|f/f1|+|f/f2|<0.35$.

When the focal length of the image picking-up system is f, and a focal length of the third lens element is f3, the following condition is satisfied: $0.50<f/f3<4.50$. Therefore, it is favorable for providing the main converging power of the image picking-up system by the third lens element, so as to effectively control the total track length thereof and satisfy the requirements of compact electronic devices. Preferably, the following condition is satisfied: $0.70<f/f3<2.50$.

When an axial distance between the first lens element and the second lens element is T12, and a minimum among central thicknesses of all the lens elements of the image picking-up system is CTmin, the following condition is satisfied: $T12/CTmin<4.50$. Therefore, it is favorable for avoiding an overly wide gap between the first lens element and the second lens element and thereby reducing the need for a large effective radius of the first lens element, which provides a suitable size of the aperture of the electronic device, while avoiding the lens element being too thin to improve the lens molding and the manufacturing yield rate. Preferably, the following condition is satisfied: $T12/CTmin<2.50$.

When the axial distance between the first lens element and the second lens element is T12, an axial distance between the second lens element and the third lens element is T23, an axial distance between the third lens element and the fourth lens element is T34, and the minimum among the central thicknesses of all the lens elements of the image picking-up system is CTmin, the following condition is satisfied: (T12+

T23+T34)/CTmin<5.50. Therefore, it is favorable for effectively controlling the spatial configuration of the image picking-up system while enhancing the correction of off-axial aberrations and avoiding blurs around the image. Preferably, the following condition is satisfied: 0.60<(T12+T23+T34)/CTmin<3.80.

When a maximum among axial distances between every two of the lens elements that are adjacent to each other is ATmax, and the minimum among the central thicknesses of all the lens elements of the image picking-up system is CTmin, the following condition is satisfied: 0<ATmax/CTmin<7.50. Therefore, it is favorable for effectively balancing the spatial configuration of the image picking-up system to achieve a better space utilization. Preferably, the following condition is satisfied: 0.40<ATmax/CTmin<5.50.

When the focal length of the image picking-up system is f, and a focal length of the fourth lens element is f4, the following condition is satisfied: −2.80<f/f4<−0.40. Therefore, it is favorable for the fourth lens element to provide proper light divergence so as to balance aberrations caused by the light convergence of the third lens element.

When the focal length of the image picking-up system is f, and a focal length of the fifth lens element is f5, the following condition is satisfied: −2.50<f/f5<0.70. Therefore, it is favorable for preventing the refractive power of the fifth lens element being too large, which would result in excessive aberrations. Preferably, the following condition is satisfied: −1.0<f/f5<0.40.

When a maximum among the central thicknesses of all the lens elements of the image picking-up system is CTmax, and a vertical distance between a critical point in the off-axial region on the image-side surface of the seventh lens element and an optical axis is Yc72, the following condition is satisfied: 0.20<CTmax/Yc72<4.0. Therefore, it is favorable for controlling the incident angle of the peripheral field and correcting off-axial aberrations, while providing proper lens thicknesses of the image picking-up system for satisfying the requirements of compact electronic devices.

When an axial distance between the object-side surface of the first lens element and an image surface is TL, and a maximum image height of the image picking-up system is ImgH, the following condition is satisfied: TL/ImgH<3.50. Therefore, it is favorable for achieving the compact size of the image picking-up system while having enough light receiving range, so as to increase the image brightness and enhance the image quality. Preferably, the following condition is satisfied: 1.0<TL/ImgH<2.50.

When a sum of the axial distances between every two of the lens elements that are adjacent to each other of the image picking-up system is ΣAT, and a sum of the central thicknesses of all the lens elements of the image picking-up system is ΣCT, the following condition is satisfied: ΣAT/ΣCT<0.75. Therefore, it is favorable for increasing the spatial configuration efficiency of the image picking-up system, so as to balance the assembling yield rate and the size requirements, and thereby achieve a better design of the image capturing apparatus.

When a composite focal length of the first lens group is fG1, and a composite focal length of the second lens group is fG2, the following condition is satisfied: −0.30<fG2/fG1<0.40. Therefore, it is favorable for balancing refractive power configuration of the image picking-up system, so as to enhance the control for the middle section of the optical path thereof and the aberrations correction ability on the object side thereof.

When a half of a maximum field of view of the image picking-up system is HFOV, the following condition is satisfied: 0.20<tan(HFOV)<1.50. Therefore, it is favorable for effectively controlling the photographing range of the image picking-up system so as to satisfy the requirement of a wider usage.

When an f-number of the image picking-up system is Fno, the following condition is satisfied: 1.20<Fno<2.60. Therefore, it is favorable for controlling the incident light range so as to ensure enough light on an image sensor and avoid insufficient image brightness. Preferably, the following condition is satisfied: 1.35<Fno<2.40.

When a curvature radius of the image-side surface of the second lens element is R4, and a curvature radius of the object-side surface of the third lens element is R5, the following condition is satisfied: −2.0<R4/R5<5.0. Therefore, it is favorable for controlling the angles of the incident light and the refracted light on the lens surfaces not to be excessively large by adjusting the surface shapes of the second lens element and the third lens element, so as to reduce the stray light. Preferably, the following condition is satisfied: −1.0<R4/R5<3.0. More preferably, the following condition is satisfied: 0<R4/R5<2.5. Even more preferably, the following condition is satisfied: 0.40<R4/R5<2.0.

When the axial distance between the object-side surface of the first lens element and the image surface is TL, and the focal length of the image picking-up system is f, the following condition is satisfied: 0.80<TL/f<2.50. Therefore, it is favorable for providing the specification of the image picking-up system being applicable to the various electronic devices and thereby satisfying current market demands.

When an Abbe number of the third lens element is V3, and an Abbe number of the fourth lens element is V4, the following condition is satisfied: 1.50<V3/V4<3.50. Therefore, it is favorable for correcting chromatic aberration of the image picking-up system so as to avoid image overlaps captured by the electronic device due to the imaging position shift of different colors.

When the focal length of the image picking-up system is f, and the focal length of the second lens element is f2, the following condition is satisfied: −0.20<f/f2<0.50. Therefore, it is favorable for reducing refractive power of the second lens element so as to enhance the aberrations correction ability thereof.

When an axial distance between the image-side surface of the seventh lens element and the image surface is BL, and the axial distance between the object-side surface of the first lens element and the image surface is TL, the following condition is satisfied: 0.10<BL/TL<0.35. Therefore, it is favorable for controlling the spatial configuration of the image picking-up system, so as to avoid an overly large image capturing apparatus resulted from the back focal length being too long, or have difficulties in inserting additional optical elements among the lens elements resulted from the back focal length being too short.

When the focal length of the fourth lens element is f4, and the focal length of the fifth lens element is f5, the following condition is satisfied: |f4/f5|<2.0. Therefore, it is favorable for adjusting refractive power distribution between the fourth lens element and the fifth lens element which become complementary to each other and thereby enhancing image quality. Preferably, the following condition is satisfied: |f4/f5|<1.0.

When the axial distance between the object-side surface of the first lens element and the image surface is TL, and an entrance pupil diameter of the image picking-up system is EPD, the following condition is satisfied: 1.0<TL/EPD<4.5. Therefore, it is favorable for effectively control the amount of incident light, so that the image can be provided with sufficient brightness while having the proper total track length of the image capturing apparatus. Preferably, the following condition is satisfied: $1.40<TL/EPD<3.80$.

When an axial distance between the aperture stop and the image-side surface of the seventh lens element is SD, and an axial distance between the object-side surface of the first lens element and the image-side surface of the seventh lens element is TD, the following condition is satisfied: $0.50<SD/TD<1.20$. Therefore, it is favorable for effectively balancing the field of view and the total track length by allocation of the aperture stop, for the compact size of the image capturing apparatus as well as improved practicality.

When the focal length of the third lens element is f3, and a focal length of the seventh lens element is f7, the following condition is satisfied: $-3.0<f3/f7<1.0$. Therefore, it is favorable for balancing the refractive power configuration between the object side and the image side while ensuring the third lens element with sufficient converging power so as to achieve a proper specification of the image picking-up system. Preferably, the following condition is satisfied: $-2.0<f3/f7<0.40$.

When the maximum among the axial distances between every two of the lens elements that are adjacent to each other is ATmax, and the maximum among the central thicknesses of all the lens elements of the image picking-up system is CTmax, the following condition is satisfied: $0.10<ATmax/CTmax<1.0$. Therefore, it is favorable for avoiding poor yield rates in the lens molding and the lens assembling of the image picking-up system due to the lens elements being too thin or the axial distances between each of the lens elements being too small, as well as the difficulties in size reduction of the image capturing apparatus due to the lens elements being too thick or the axial distances between each of the lens elements being too large.

When a number of the lens elements of the image picking-up system having an Abbe number smaller than 30 is Nv30, the following condition is satisfied: $2 \leq Nv30$. Therefore, it is favorable for correcting chromatic aberration so as to satisfy higher demands in image quality.

When a vertical distance between a maximum effective radius position of the object-side surface of the first lens element and the optical axis is Y11, and a vertical distance between a maximum effective radius position of the image-side surface of the seventh lens element and the optical axis is Y72, the following condition is satisfied: $0.25<Y11/Y72<1.30$. Therefore, it is favorable for balancing the differences in size of the lens elements between the object side and the image side of the image picking-up system, so as to avoid the size increase of the image picking-up system resulted from the overly large lens elements of the object side, and the reduction in the field of view resulted from the lens elements of the object side being overly small.

When a curvature radius of the object-side surface of the seventh lens element is R13, and a curvature radius of the image-side surface of the seventh lens element is R14, the following condition is satisfied: $0<(R13+R14)/(R13-R14)<10.0$. Therefore, it is favorable for effectively controlling the surface shapes and curvature of the seventh lens element so as to correct aberrations around the image.

When a central thickness of the first lens element is CT1, and a central thickness of the sixth lens element is CT6, the following condition is satisfied: $0<CT1/CT6<1.0$. Therefore, it is favorable for balancing the thickness arrangement for the first lens element and the sixth lens element so as to improve stability in lens assembling of the image picking-up system.

When a maximum among refractive indices of all the lens elements of the image picking-up system is Nmax, the following condition is satisfied: $1.60<Nmax<1.72$. Therefore, it is favorable for balancing aberrations of the image picking-up system with higher flexibility to optimize the surface shapes thereof.

When a curvature radius of the object-side surface of the second lens element is R3, and the curvature radius of the object-side surface of the third lens element is R5, the following condition is satisfied: $-3.50<(R3-R5)/(R3+R5)<2.50$. Therefore, it is favorable for controlling the curvature configuration of the object-side surface of the second lens element and the object-side surface of the third lens element, so as to balance the lens shape distribution and thereby enhance the image quality. Preferably, the following condition is satisfied: $-2.0<(R3-R5)(R3+R5)<2.0$.

According to the image picking-up system of the present disclosure, the lens elements thereof can be made of plastic or glass materials. When the lens elements are made of plastic materials, the manufacturing cost can be effectively reduced. When the lens elements are made of glass materials, the arrangement of the refractive power of the image picking-up system may be more flexible to design. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the image picking-up system can also be reduced.

According to the image picking-up system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the image picking-up system of the present disclosure, the refractive power or the focal length of a lens element being positive or negative may refer to the refractive power or the focal length in a paraxial region of the lens element.

According to the image picking-up system of the present disclosure, a critical point is a non-axial point of the lens surface where its tangent is perpendicular to the optical axis.

According to the image picking-up system of the present disclosure, the image picking-up system can include at least one stop, such as an aperture stop, a glare stop or a field stop. The glare stop or the field stop is for eliminating the stray light and thereby improving the image resolution thereof.

According to the image picking-up system of the present disclosure, the image surface, depending on the corresponding image sensor, can be a planar surface or a curved surface with any curvature, particularly a curved surface being concave toward the object side.

According to the image picking-up system of the present disclosure, an aperture stop can be configured as a front stop or a middle stop. A front stop disposed between an imaged object and the first lens element can provide a longer distance between an exit pupil of the image picking-up system and the image surface to enable a telecentric effect, and thereby can improve the image-sensing efficiency of an image sensor. A middle stop disposed between the first lens element and the image surface is favorable for enlarging the field of view of the image picking-up system and thereby provides a wider field of view for the same.

According to the image picking-up system of the present disclosure, the image picking-up system can be optionally applied to moving focus optical systems. Furthermore, the image picking-up system is featured with good correction ability and high image quality, and can be applied to 3D (three-dimensional) image capturing applications, in products such as digital cameras, mobile devices, digital tablets, smart TVs, network monitoring devices, motion sensing input devices, driving recorders, rear view camera systems, extreme sports cameras, industrial robots, wearable devices and other electronic imaging products.

According to the present disclosure, an image capturing apparatus is provided. The image capturing apparatus includes the aforementioned image picking-up system according to the present disclosure and an image sensor, wherein the image sensor is disposed on or near the image surface of the aforementioned image picking-up system. Therefore, it is favorable for providing the main ability of light convergence of the image picking-up system by the third lens element, so as to effectively control the total track length thereof and achieve the compact size of the image capturing apparatus.

Furthermore, it is favorable for effectively controlling the strength changes of refractive power on the object side of the image picking-up system, so that the first lens element and the second lens element can act as the correction lenses to enhance the aberrations correction ability of the object side. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for simultaneously satisfying the requirement of compact size and enhancing the image quality. Preferably, the electronic device can further include but not limited to a control unit, a display, a storage unit, a random access memory unit (RAM) or a combination thereof.

According to the above description of the present disclosure, the following 1st-16th specific embodiments are provided for further explanation.

1st Embodiment

Figure 2:
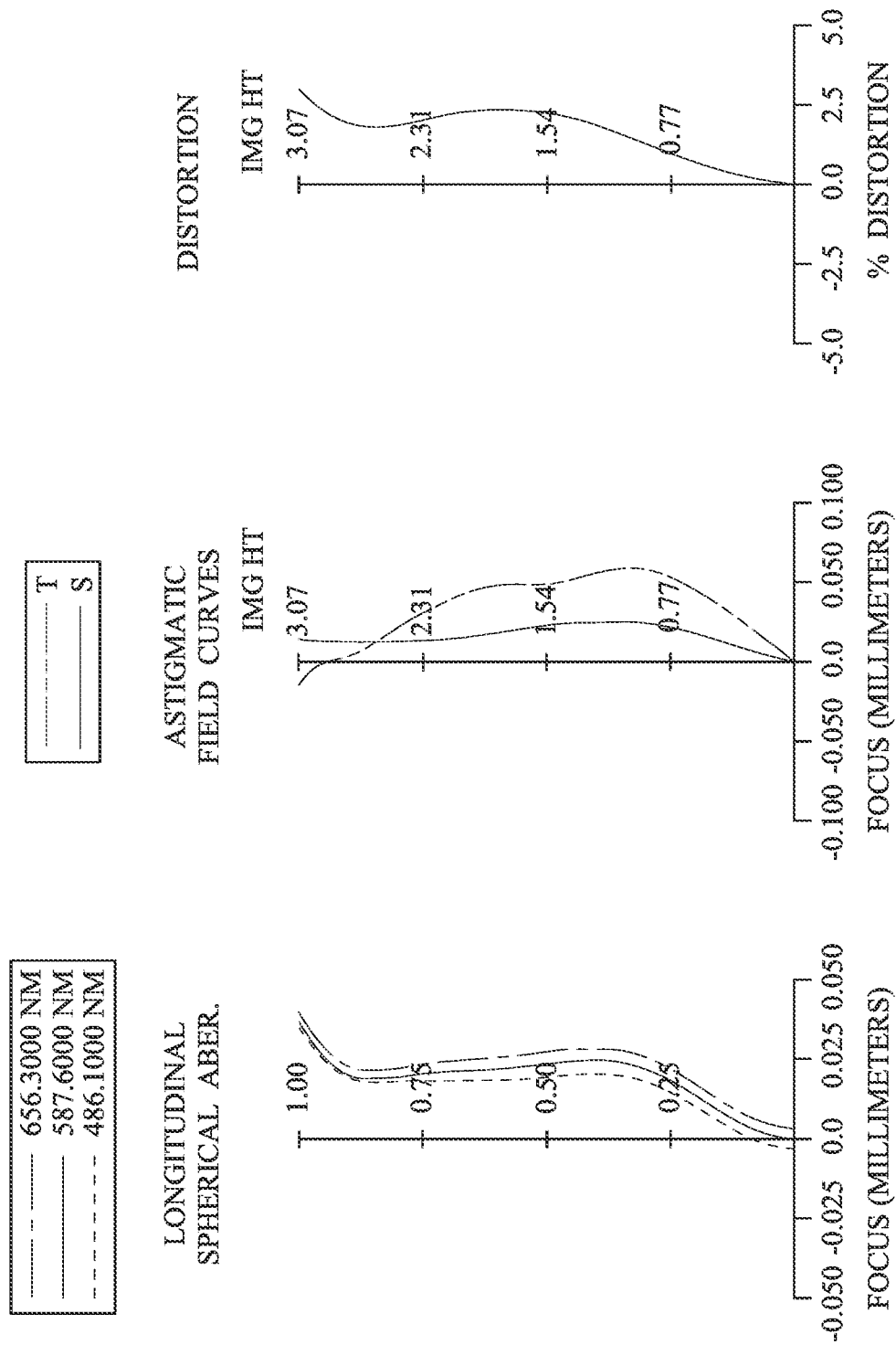
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to FIG. 1. In FIG. 1, the image capturing apparatus includes the image picking-up system (its reference numeral is omitted) and an image sensor 195. The image picking-up system includes, in order from an object side to an image side, a first lens element 110, a second lens element 120, an aperture stop 100, a third lens element 130, a fourth lens element 140, a fifth lens element 150, a sixth lens element 160, a seventh lens element 170, an IR-cut filter 180 and an image surface 190. The image sensor 195 is disposed on the image surface 190 of the image picking-up system. The image picking-up system includes a first lens group (its reference numeral is omitted), a second lens group (its reference numeral is omitted) and a third lens group (its reference numeral is omitted), wherein the first lens group includes the first lens element 110 and the second lens element 120, the second lens group includes the third lens element 130 and the fourth lens element 140, and the third lens group includes the fifth lens element 150, the sixth lens element 160 and the seventh lens element 170. The image picking-up system includes seven lens elements (110, 120, 130, 140, 150, 160 and 170) without additional one or more lens elements inserted between the first lens element 110 and the seventh lens element 170.

The first lens element 110 with positive refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric.

The second lens element 120 with positive refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being concave in a paraxial region thereof. The fourth lens element 140 is made of a plastic material, and has the object-side surface 141 and the image-side surface 142 being both aspheric.

The fifth lens element 150 with negative refractive power has an object-side surface 151 being convex in a paraxial region thereof and an image-side surface 152 being concave in a paraxial region thereof. The fifth lens element 150 is made of a plastic material, and has the object-side surface 151 and the image-side surface 152 being both aspheric.

The sixth lens element 160 with positive refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric.

The seventh lens element 170 with negative refractive power has an object-side surface 171 being convex in a paraxial region thereof and an image-side surface 172 being concave in a paraxial region thereof. The seventh lens element 170 is made of a plastic material, and has the object-side surface 171 and the image-side surface 172 being both aspheric. Furthermore, the image-side surface 172 of the seventh lens element 170 includes at least one convex shape in an off-axial region thereof.

The IR-cut filter 180 is made of a glass material and located between the seventh lens element 170 and the image surface 190, and will not affect the focal length of the image picking-up system.

The equation of the aspheric surface profiles of the aforementioned lens elements of the 1st embodiment is expressed as follows:

$$X(Y) = (Y^i/R)/\left(1 + \mathrm{sqrt}\left(1 - (1+k) \times (Y/R)^2\right)\right) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image picking-up system according to the 1st embodiment, when a focal length of the image picking-up system is f, an f-number of the image picking-up system is Fno, and half of a maximum field of view of the image picking-up system is HFOV, these parameters have the following values: f=3.81 mm; Fno=1.90; and HFOV=38.0 degrees.

In the image picking-up system according to the 1st embodiment, when a maximum among refractive indices of all the lens elements of the image picking-up system is Nmax (the seven lens elements in the 1st embodiment are the first lens element 110, the second lens element 120, the third lens element 130, the fourth lens element 140, the fifth lens element 150, the sixth lens element 160 and the seventh lens element 170, wherein the maximum among refractive indices of the seven lens elements is a refractive index of the fifth lens element 150), the following condition is satisfied: Nmax=1.660.

In the image picking-up system according to the 1st embodiment, when an Abbe number of the third lens element 130 is V3, and an Abbe number of the fourth lens element 140 is V4, the following condition is satisfied: V3N4=2.38.

In the image picking-up system according to the 1st embodiment, when a central thickness of the first lens element 110 is CT1, and a central thickness of the sixth lens element 160 is CT6, the following condition is satisfied: CT1/CT6=0.22.

In the image picking-up system according to the 1st embodiment, when an axial distance between the first lens element 110 and the second lens element 120 is T12, and a minimum among central thicknesses of all the lens elements of the image picking-up system is CTmin (in the 1st embodiment, the central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, the central thickness of the sixth lens element 160 is CT6, and a central thickness of the seventh lens element 170 is CT7, wherein the minimum among the central thicknesses is CT1, and thereby CTmin=CT1), the following condition is satisfied: T12/CTmin=0.28.

In the image picking-up system according to the 1st embodiment, when the axial distance between the first lens element 110 and the second lens element 120 is T12, an axial distance between the second lens element 120 and the third lens element 130 is T23, an axial distance between the third lens element 130 and the fourth lens element 140 is T34, and the minimum among the central thicknesses of all the lens elements of the image picking-up system is CTmin, the following condition is satisfied: (T12+T23+T34)/CTmin=2.25.

In the image picking-up system according to the 1st embodiment, when a maximum among axial distances between every two of the lens elements that are adjacent to each other is ATmax (in the 1st embodiment, the axial distance between the first lens element 110 and the second lens element 120 is T12, the axial distance between the second lens element 120 and the third lens element 130 is T23, the axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and an axial distance between the sixth lens element 160 and the seventh lens element 170 is T67, wherein the maximum among the axial distances is T56, and thereby ATmax=T56), and the minimum among the central thicknesses of all the lens elements of the image picking-up system is CTmin, the following condition is satisfied: ATmax/CTmin=2.11.

In the image picking-up system according to the 1st embodiment, when the maximum among the axial distances between every two of the lens elements that are adjacent to each other is ATmax, and a maximum among the central thicknesses of all the lens elements of the image picking-up system is CTmax (in the 1st embodiment, the central thickness of the first lens element 110 is CT1, the central thickness of the second lens element 120 is CT2, the central thickness of the third lens element 130 is CT3, the central thickness of the fourth lens element 140 is CT4, the central thickness of the fifth lens element 150 is CT5, the central thickness of the sixth lens element 160 is CT6, and the central thickness of the seventh lens element 170 is CT7, wherein the maximum among the central thicknesses is CT6, and thereby CTmax=CT6), the following condition is satisfied: ATmax/CTmax=0.46.

Figure 25:
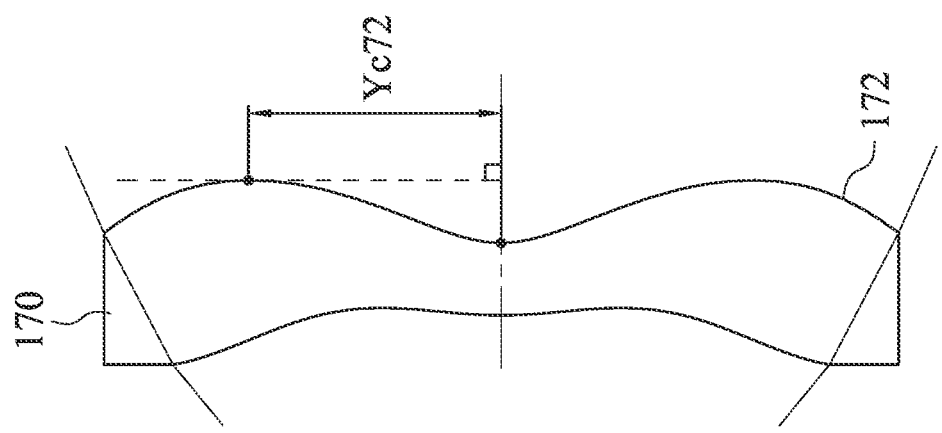
FIG. 25 shows a schematic view of the parameter Yc72 of the image picking-up system of the image capturing apparatus according to FIG. 1.

FIG. 25 shows a schematic view of the parameter Yc72 of the image picking-up system of the image capturing apparatus according to FIG. 1. In FIG. 25, when the maximum among the central thicknesses of all the lens elements of the image picking-up system is CTmax, and a vertical distance between a critical point in the off-axial region on the image-side surface 172 of the seventh lens element 170 and an optical axis is Yc72, the following condition is satisfied: CTmax/Yc72=0.52.

In the image picking-up system according to the 1st embodiment, when a sum of the axial distances between every two of the lens elements that are adjacent to each other of the image picking-up system is ΣAT (in the 1st embodiment, the axial distance between the first lens element 110 and the second lens element 120 is T12, the axial distance between the second lens element 120 and the third lens element 130 is T23, the axial distance between the third lens element 130 and the fourth lens element 140 is T34, the axial distance between the fourth lens element 140 and the fifth lens element 150 is T45, the axial distance between the fifth lens element 150 and the sixth lens element 160 is T56, and the axial distance between the sixth lens element 160 and the seventh lens element 170 is T67, wherein ΣAT=T12+T23+T34+T45+T56+T67), and a sum of the central thicknesses of all the lens elements of the image picking-up system is ΣCT (in the 1st embodiment, the central thickness of the first lens element 110 is CT1, the central thickness of the second lens element 120 is CT2, the central thickness of the third lens element 130 is CT3, the central thickness of the fourth lens element 140 is CT4, the central thickness of the fifth lens element 150 is CT5, the central thickness of the sixth lens element 160 is CT6, and the central thickness of the seventh lens element 170 is CT7, wherein ΣCT=CT1+CT2+CT3+CT4+CT5+CT6+CT7), the following condition is satisfied: ΣAT/ΣCT=0.39.

In the image picking-up system according to the 1st embodiment, when a curvature radius of the image-side surface 122 of the second lens element 120 is R4, and a curvature radius of the object-side surface 131 of the third lens element 130 is R5, the following condition is satisfied: R4/R5=0.91.

In the image picking-up system according to the 1st embodiment, when a curvature radius of the object-side surface 121 of the second lens element 120 is R3, and the curvature radius of the object-side surface 131 of the third lens element 130 is R5, the following condition is satisfied: (R3−R5)/(R3+R5)=−0.03.

In the image picking-up system according to the 1st embodiment, when a curvature radius of the object-side surface 171 of the seventh lens element 170 is R13, and a curvature radius of the image-side surface 172 of the seventh lens element 170 is R14, the following condition is satisfied: (R13+R14)/(R13−R14)=1.77.

In the image picking-up system according to the 1st embodiment, when the focal length of the image picking-up system is f, a focal length of the first lens element 110 is f1, a focal length of the second lens element 120 is f2, a focal length of the third lens element 130 is f3, a focal length of the fourth lens element 140 is f4, a focal length of the fifth lens element 150 is f5, and a focal length of the seventh lens element 170 is f7, the following conditions are satisfied: f/f2=0.015; f/f3=1.281; f/f4=−0.928; f/f5=−0.006; |f4/f5|=0.007; f3/f7=−1.467; and |f/f1|+|f/f2|=0.088.

In the image picking-up system according to the 1st embodiment, when a composite focal length of the first lens group is fG1 (i.e. a composite focal length of the first lens element 110 and the second lens element 120), and a composite focal length of the second lens group is fG2 (i.e. a composite focal length of the third lens element 130 and the fourth lens element 140), the following condition is satisfied: fG2/fG1=0.182.

Figure 26:
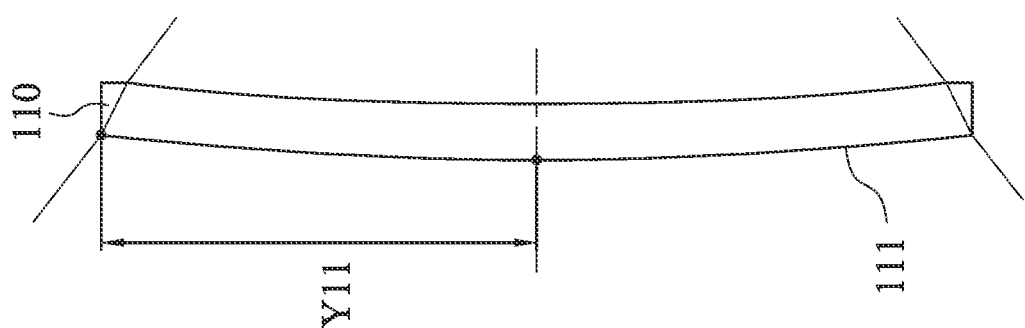
FIG. 26 shows a schematic view of the parameter Y11 of the image picking-up system of the image capturing apparatus according to FIG. 1.
Figure 27:
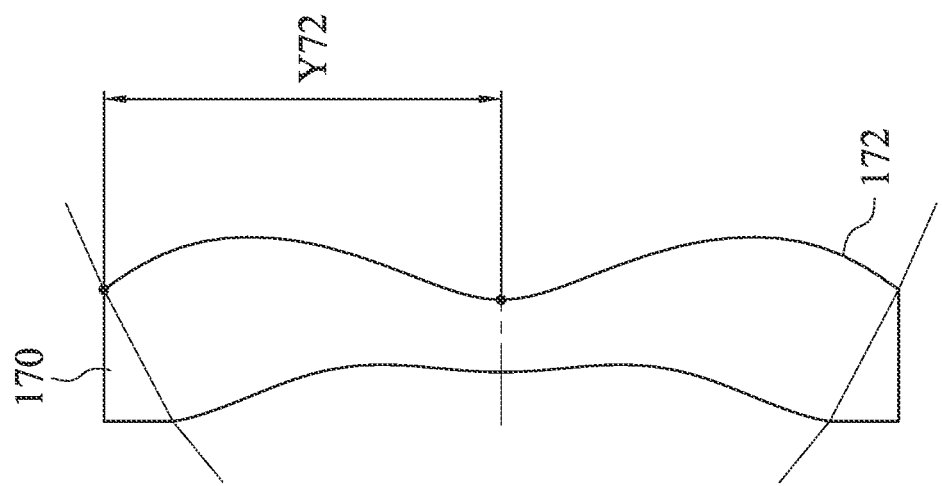
FIG. 27 shows a schematic view of the parameter Y72 of the image picking-up system of the image capturing apparatus according to FIG. 1.

FIG. 26 shows a schematic view of the parameter Y11 of the image picking-up system of the image capturing apparatus according to FIG. 1, and FIG. 27 shows a schematic view of the parameter Y72 of the image picking-up system of the image capturing apparatus according to FIG. 1. In FIG. 26 and FIG. 27, when a vertical distance between a maximum effective radius position of the object-side surface 111 of the first lens element 110 and the optical axis is Y11, and a vertical distance between a maximum effective radius position of the image-side surface 172 of the seventh lens element 170 and the optical axis is Y72, the following condition is satisfied: Y11/Y72=0.56.

In the image picking-up system according to the 1st embodiment, when an axial distance between the aperture stop 100 and the image-side surface 172 of the seventh lens element 170 is SD, and an axial distance between the object-side surface 111 of the first lens element 110 and the image-side surface 172 of the seventh lens element 170 is TD, the following condition is satisfied: SD/TD=0.82.

In the image picking-up system according to the 1st embodiment, when an axial distance between the object-side surface 111 of the first lens element 110 and the image surface 190 is TL, the focal length of the image picking-up system is f, a maximum image height of the image picking-up system is ImgH (half of a diagonal length of an effective photosensitive area of the image sensor 195), an entrance pupil diameter of the image picking-up system is EPD, and an axial distance between the image-side surface 172 of the seventh lens element 170 and the image surface 190 is BL, the following conditions are satisfied: TL/f=1.46; TL/ImgH=1.81; TL/EPD=2.78; and BL/TL=0.27.

In the image picking-up system according to the 1st embodiment, when a number of the lens elements of the image picking-up system having an Abbe number smaller than 30 is Nv30 (the seven lens elements in the 1st embodiment are the first lens element 110, the second lens element 120, the third lens element 130, the fourth lens element 140, the fifth lens element 150, the sixth lens element 160 and the seventh lens element 170, wherein the lens elements having the Abbe numbers smaller than 30 are the fourth lens element 140 and the fifth lens element 150), the following condition is satisfied: Nv30=2.

In the image picking-up system according to the 1st embodiment, when the half of the maximum field of view of the image picking-up system is HFOV, the following condition is satisfied: tan(HFOV)=0.78.

The detailed optical data of the 1 st embodiment are shown in TABLE 1 and the aspheric surface data are shown in TABLE 2 below.

TABLE 1

1st Embodiment
f = 3.81 mm, Fno = 1.90, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.283 | ASP | 0.180 | Plastic | 1.544 | 55.9 | 52.11 |
| 2 | | 16.035 | ASP | 0.050 | | | | |
| 3 | Lens 2 | 2.235 | ASP | 0.300 | Plastic | 1.544 | 55.9 | 247.85 |
| 4 | | 2.166 | ASP | 0.219 | | | | |
| 5 | Ape. Stop | Plano | | 0.055 | | | | |
| 6 | Lens 3 | 2.383 | ASP | 0.596 | Plastic | 1.544 | 55.9 | 2.97 |
| 7 | | −4.582 | ASP | 0.080 | | | | |
| 8 | Lens 4 | −21.121 | ASP | 0.265 | Plastic | 1.639 | 23.5 | −4.10 |
| 9 | | 3.002 | ASP | 0.310 | | | | |
| 10 | Lens 5 | 4.190 | ASP | 0.320 | Plastic | 1.660 | 20.3 | −624.29 |
| 11 | | 4.022 | ASP | 0.379 | | | | |
| 12 | Lens 6 | −11.080 | ASP | 0.824 | Plastic | 1.544 | 55.9 | 1.91 |
| 13 | | −0.975 | ASP | 0.050 | | | | |
| 14 | Lens 7 | 2.635 | ASP | 0.452 | Plastic | 1.544 | 55.9 | −2.02 |
| 15 | | 0.730 | ASP | 0.600 | | | | |
| 16 | IR-cut filter | Plano | | 0.210 | Glass | 1.517 | 64.2 | — |
| 17 | | Plano | | 0.674 | | | | |
| 18 | Image | Plano | | — | | | | |

Reference wavelength is 587.6 nm (d-line).

TABLE 2

| Aspheric Coefficients | | | | | | | |
|---|---|---|---|---|---|---|---|
| Surface # | 1 | 2 | 3 | 4 | 6 | 7 | 8 |
| k= | −3.8688E+01 | −8.9995E+01 | −8.2840E−01 | −1.8164E+00 | −6.9901E+00 | −9.0000E+01 | −2.2701E+00 |
| A4= | −1.8249E−03 | 4.7532E−03 | −4.3970E−02 | −9.2947E−02 | 9.8867E−03 | 2.5072E−03 | 1.4231E−01 |
| A6= | −3.8030E−04 | 9.8005E−04 | 8.3308E−03 | 7.5693E−03 | −5.7936E−02 | −1.9479E−01 | −4.2336E−01 |
| A8= | 5.9441E−04 | 2.4790E−04 | −1.1061E−03 | −5.6829E−04 | 1.5673E−03 | 1.6789E−01 | 4.5434E−01 |
| A10= | | | −3.4057E−03 | | 4.6677E−03 | −5.0443E−02 | −2.2120E−01 |
| A12= | | | | | | | 4.0731E−02 |

| Surface # | 9 | 10 | 11 | 12 | 13 | 14 | 15 |
|---|---|---|---|---|---|---|---|
| k= | 3.3480E+00 | −8.9999E+01 | −3.4298E+01 | 1.4223E+01 | −5.5083E+00 | −2.6367E−01 | −4.3582E+00 |
| A4= | 2.3617E−03 | −2.7311E−02 | −7.9757E−02 | 5.0135E−02 | −1.0616E−01 | −24029E−01 | −9.5276E−02 |
| A6= | −1.1317E−01 | −3.7350E−02 | 3.2210E−02 | −1.0749E−01 | 7.5379E−02 | 8.7684E−02 | 3.7811E−02 |
| A8= | 1.0805E−01 | 3.8364E−03 | −2.0946E−02 | 1.1520E−01 | −4.8551E−02 | −1.7693E−02 | −1.0694E−02 |
| A10= | −5.8864E−02 | 1.4951E−02 | −1.4362E−02 | −7.3828E−02 | 2.9403E−02 | 1.3880E−03 | 1.8312E−03 |
| A12= | 1.0836E−02 | −4.4595E−03 | 2.1429E−02 | 2.6171E−02 | −8.4596E−03 | 1.3904E−04 | −1.7761E−04 |
| A14= | | | −5.3452E−03 | −3.8358E−03 | 8.5223E−04 | −2.3838E−05 | 7.5531E−06 |

In TABLE 1, the curvature radius, the thickness and the focal length are shown in millimeters (mm). Surface numbers 0-18 represent the surfaces sequentially arranged from the object-side to the image-side along the optical axis. In TABLE 2, k represents the conic coefficient of the equation of the aspheric surface profiles. A4-A14 represent the aspheric coefficients ranging from the 4th order to the 14th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

In addition, numbers of inflection points of the object-side surfaces and the image-side surfaces of the first lens element 110 (Lens 1) through the seventh lens element 170 (Lens 7) in the 1st embodiment are listed below, wherein each number is calculated for inflection points from an axial vertex to a maximum effective radius position on the corresponding surface.

| 1st Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 0 | 1 | 1 | 2 | 2 | 0 | 2 |
| Image-side surface | 0 | 1 | 0 | 2 | 3 | 2 | 2 |

2nd Embodiment

Figure 3:
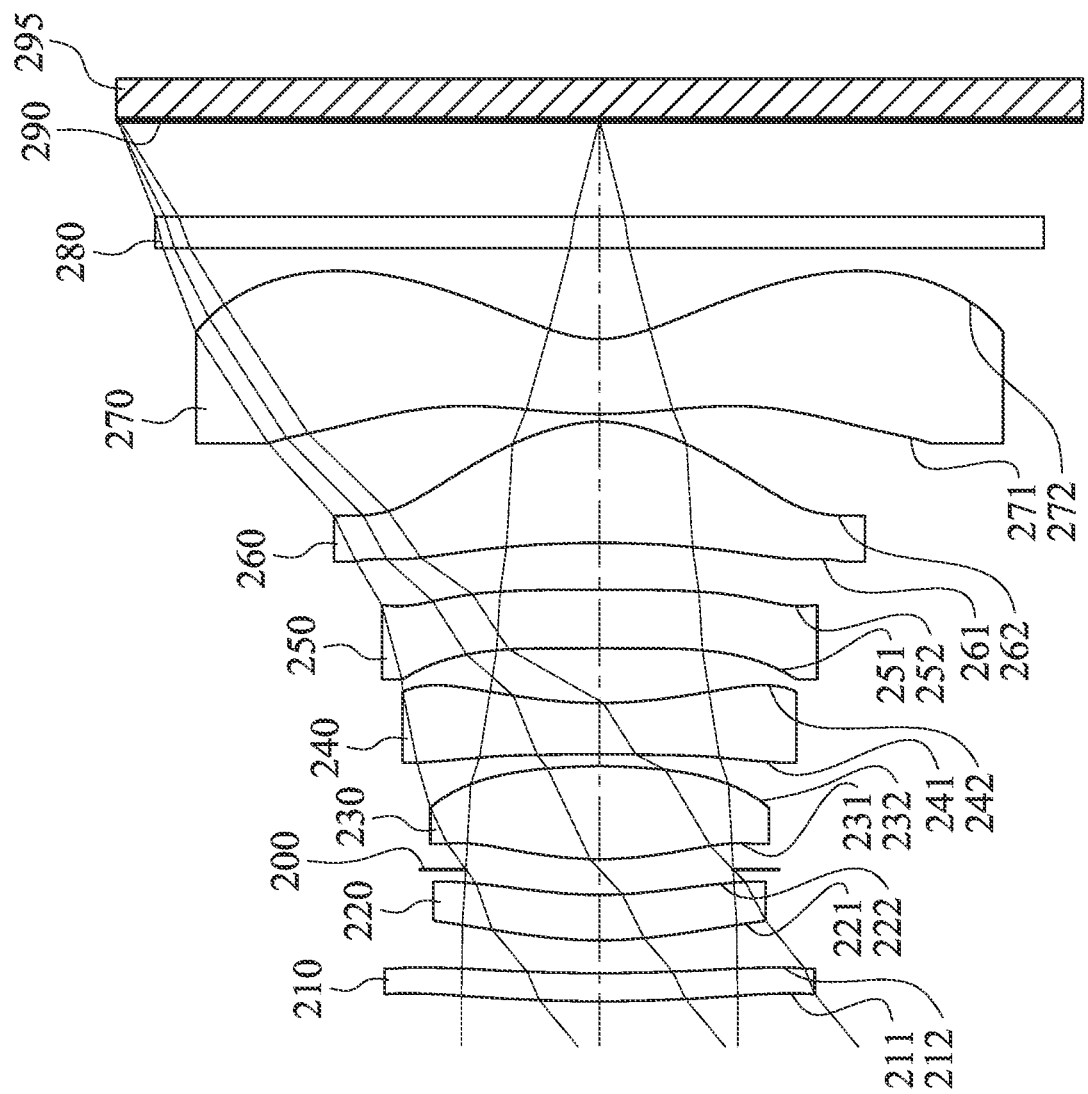
FIG. 3 is a schematic view of an image capturing apparatus according to the 2nd embodiment of the present disclosure.
Figure 4:
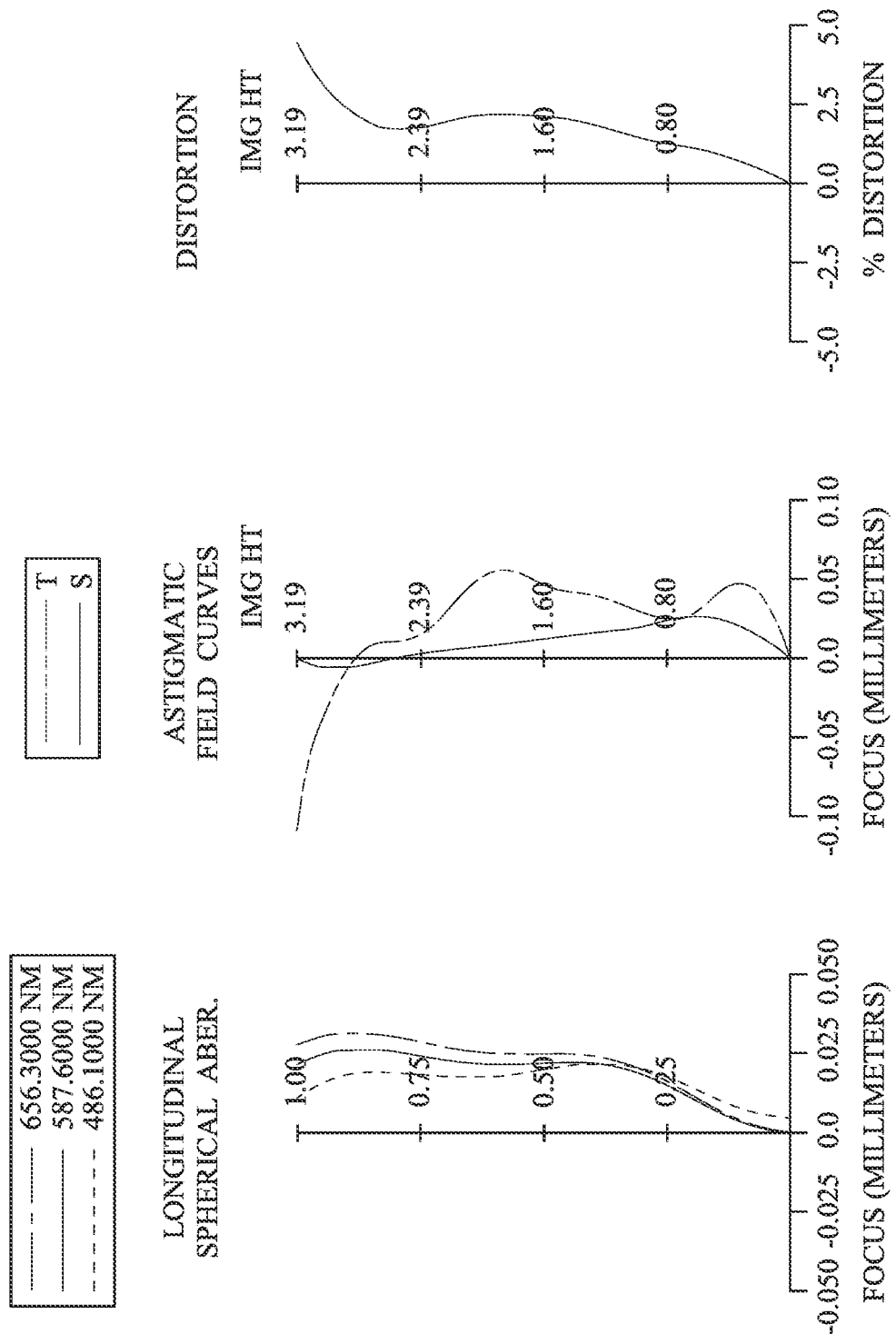
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to FIG. 3. In FIG. 3, the image capturing apparatus Includes the image picking-up system (its reference numeral is omitted) and an image sensor 295. The image picking-up system includes, in order from an object side to an image side, a first lens element 210, a second lens element 220, an aperture stop 200, a third lens element 230, a fourth lens element 240, a fifth lens element 250, a sixth lens element 260, a seventh lens element 270, an IR-cut filter 280 and an image surface 290. The image sensor 295 is disposed on the image surface 290 of the image picking-up system. The image picking-up system includes a first lens group (its reference numeral is omitted), a second lens group (its reference numeral is omitted) and a third lens group (its reference numeral is omitted), wherein the first lens group includes the first lens element 210 and the second lens element 220, the second lens group Includes the third lens element 230 and the fourth lens element 240, and the third lens group includes the fifth lens element 250, the sixth lens element 260 and the seventh lens element 270. The image picking-up system includes seven lens elements (210, 220, 230, 240, 250, 260 and 270) without additional one or more lens elements inserted between the first lens element 210 and the seventh lens element 270.

The first lens element 210 with positive refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being concave in a paraxial region thereof. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with positive refractive power has an object-side surface 261 being concave in a paraxial region thereof and an image-side surface 262 being convex in a paraxial region thereof. The sixth lens element 260 is made of a plastic material, and has the object-side surface 261 and the image-side surface 262 being both aspheric.

The seventh lens element 270 with negative refractive power has an object-side surface 271 being convex in a paraxial region thereof and an image-side surface 272 being concave in a paraxial region thereof. The seventh lens element 270 is made of a plastic material, and has the object-side surface 271 and the image-side surface 272 being both aspheric. Furthermore, the image-side surface 272 of the seventh lens element 270 includes at least one convex shape in an off-axial region thereof.

The IR-cut filter 280 is made of a glass material and located between the seventh lens element 270 and the image surface 290, and will not affect the focal length of the image picking-up system.

The detailed optical data of the 2nd embodiment are shown in TABLE 3 and the aspheric surface data are shown in TABLE 4 below.

TABLE 3

2nd Embodiment
f = 3.66 mm, Fno = 2.00, HFOV = 39.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 10.437 | ASP | 0.186 | Plastic | 1.584 | 28.2 | 148.17 |
| 2 | | 11.790 | ASP | 0.218 | | | | |
| 3 | Lens 2 | 3.027 | ASP | 0.300 | Plastic | 1.584 | 28.2 | −164.37 |
| 4 | | 2.827 | ASP | 0.168 | | | | |
| 5 | Ape. Stop | Plano | | 0.068 | | | | |
| 6 | Lens 3 | 2.405 | ASP | 0.616 | Plastic | 1.544 | 55.9 | 2.68 |
| 7 | | −3.373 | ASP | 0.078 | | | | |
| 8 | Lens 4 | −14.310 | ASP | 0.339 | Plastic | 1.639 | 23.5 | −3.99 |
| 9 | | 3.130 | ASP | 0.363 | | | | |
| 10 | Lens 5 | −156.680 | ASP | 0.386 | Plastic | 1.660 | 20.3 | −466.75 |
| 11 | | −319.016 | ASP | 0.312 | | | | |
| 12 | Lens 6 | −7.608 | ASP | 0.801 | Plastic | 1.544 | 55.9 | 1.87 |
| 13 | | −0.929 | ASP | 0.050 | | | | |
| 14 | Lens 7 | 2.962 | ASP | 0.497 | Plastic | 1.559 | 40.4 | −1.94 |
| 15 | | 0.746 | ASP | 0.600 | | | | |
| 16 | IR-cut filter | Plano | | 0.210 | Glass | 1.517 | 64.2 | — |
| 17 | | Plano | | 0.638 | | | | |
| 18 | Image | Plano | | — | | | | |

Reference wavelength is 587.6 nm (d-line).

TABLE 4

Aspheric Coefficients

| Surface # | 1 | 2 | 3 | 4 | 6 | 7 | 8 |
|---|---|---|---|---|---|---|---|
| k= | −1.1301E+01 | −7.4419E+01 | −1.3444E+00 | −1.3416E+00 | −8.3459E+00 | −4.7446E+01 | 8.7172E+01 |
| A4= | −1.2625E−03 | 3.1869E−03 | −4.7749E−02 | −9.2700E−02 | 1.4634E−02 | −6.2065E−03 | 1.2958E−01 |
| A6= | −1.3257E−03 | −5.8329E−03 | −2.8586E−03 | −1.4777E−02 | −7.2348E−02 | −2.1071E−01 | −4.0875E−01 |
| A8= | −1.7075E−03 | −1.0210E−03 | −7.6619E−03 | 1.0399E−02 | −2.4538E−02 | 1.6910E−01 | 4.6213E−01 |
| A10= | −3.8281E−05 | 1.3607E−04 | 9.3912E−03 | 1.0911E−02 | 1.9141E−02 | −5.1620E−02 | −2.2474E−01 |
| A12= | | | | | | | 4.0713E−02 |

| Surface # | 9 | 10 | 11 | 12 | 13 | 14 | 15 |
|---|---|---|---|---|---|---|---|
| k= | 3.9644E+00 | −9.0000E+01 | −4.5886E+01 | 1.4223E+01 | −5.4978E+00 | −1.7165E−01 | −4.3428E+00 |
| A4= | −2.3273E−02 | −4.4183E−02 | −6.6152E−02 | −1.9992E−02 | −1.8609E−01 | −1.7866E−01 | −6.9293E−02 |
| A6= | −1.0367E−01 | −2.5946E−02 | 2.9756E−02 | 2.1452E−02 | 2.1418E−01 | 7.4889E−02 | 2.3382E−02 |
| A8= | 1.0652E−01 | −6.2540E−03 | −1.8060E−02 | −1.4900E−02 | −1.7479E−01 | −2.3938E−02 | −5.5974E−03 |
| A10= | −6.3593E−02 | 1.3063E−02 | −1.3925E−02 | 1.1667E−02 | 9.2782E−02 | 5.5022E−03 | 7.3493E−04 |
| A12= | 1.1091E−02 | −3.2707E−03 | 2.1096E−02 | −3.0262E−03 | −2.4229E−02 | −7.2715E−04 | −4.5609E−05 |
| A14= | | | −5.3817E−03 | 1.0081E−04 | 2.3682E−03 | 3.9002E−05 | 8.0073E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 3.66 | f/f3 | 1.364 |
| Fno | 2.00 | f/f4 | −0.916 |
| HFOV (deg.) | 39.8 | f/f5 | −0.008 |
| Nmax | 1.660 | \|f4/f5\| | 0.009 |
| V3/V4 | 2.38 | f3/f7 | −1.382 |
| CT1/CT6 | 0.23 | \|f/f1\| + \|f/f2\| | 0.047 |
| T12/CTmin | 1.17 | fG2/fG1 | 0.006 |
| (T12 + T23 + T34)/CTmin | 2.86 | Y11/Y72 | 0.53 |
| ATmax/CTmin | 1.95 | SD/TD | 0.80 |
| ATmax/CTmax | 0.45 | TL/f | 1.59 |
| CTmax/Yc72 | 0.46 | TL/ImgH | 1.83 |
| ΣAT/ΣCT | 0.40 | TL/EPD | 3.19 |
| R4/R5 | 1.18 | BL/TL | 0.25 |
| (R3 − R5)/(R3 + R5) | 0.11 | Nv30 | 4 |
| (R13 + R14)/(R13 − R14) | 1.67 | tan(HFOV) | 0.83 |
| f/f2 | −0.022 | | |

In addition, numbers of Inflection points of the object-side surfaces and the image-side surfaces of the first lens element 210 (Lens 1) through the seventh lens element 270 (Lens 7) in the 2nd embodiment are listed below, wherein each number is calculated for inflection points from an axial vertex to a maximum effective radius position on the corresponding surface.

| 2nd Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 2 | 1 | 1 | 0 | 2 | 3 |
| Image-side surface | 1 | 2 | 0 | 1 | 2 | 3 | 1 |

3rd Embodiment

Figure 5:
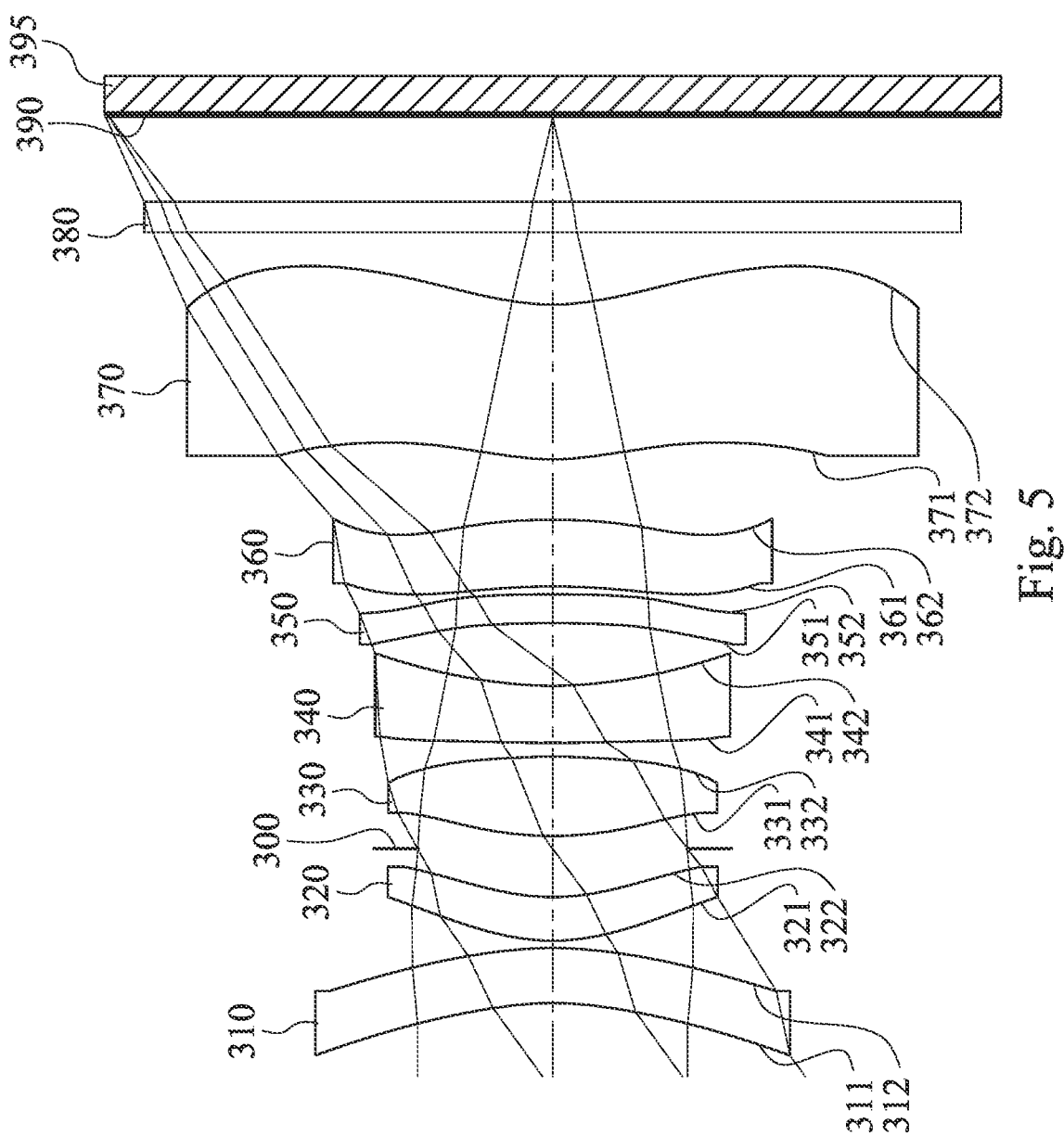
FIG. 5 is a schematic view of an image capturing apparatus according to the 3rd embodiment of the present disclosure.
Figure 6:
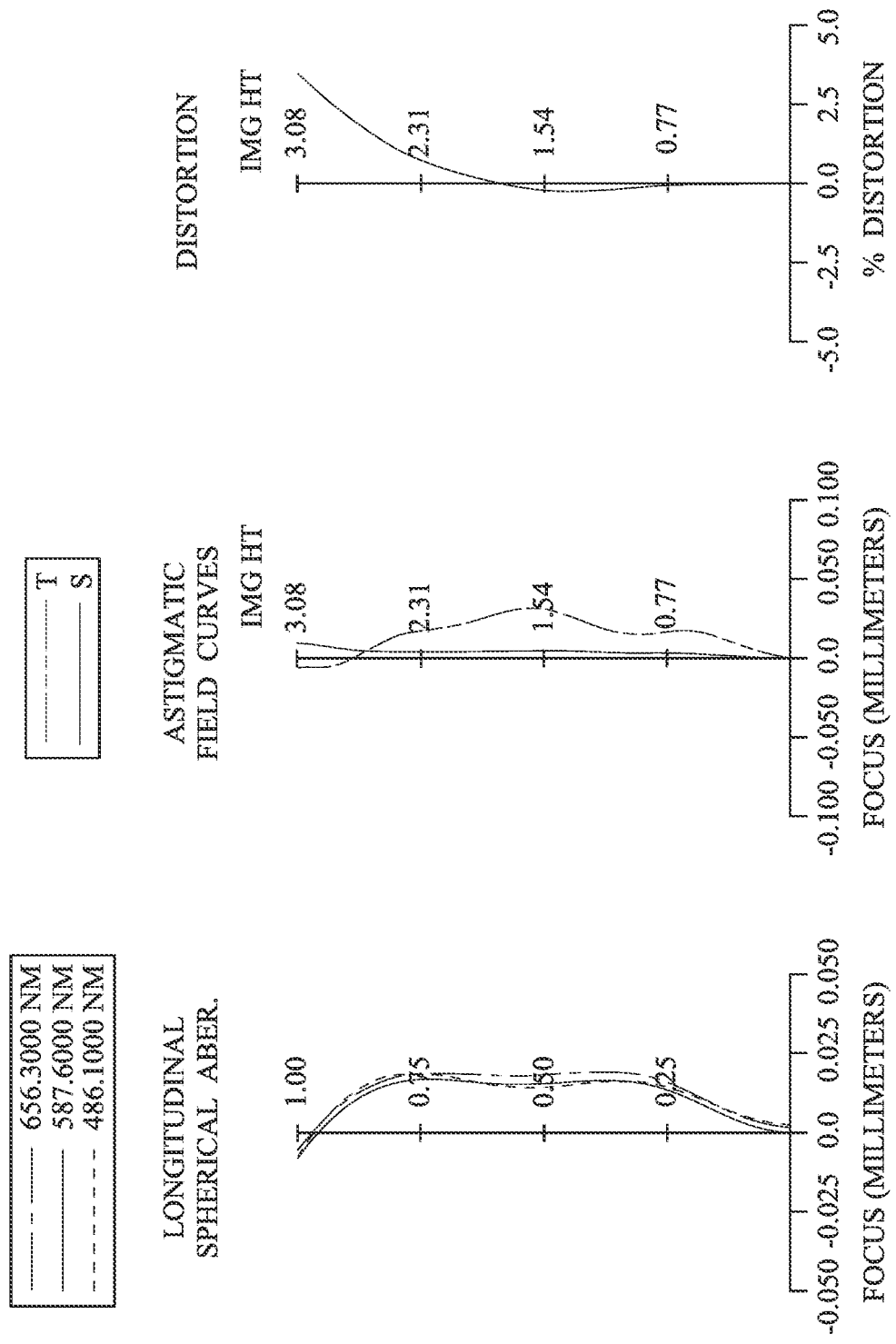
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to FIG. 5. In FIG. 5, the image capturing apparatus Includes the image picking-up system (its reference numeral is omitted) and an image sensor 395. The image picking-up system includes, in order from an object side to an image side, a first lens element 310, a second lens element 320, an aperture stop 300, a third lens element 330, a fourth lens element 340, a fifth lens element 350, a sixth lens element 360, a seventh lens element 370, an IR-cut filter 380 and an image surface 390. The image sensor 395 is disposed on the image surface 390 of the image picking-up system. The image picking-up system Includes a first lens group (its reference numeral is omitted), a second lens group (its reference numeral is omitted) and a third lens group (Its reference numeral is omitted), wherein the first lens group includes the first lens element 310 and the second lens element 320, the second lens group Includes the third lens element 330 and the fourth lens element 340, and the third lens group Includes the fifth lens element 350, the sixth lens element 360 and the seventh lens element 370. The image picking-up system Includes seven lens elements (310, 320, 330, 340, 350, 360 and 370) without additional one or more lens elements Inserted between the first lens element 310 and the seventh lens element 370.

The first lens element 310 with negative refractive power has an object-side surface 311 being concave in a paraxial region thereof and an image-side surface 312 being convex in a paraxial region thereof. The first lens element 310 is made of a plastic material, and has the object-side surface 311 and the image-side surface 312 being both aspheric.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric.

The seventh lens element 370 with positive refractive power has an object-side surface 371 being convex in a paraxial region thereof and an image-side surface 372 being concave in a paraxial region thereof. The seventh lens element 370 is made of a plastic material, and has the object-side surface 371 and the image-side surface 372 being both aspheric. Furthermore, the image-side surface 372 of the seventh lens element 370 includes at least one convex shape in an off-axial region thereof.

The IR-cut filter 380 is made of a glass material and located between the seventh lens element 370 and the image surface 390, and will not affect the focal length of the image picking-up system.

The detailed optical data of the 3rd embodiment are shown in TABLE 5 and the aspheric surface data are shown in TABLE 6 below.

TABLE 5

3rd Embodiment
f = 4.11 mm, Fno = 2.20, HFOV = 35.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.306 | ASP | 0.382 | Plastic | 1.584 | 28.2 | −46.10 |
| 2 | | −2.675 | ASP | 0.050 | | | | |
| 3 | Lens 2 | 1.474 | ASP | 0.302 | Plastic | 1.559 | 40.4 | 21.15 |
| 4 | | 1.560 | ASP | 0.334 | | | | |
| 5 | Ape. Stop | Plano | | 0.088 | | | | |
| 6 | Lens 3 | 2.462 | ASP | 0.549 | Plastic | 1.544 | 55.9 | 2.97 |
| 7 | | −4.345 | ASP | 0.096 | | | | |
| 8 | Lens 4 | 21.827 | ASP | 0.394 | Plastic | 1.671 | 19.5 | −4.95 |
| 9 | | 2.861 | ASP | 0.433 | | | | |
| 10 | Lens 5 | −10.651 | ASP | 0.200 | Plastic | 1.660 | 20.3 | −158.25 |
| 11 | | −11.949 | ASP | 0.055 | | | | |
| 12 | Lens 6 | −5.124 | ASP | 0.461 | Plastic | 1.544 | 55.9 | −56.14 |
| 13 | | −6.352 | ASP | 0.419 | | | | |
| 14 | Lens 7 | 1.775 | ASP | 1.071 | Plastic | 1.535 | 56.3 | 22.20 |
| 15 | | 1.648 | ASP | 0.500 | | | | |
| 16 | IR-cut filter | Plano | | 0.210 | Glass | 1.517 | 64.2 | — |
| 17 | | Plano | | 0.606 | | | | |
| 18 | Image | Plano | | — | | | | |

Reference wavelength is 587.6 nm (d-line).

TABLE 6

Aspheric Coefficients

| Surface # | 1 | 2 | 3 | 4 | 6 | 7 | 8 |
|---|---|---|---|---|---|---|---|
| k = | −1.3154E+01 | −1.4087E+01 | −1.9532E+00 | −1.6667E+00 | −2.4426E+00 | −9.0000E+01 | −8.9999E+01 |
| A4 = | −2.5338E−03 | −1.5086E−03 | −5.8923E−02 | −9.3111E−02 | 3.3758E−02 | 4.6243E−02 | 1.1116E−01 |
| A6 = | −2.2162E−03 | −3.3055E−03 | 9.4095E−03 | −1.8370E−02 | −6.6234E−02 | −2.2309E−01 | −3.8574E−01 |
| A8 = | −2.5777E−04 | −8.3981E−05 | −1.7515E−02 | 3.4194E−03 | −1.5445E−02 | 1.8628E−01 | 4.6494E−01 |
| A10 = | 2.1883E−04 | 3.4737E−04 | 1.1095E−02 | 1.0318E−02 | 1.2373E−02 | −6.0035E−02 | −2.3077E−01 |
| A12 = | | | 4.8596E−08 | | 2.7972E−12 | −3.3411E−12 | 4.0717E−02 |
| A14 = | | | | | | | 3.7426E−13 |

| Surface # | 9 | 10 | 11 | 12 | 13 | 14 | 15 |
|---|---|---|---|---|---|---|---|
| k = | 3.6727E+00 | 6.1854E+01 | 1.6641E+01 | 7.5070E+00 | −5.5071E+00 | −1.4947E+00 | −4.3548E+00 |
| A4 = | −3.3658E−02 | 9.8319E−06 | −9.5487E−03 | −6.2799E−02 | −2.8455E−01 | −3.0622E−01 | −9.2463E−02 |
| A6 = | −9.2459E−02 | −2.7022E−01 | −2.1737E−01 | 3.1826E−01 | 5.0723E−01 | 2.4011E−01 | 4.5838E−02 |
| A8 = | 1.2196E−01 | 4.2220E−01 | 3.0016E−01 | −3.5999E−01 | −3.6545E−01 | −1.3176E−01 | −1.5897E−02 |
| A10 = | −6.1628E−02 | −2.4390E−01 | −1.7177E−01 | 2.1046E−01 | 1.4257E−01 | 4.7645E−02 | 3.4738E−03 |
| A12 = | 7.3231E−03 | 5.7684E−02 | 5.7387E−02 | −5.9915E−02 | −2.7912E−02 | −1.0680E−02 | −4.6574E−04 |
| A14 = | 2.4187E−07 | −4.1366E−03 | −1.0076E−02 | 6.4471E−03 | 2.0391E−03 | 1.3335E−03 | 3.4909E−05 |
| A16 = | | | | | | −7.0540E−05 | −1.1397E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 4.11 | f/f3 | 1.382 |
| Fno | 2.20 | f/f4 | −0.830 |
| HFOV (deg.) | 35.8 | f/f5 | −0.026 |
| Nmax | 1.671 | |f4/f5| | 0.031 |
| V3/V4 | 2.87 | f3/f7 | 0.134 |
| CT1/CT6 | 0.83 | |f/f1| + |f/f2| | 0.283 |
| T12/CTmin | 0.25 | fG2/fG1 | 0.154 |

| 3rd Embodiment | | | |
|---|---|---|---|
| (T12 + T23 + T34)/CTmin | 2.84 | Y11/Y72 | 0.65 |
| ATmax/CTmin | 2.16 | SD/TD | 0.78 |
| ATmax/CTmax | 0.40 | TL/f | 1.50 |
| CTmax/Yc72 | 0.64 | TL/ImgH | 2.00 |
| ΣAT/ΣCT | 0.44 | TL/EPD | 3.29 |
| R4/R5 | 0.63 | BL/TL | 0.21 |
| (R3 − R5)/(R3 + R5) | −0.25 | Nv30 | 3 |
| (R13 + R14)/(R13 − R14) | 27.04 | tan(HFOV) | 0.72 |
| f/f2 | 0.194 | | | in addition, numbers of inflection points of the object-side surfaces and the image-side surfaces of the first lens element 310 (Lens 1) through the seventh lens element 370 (Lens 7) in the 3rd embodiment are listed below, wherein each number is calculated for inflection points from an axial vertex to a maximum effective radius position on the corresponding surface.

| 3rd Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 2 | 1 | 3 | 2 | 2 | 1 |
| Image-side surface | 1 | 2 | 0 | 0 | 2 | 1 | 1 |

4th Embodiment

Figure 7:
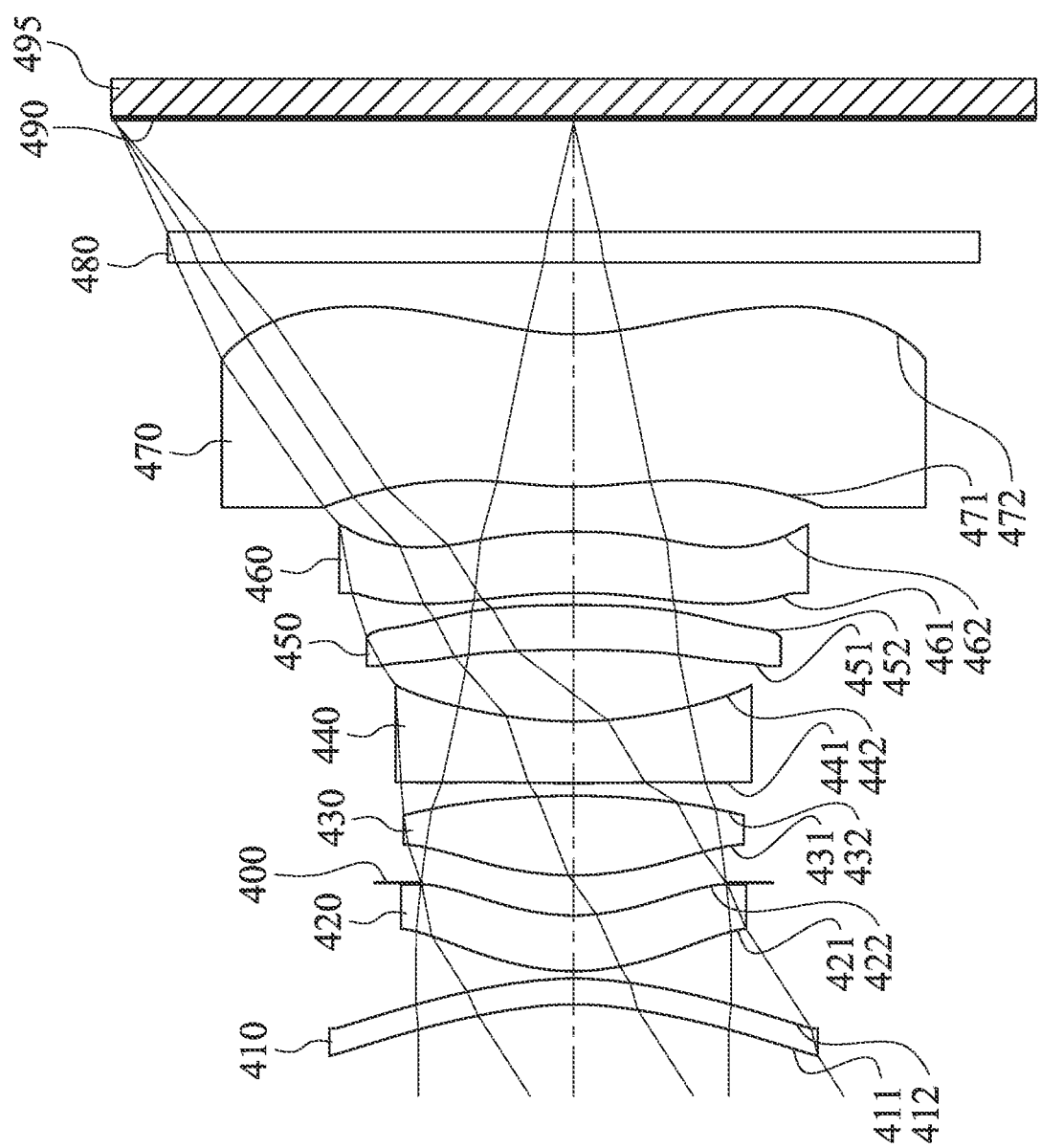
FIG. 7 is a schematic view of an image capturing apparatus according to the 4th embodiment of the present disclosure.
Figure 8:
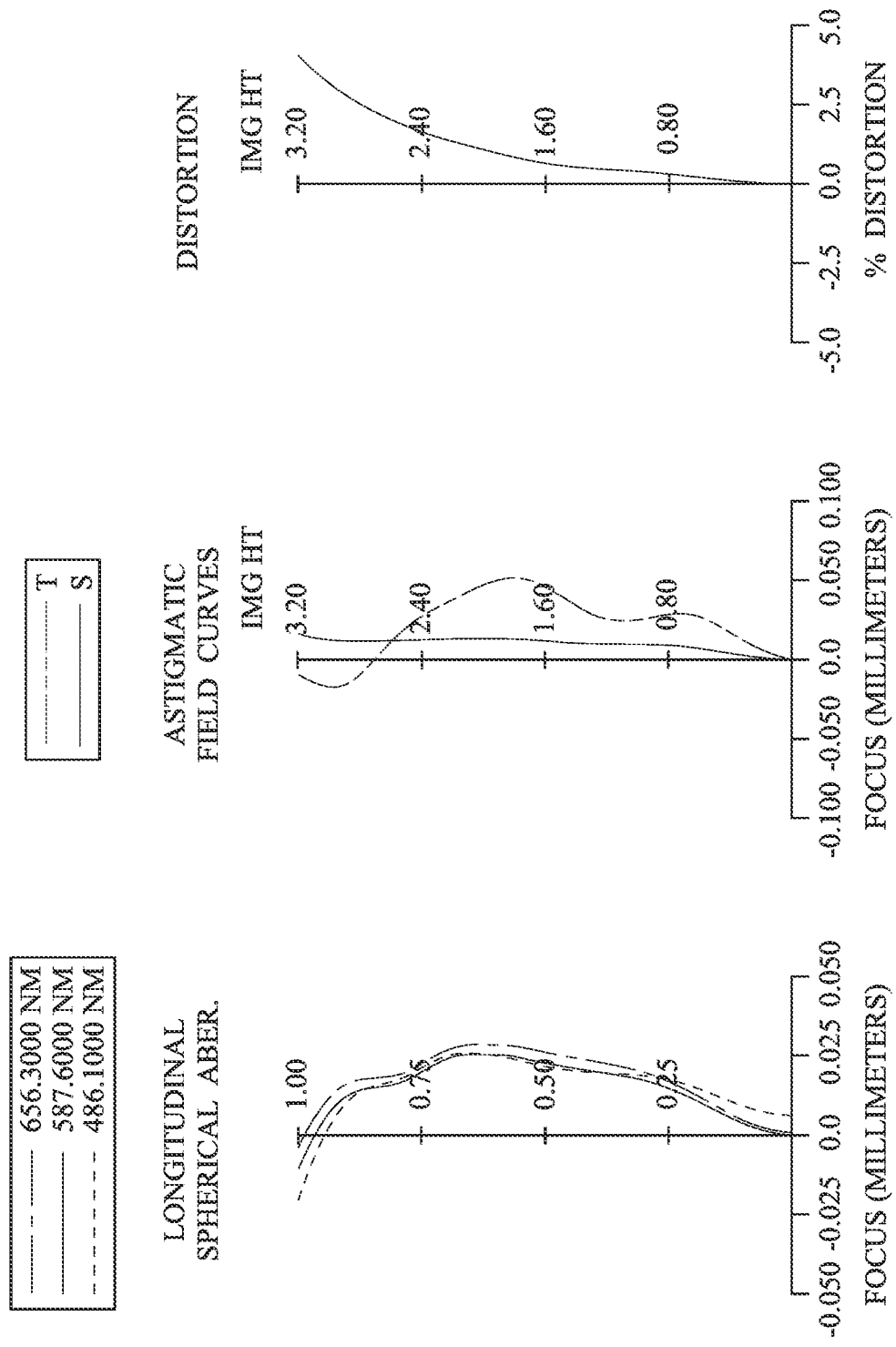
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to FIG. 7. In FIG. 7, the image capturing apparatus includes the image picking-up system (its reference numeral is omitted) and an image sensor 495. The image picking-up system includes, in order from an object side to an image side, a first lens element 410, a second lens element 420, an aperture stop 400, a third lens element 430, a fourth lens element 440, a fifth lens element 450, a sixth lens element 460, a seventh lens element 470, an IR-cut filter 480 and an image surface 490. The image sensor 495 is disposed on the image surface 490 of the image picking-up system. The image picking-up system includes a first lens group (its reference numeral is omitted), a second lens group (its reference numeral is omitted) and a third lens group (its reference numeral is omitted), wherein the first lens group includes the first lens element 410 and the second lens element 420, the second lens group Includes the third lens element 430 and the fourth lens element 440, and the third lens group includes the fifth lens element 450, the sixth lens element 460 and the seventh lens element 470. The image picking-up system includes seven lens elements (410, 420, 430, 440, 450, 460 and 470) without additional one or more lens elements Inserted between the first lens element 410 and the seventh lens element 470.

The first lens element 410 with positive refractive power has an object-side surface 411 being concave in a paraxial region thereof and an image-side surface 412 being convex in a paraxial region thereof. The first lens element 410 is made of a plastic material, and has the object-side surface 411 and the image-side surface 412 being both aspheric.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric.

The seventh lens element 470 with negative refractive power has an object-side surface 471 being convex in a paraxial region thereof and an image-side surface 472 being concave in a paraxial region thereof. The seventh lens element 470 is made of a plastic material, and has the object-side surface 471 and the image-side surface 472 being both aspheric. Furthermore, the image-side surface 472 of the seventh lens element 470 includes at least one convex shape in an off-axial region thereof.

The IR-cut filter 480 is made of a glass material and located between the seventh lens element 470 and the image surface 490, and will not affect the focal length of the image picking-up system.

The detailed optical data of the 4th embodiment are shown in TABLE 7 and the aspheric surface data are shown in TABLE 8 below.

TABLE 7

| 4th Embodiment f = 4.73 mm, Fno = 2.20, HFOV = 32.9 deg. | | | | | | | |
|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −2.289 | ASP | 0.180 | Plastic | 1.584 | 28.2 | 22378.07 |
| 2 | | −2.355 | ASP | 0.050 | | | | |
| 3 | Lens 2 | 1.568 | ASP | 0.386 | Plastic | 1.559 | 40.4 | 166.50 |
| 4 | | 1.454 | ASP | 0.229 | | | | |
| 5 | Ape. Stop | Plano | | 0.050 | | | | |
| 6 | Lens 3 | 2.219 | ASP | 0.554 | Plastic | 1.544 | 55.9 | 2.75 |
| 7 | | −4.185 | ASP | 0.086 | | | | |
| 8 | Lens 4 | 47.943 | ASP | 0.428 | Plastic | 1.671 | 19.5 | −4.52 |
| 9 | | 2.840 | ASP | 0.496 | | | | |

TABLE 7-continued

4th Embodiment
f = 4.73 mm, Fno = 2.20, HFOV = 32.9 deg.

| Surface # | | Curvature Radius | | Thickness | Material | Index | Abbe # | Focal Length |
|---|---|---|---|---|---|---|---|---|
| 10 | Lens 5 | −12.722 | ASP | 0.313 | Plastic | 1.660 | 20.3 | 43.91 |
| 11 | | −8.928 | ASP | 0.083 | | | | |
| 12 | Lens 6 | −4.586 | ASP | 0.426 | Plastic | 1.544 | 55.9 | −108.49 |
| 13 | | −5.136 | ASP | 0.311 | | | | |
| 14 | Lens 7 | 2.488 | ASP | 1.059 | Plastic | 1.535 | 56.3 | −46.40 |
| 15 | | 1.926 | ASP | 0.500 | | | | |
| 16 | IR-cut filter | Plano | | 0.210 | Glass | 1.517 | 64.2 | — |
| 17 | | Plano | | 0.789 | | | | |
| 18 | Image | Plano | | — | | | | |

Reference wavelength is 587.6 nm (d-line).

TABLE 8

Aspheric Coefficients

| Surface # | 1 | 2 | 3 | 4 | 6 | 7 | 8 |
|---|---|---|---|---|---|---|---|
| k = | −1.5019E+01 | −1.3559E+01 | −1.7352E+00 | −1.4853E+00 | −2.0022E+00 | −8.4126E+01 | −8.9422E+01 |
| A4 = | −3.4876E−03 | −1.2550E−03 | −5.2075E−02 | −8.7886E−02 | 3.7206E−02 | 5.3540E−02 | 1.0812E−01 |
| A6 = | −2.6505E−03 | −3.2167E−03 | 1.7785E−02 | −1.7861E−02 | −6.5578E−02 | −2.1318E−01 | −3.8882E−01 |
| A8 = | 1.0135E−07 | −3.5043E−04 | −1.4573E−02 | −1.3546E−02 | −1.4121E−02 | 1.8797E−01 | 4.6502E−01 |
| A10 = | 2.4879E−04 | 4.0210E−04 | −7.9178E−04 | 6.0961E−03 | 1.5773E−02 | −5.4489E−02 | −2.3175E−01 |
| A12 = | | | | 4.8583E−08 | | −9.8993E−12 | 4.0732E−02 |
| A14 = | | | | | | 1.6948E−11 | −1.2959E−12 |

| Surface # | 9 | 10 | 11 | 12 | 13 | 14 | 15 |
|---|---|---|---|---|---|---|---|
| k = | 3.6279E+03 | 6.1854E+01 | 1.6641E+01 | 7.0856E+00 | −5.5071E+00 | −1.6867E+00 | −4.3549E+00 |
| A4 = | −3.6109E−02 | −2.2273E−02 | −7.8625E−02 | −8.7559E−02 | −2.3596E−01 | −3.1653E−01 | −1.0636E−01 |
| A6 = | −8.9383E−02 | −6.9329E−02 | 4.0575E−02 | 3.0580E−01 | 4.0198E−01 | 2.5571E−01 | 5.5241E−02 |
| A8 = | 1.2360E−01 | 6.2979E−02 | −4.1545E−02 | −2.6245E−01 | −2.4592E−01 | −1.4439E−01 | −2.1178E−02 |
| A10 = | −6.1046E−02 | 1.8181E−02 | 3.9301E−02 | 1.1118E−01 | 7.3425E−02 | 5.3836E−02 | 5.3443E−03 |
| A12 = | 7.2715E−03 | −2.0705E−02 | −7.0796E−03 | −2.0996E−02 | −8.8333E−03 | −1.2368E−02 | −8.5437E−04 |
| A14 = | 2.4886E−07 | 2.4865E−03 | −1.7720E−03 | 1.2059E−03 | 5.7505E−05 | 1.5585E−03 | 7.7978E−05 |
| A16 = | | | | | | −8.1915E−05 | −3.1254E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.73 | f/f3 | 1.722 |
| Fno | 2.20 | f/f4 | −1.048 |
| HFOV (deg.) | 32.9 | f/f5 | 0.108 |
| Nmax | 1.671 | |f4/f5| | 0.103 |
| V3/V4 | 2.87 | f3/f7 | −0.059 |
| CT1/CT6 | 0.42 | |f/f1| + |f/f2| | 0.029 |
| T12/CTmin | 0.28 | fG2/fG1 | 0.033 |

| 4th Embodiment | | | |
|---|---|---|---|
| (T12 + T23 + T34)/CTmin | 2.31 | Y11/Y72 | 0.69 |
| ATmax/CTmin | 2.76 | SD/TD | 0.82 |
| ATmax/CTmax | 0.47 | TL/f | 1.30 |
| CTmax/Yc72 | 0.71 | TL/ImgH | 1.92 |
| ΣAT/ΣCT | 0.39 | TL/EPD | 2.86 |
| R4/R5 | 0.66 | BL/TL | 0.24 |
| (R3 − R5)/(R3 + R5) | −0.17 | Nv30 | 3 |
| (R13 + R14)/(R13 − R14) | 7.85 | tan(HFOV) | 0.65 |
| f/f2 | 0.028 | | |

In addition, numbers of inflection points of the object-side surfaces and the image-side surfaces of the first lens element 410 (Lens 1) through the seventh lens element 470 (Lens 7) In the 4th embodiment are listed below, wherein each number is calculated for inflection points from an axial vertex to a maximum effective radius position on the corresponding surface.

| 4th Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 1 | 1 | 3 | 2 | 2 | 1 |
| Image-side surface | 1 | 1 | 0 | 0 | 2 | 2 | 1 |

5th Embodiment

Figure 9:
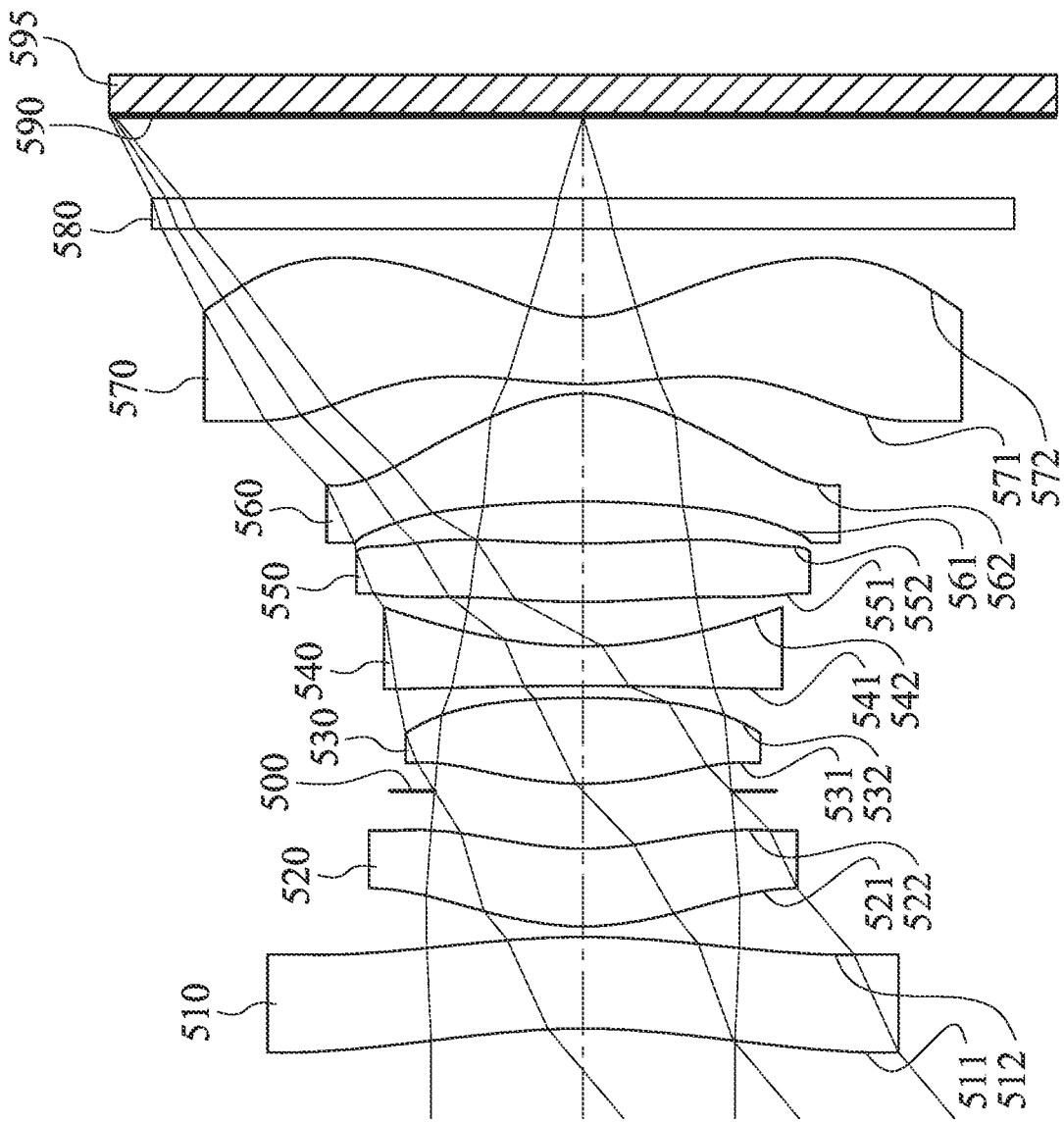
FIG. 9 is a schematic view of an image capturing apparatus according to the 5th embodiment of the present disclosure.
Figure 10:
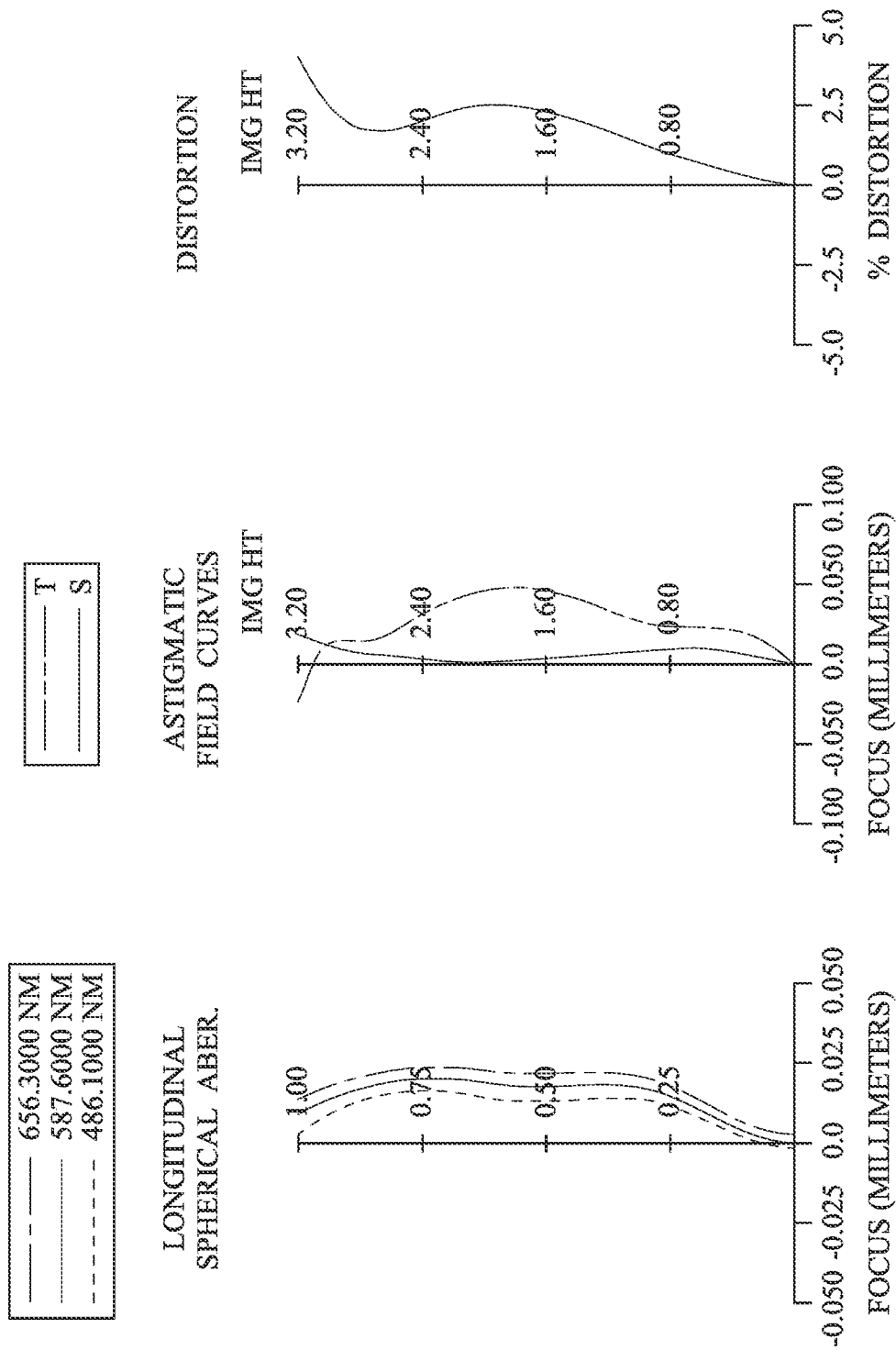
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to FIG. 9. In FIG. 9, the image capturing apparatus includes the image picking-up system (its reference numeral is omitted) and an image sensor 595. The image picking-up system includes, in order from an object side to an image side, a first lens element 510, a second lens element 520, an aperture stop 500, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the image picking-up system. The image picking-up system includes a first lens group (its reference numeral is omitted), a second lens group (its reference numeral is omitted) and a third lens group (its reference numeral is omitted), wherein the first lens group includes the first lens element 510 and the second lens element 520, the second lens group Includes the third lens element 530 and the fourth lens element 540, and the third lens group Includes the fifth lens element 550, the sixth lens element 560 and the seventh lens element 570. The image picking-up system includes seven lens elements (510, 520, 530, 540, 550, 560 and 570) without additional one or more lens elements Inserted between the first lens element 510 and the seventh lens element 570.

The first lens element 510 with negative refractive power has an object-side surface 511 being concave in a paraxial region thereof and an image-side surface 512 being convex in a paraxial region thereof. The first lens element 510 is made of a plastic material, and has the object-side surface 511 and the image-side surface 512 being both aspheric.

The second lens element 520 with positive refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being concave in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric.

The sixth lens element 560 with positive refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric.

The seventh lens element 570 with negative refractive power has an object-side surface 571 being convex in a paraxial region thereof and an image-side surface 572 being concave in a paraxial region thereof. The seventh lens element 570 is made of a plastic material, and has the object-side surface 571 and the image-side surface 572 being both aspheric. Furthermore, the image-side surface 572 of the seventh lens element 570 includes at least one convex shape in an off-axial region thereof.

The IR-cut filter 580 is made of a glass material and located between the seventh lens element 570 and the image surface 590, and will not affect the focal length of the image picking-up system.

The detailed optical data of the 5th embodiment are shown in TABLE 9 and the aspheric surface data are shown in TABLE 10 below.

TABLE 9

5th Embodiment
f = 3.61 mm, Fno = 1.75, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.582 | ASP | 0.620 | Plastic | 1.639 | 23.2 | −51.14 |
| 2 | | −5.611 | ASP | 0.073 | | | | |
| 3 | Lens 2 | 1.971 | ASP | 0.528 | Plastic | 1.544 | 55.9 | 17.10 |
| 4 | | 2.264 | ASP | 0.391 | | | | |
| 5 | Ape. Stop | Plano | | 0.050 | | | | |
| 6 | Lens 3 | 2.447 | ASP | 0.584 | Plastic | 1.544 | 55.9 | 2.96 |
| 7 | | −4.309 | ASP | 0.079 | | | | |
| 8 | Lens 4 | −17.641 | ASP | 0.270 | Plastic | 1.639 | 23.5 | −4.11 |
| 9 | | 3.101 | ASP | 0.301 | | | | |
| 10 | Lens 5 | 5.013 | ASP | 0.397 | Plastic | 1.511 | 56.8 | 59.96 |
| 11 | | 5.834 | ASP | 0.286 | | | | |
| 12 | Lens 6 | −5.858 | ASP | 0.733 | Plastic | 1.544 | 55.9 | 2.06 |
| 13 | | −0.981 | ASP | 0.066 | | | | |
| 14 | Lens 7 | 2.913 | ASP | 0.452 | Plastic | 1.534 | 55.9 | −2.14 |
| 15 | | 0.777 | ASP | 0.600 | | | | |
| 16 | IR-cut filter | Plano | | 0.210 | Glass | 1.517 | 64.2 | — |
| 17 | | Plano | | 0.560 | | | | |
| 18 | Image | Plano | | — | | | | |

Reference wavelength is 587.6 nm (d-line).

TABLE 10

Aspheric Coefficients

| Surface # | 1 | 2 | 3 | 4 | 6 | 7 | 8 |
|---|---|---|---|---|---|---|---|
| k = | −14933E+01 | −4.2229E+01 | −1.2361E+00 | −1.4495E+00 | −6.8299E+00 | −9.0000E+01 | −2.7820E+01 |
| A4 = | 4.4539E−03 | 3.4714E−03 | −5.4025E−02 | −9.3046E−02 | 2.4413E−02 | 9.0848E−03 | 1.5023E−01 |
| A6 = | −3.1489E−04 | 1.0542E−04 | −9.3694E−04 | −9.0259E−03 | −5.3601E−02 | −1.8438E−01 | −4.1311E−01 |
| A8 = | 6.7885E−05 | 1.3275E−04 | −3.3934E−03 | 8.4895E−03 | −5.9900E−03 | 1.5773E−01 | 4.6108E−01 |
| A10 = | | | 1.3553E−03 | | 6.1422E−03 | −4.8676E−02 | −2.2649E−01 |
| A12 = | | | | | | 1.9775E−13 | 4.0722E−02 |
| A14 = | | | | | | | −1.8899E−14 |

| Surface # | 9 | 10 | 11 | 12 | 13 | 14 | 15 |
|---|---|---|---|---|---|---|---|
| k = | 3.5422E+00 | −8.9992E+01 | −1.8543E+01 | 1.2269E+01 | −5.4278E+00 | −1.2795E−01 | −4.6378E+00 |
| A4 = | 3.0626E−03 | −1.7570E−02 | −6.9228E−02 | 5.1886E−02 | −9.3855E−02 | −1.8618E−01 | −7.4944E−02 |
| A6 = | −1.0208E−01 | −2.8142E−02 | 3.1276E−02 | −6.2574E−02 | 7.7215E−02 | 7.0083E−02 | 2.7021E−02 |
| A8 = | 1.1368E−01 | 6.4661E−03 | −2.1935E−02 | 7.7008E−02 | −3.1377E−02 | −2.0098E−02 | −7.1955E−03 |
| A10 = | −5.8892E−02 | 1.4804E−02 | −1.4496E−02 | −7.3957E−02 | 4.4054E−03 | 3.8719E−03 | 1.1373E−03 |
| A12 = | 1.0239E−02 | −5.1502E−03 | 2.1480E−02 | 3.3837E−02 | 1.3643E−03 | −3.7082E−04 | −1.0328E−04 |
| A14 = | | | −5.4203E−03 | −5.5007E−03 | −3.4605E−04 | 1.1227E−05 | 4.2803E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 3.61 | f/f3 | 1.220 |
| Fno | 1.75 | f/f4 | −0.879 |
| HFOV (deg.) | 40.3 | f/f5 | 0.060 |
| Nmax | 1.639 | |f4/f5| | 0.069 |
| V3/V4 | 2.38 | f3/f7 | −1.381 |
| CT1/CT6 | 0.85 | |f/f1| + |f/f2| | 0.282 |
| T12/CTmin | 0.27 | fG2/fG1 | 0.304 |
| (T12 + T23 + T34)/CTmin | 2.19 | Y11/Y72 | 0.83 |
| ATmax/CTmin | 1.63 | SD/TD | 0.67 |
| ATmax/CTmax | 0.60 | TL/f | 1.72 |
| CTmax/Yc72 | 0.45 | TL/ImgH | 1.94 |
| ΣAT/ΣCT | 0.35 | TL/EPD | 3.01 |
| R4/R5 | 0.93 | BL/TL | 0.22 |
| (R3 − R5)/(R3 + R5) | −0.11 | Nv30 | 2 |
| (R13 + R14)/(R13 − R14) | 1.73 | tan(HFOV) | 0.85 |
| f/f2 | 0.211 | | |

In addition, numbers of Inflection points of the object-side surfaces and the image-side surfaces of the first lens element 510 (Lens 1) through the seventh lens element 570 (Lens 7) In the 5th embodiment are listed below, wherein each number is calculated for Inflection points from an axial vertex to a maximum effective radius position on the corresponding surface.

| 5th Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 1 | 1 | 4 | 3 | 0 | 2 |
| Image-side surface | 1 | 1 | 0 | 0 | 3 | 2 | 2 |

6th Embodiment

Figure 11:
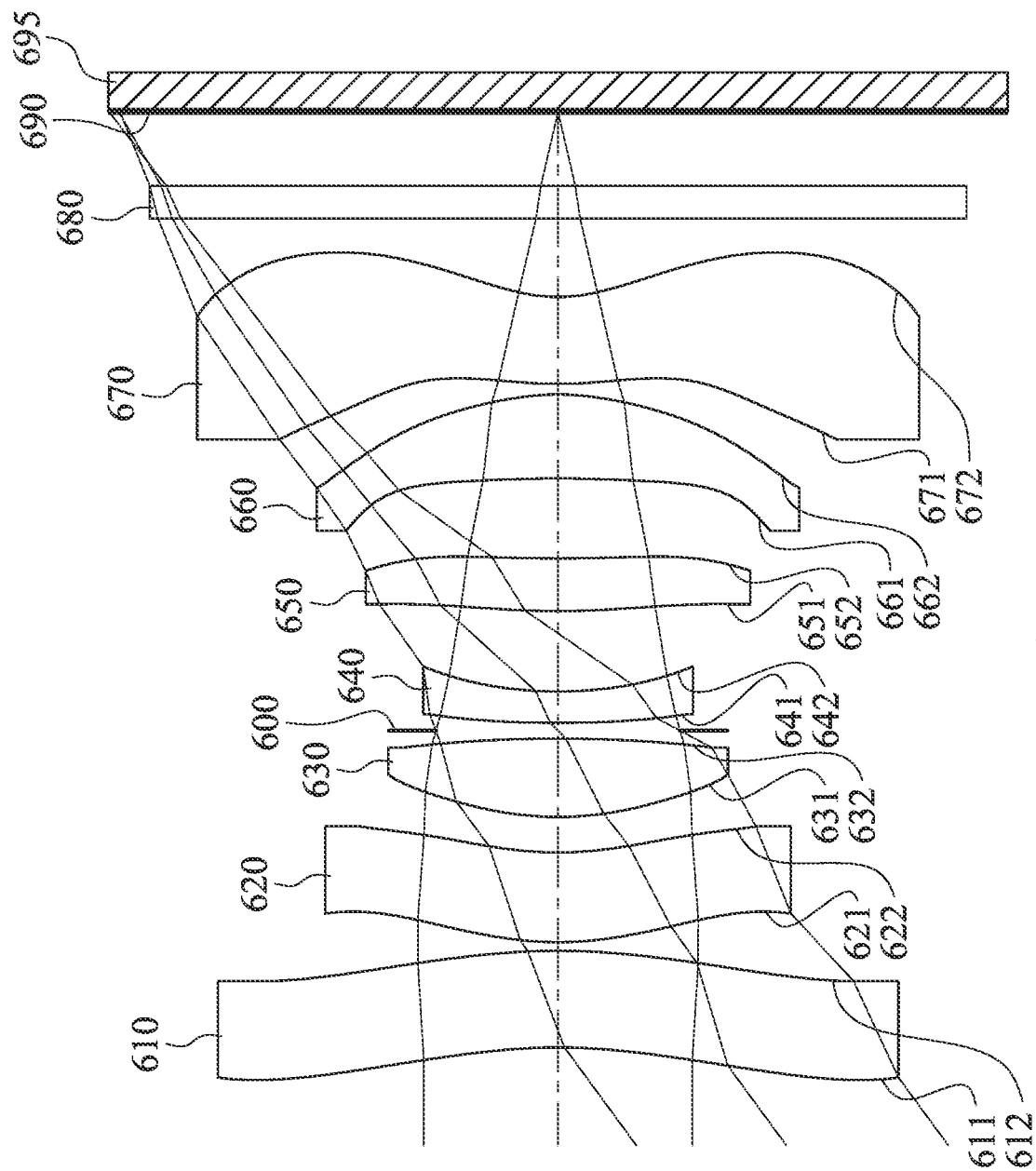
FIG. 11 is a schematic view of an image capturing apparatus according to the 6th embodiment of the present disclosure.
Figure 12:
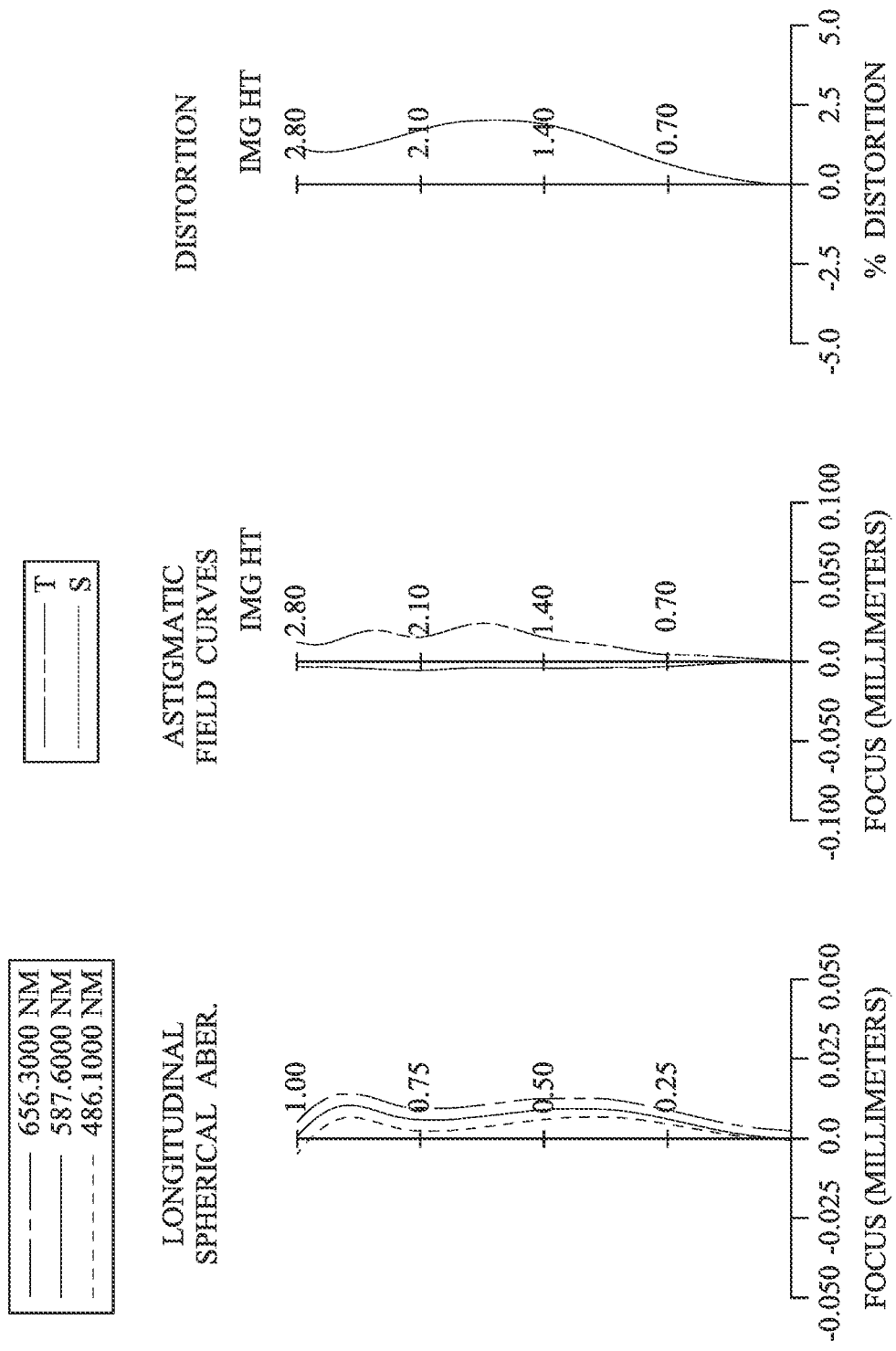
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to FIG. 11. In FIG. 11, the image capturing apparatus includes the image picking-up system (its reference numeral is omitted) and an image sensor 695. The image picking-up system includes, in order from an object side to an image side, a first lens element 610, a second lens element 620, a third lens element 630, an aperture stop 600, a fourth lens element 640, a fifth lens element 650, a sixth lens element 660, a seventh lens element 670, an IR-cut filter 680 and an image surface 690. The image sensor 695 is disposed on the image surface 690 of the image picking-up system. The image picking-up system includes a first lens group (its reference numeral is omitted), a second lens group (its reference numeral is omitted) and a third lens group (its reference numeral is omitted), wherein the first lens group includes the first lens element 610 and the second lens element 620, the second lens group includes the third lens element 630 and the fourth lens element 640, and the third lens group Includes the fifth lens element 650, the sixth lens element 660 and the seventh lens element 670. The image picking-up system includes seven lens elements (610, 620, 630, 640, 650, 660 and 670) without additional one or more lens elements inserted between the first lens element 610 and the seventh lens element 670.

The first lens element 610 with negative refractive power has an object-side surface 611 being concave in a paraxial region thereof and an image-side surface 612 being convex in a paraxial region thereof. The first lens element 610 is made of a plastic material, and has the object-side surface 611 and the image-side surface 612 being both aspheric.

The second lens element 620 with positive refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being concave in a paraxial region thereof. The fifth lens element 650 is made of a plastic material, and has the object-side surface 651 and the image-side surface 652 being both aspheric.

The sixth lens element 660 with positive refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric.

The seventh lens element 670 with negative refractive power has an object-side surface 671 being convex in a paraxial region thereof and an image-side surface 672 being concave in a paraxial region thereof. The seventh lens element 670 is made of a plastic material, and has the object-side surface 671 and the image-side surface 672 being both aspheric. Furthermore, the image-side surface 672 of the seventh lens element 670 includes at least one convex shape in an off-axial region thereof.

The IR-cut filter 680 is made of a glass material and located between the seventh lens element 670 and the image surface 690, and will not affect the focal length of the image picking-up system.

The detailed optical data of the 6th embodiment are shown in TABLE 11 and the aspheric surface data are shown in TABLE 12 below.

TABLE 11

6th Embodiment
f = 3.76 mm, Fno = 2.20, HFOV = 36.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.652 | ASP | 0.616 | Plastic | 1.639 | 23.2 | −68.93 |
| 2 | | −4.245 | ASP | 0.055 | | | | |
| 3 | Lens 2 | 2.184 | ASP | 0.572 | Plastic | 1.544 | 55.9 | 39.48 |
| 4 | | 2.207 | ASP | 0.226 | | | | |
| 5 | Lens 3 | 2.033 | ASP | 0.500 | Plastic | 1.544 | 55.9 | 3.03 |
| 6 | | −7.943 | ASP | 0.050 | | | | |
| 7 | Ape. Stop | Plano | | 0.050 | | | | |
| 8 | Lens 4 | 9.986 | ASP | 0.200 | Plastic | 1.671 | 19.5 | −5.56 |
| 9 | | 2.693 | ASP | 0.512 | | | | |
| 10 | Lens 5 | 4.739 | ASP | 0.336 | Plastic | 1.511 | 56.8 | 20.88 |
| 11 | | 8.322 | ASP | 0.511 | | | | |
| 12 | Lens 6 | −6.172 | ASP | 0.535 | Plastic | 1.544 | 55.9 | 3.63 |
| 13 | | −1.542 | ASP | 0.068 | | | | |
| 14 | Lens 7 | 2.916 | ASP | 0.553 | Plastic | 1.534 | 55.9 | −3.06 |
| 15 | | 0.977 | ASP | 0.500 | | | | |
| 16 | IR-cut filter | Plano | | 0.210 | Glass | 1.517 | 64.2 | — |
| 17 | | Plano | | 0.475 | | | | |
| 18 | Image | Plano | | — | | | | |

Reference wavelength is 587.6 nm (d-line).

TABLE 12

Aspheric Coefficients

| Surface # | 1 | 2 | 3 | 4 | 5 | 6 | 8 |
|---|---|---|---|---|---|---|---|
| k = | −1.8704E+01 | −1.7274E+01 | −1.5163E+00 | −1.7653E+00 | −6.2028E+00 | −9.0000E+01 | −9.0000E+01 |
| A4 = | 5.0950E−03 | 4.4112E−03 | −5.7433E−02 | −9.4629E−02 | 4.8835E−02 | 5.1606E−02 | 1.4976E−01 |
| A6 = | 4.2320E−05 | −8.9715E−05 | −1.9894E−03 | −2.6449E−03 | −3.6273E−02 | −1.9920E−01 | −3.2405E−01 |
| A8 = | 8.1175E−05 | 1.8732E−04 | −1.5760E−03 | 1.1968E−02 | −3.1771E−02 | 2.0501E−01 | 4.1595E−01 |
| A10 = | | | 7.9859E−04 | | 4.4258E−02 | −6.7151E−02 | −2.3584E−01 |
| A12 = | | | | | | 1.6846E−12 | 4.0705E−02 |
| A14 = | | | | | | | −1.2291E−13 |

| Surface # | 9 | 10 | 11 | 12 | 13 | 14 | 15 |
|---|---|---|---|---|---|---|---|
| k = | 5.2712E+00 | −9.0000E+01 | 3.2729E+00 | 5.6445E+00 | −5.4546E+00 | −2.9693E−01 | −4.6484E+00 |
| A4 = | 3.8605E−02 | 4.5592E−03 | −8.2926E−02 | 1.5154E−01 | 1.6043E−01 | −1.8771E−01 | −1.0925E−01 |
| A6 = | −1.4430E−01 | −3.9442E−02 | 2.3364E−02 | −2.4469E−01 | −3.8383E−01 | −1.0690E−01 | 4.0992E−02 |

TABLE 12-continued

| Aspheric Coefficients | | | | | | | |
|---|---|---|---|---|---|---|---|
| A8 = | 1.2448E−01 | 2.4960E−03 | −2.1235E−02 | 1.4486E−01 | 3.4360E−01 | 1.4977E−01 | −1.0656E−02 |
| A10 = | −2.4767E−02 | 1.5392E−02 | −1.4785E−02 | −2.0932E−02 | −1.6306E−01 | −6.0434E−02 | 1.6719E−03 |
| A12 = | −3.9295E−02 | 4.3381E−03 | 2.1482E−02 | −3.0367E−02 | 3.9100E−02 | 1.0699E−02 | −1.4799E−04 |
| A14 = | | | −5.1303E−03 | 1.1092E−02 | −3.5882E−03 | −7.1078E−04 | 4.8610E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from TABLE 11 and TABLE 12 as the following values and satisfy the following conditions:

| 6th Embodiment | | | |
|---|---|---|---|
| f (mm) | 3.76 | f/f3 | 1.243 |
| Fno | 2.20 | f/f4 | −0.677 |
| HFOV (deg.) | 36.3 | f/f5 | 0.180 |
| Nmax | 1.671 | \|f4/f5\| | 0.266 |
| V3/V4 | 2.87 | f3/f7 | −0.991 |
| CT1/CT6 | 1.15 | \|f/f1\| + \|f/f2\| | 0.150 |
| T12/CTmin | 0.27 | fG2/fG1 | 0.062 |
| (T12 + T23 + T34)/CTmin | 1.91 | Y11/Y72 | 0.94 |
| ATmax/CTmin | 2.56 | SD/TD | 0.58 |
| ATmax/CTmax | 0.83 | TL/f | 1.59 |
| CTmax/Yc72 | 0.44 | TL/ImgH | 2.13 |
| ΣAT/ΣCT | 0.44 | TL/EPD | 3.49 |
| R4/R5 | 1.09 | BL/TL | 0.20 |
| (R3 − R5)/(R3 + R5) | 0.04 | Nv30 | 2 |
| (R13 + R14)/(R13 − R14) | 2.01 | tan(HFOV) | 0.73 |
| f/f2 | 0.095 | | |

In addition, numbers of inflection points of the object-side surfaces and the image-side surfaces of the first lens element 610 (Lens 1) through the seventh lens element 670 (Lens 7) in the 6th embodiment are listed below, wherein each number is calculated for inflection points from an axial vertex to a maximum effective radius position on the corresponding surface.

| 6th Embodiment-Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 1 | 0 | 0 | 2 | 1 | 3 |
| Image-side surface | 1 | 2 | 1 | 0 | 2 | 1 | 1 |

7th Embodiment

Figure 13:
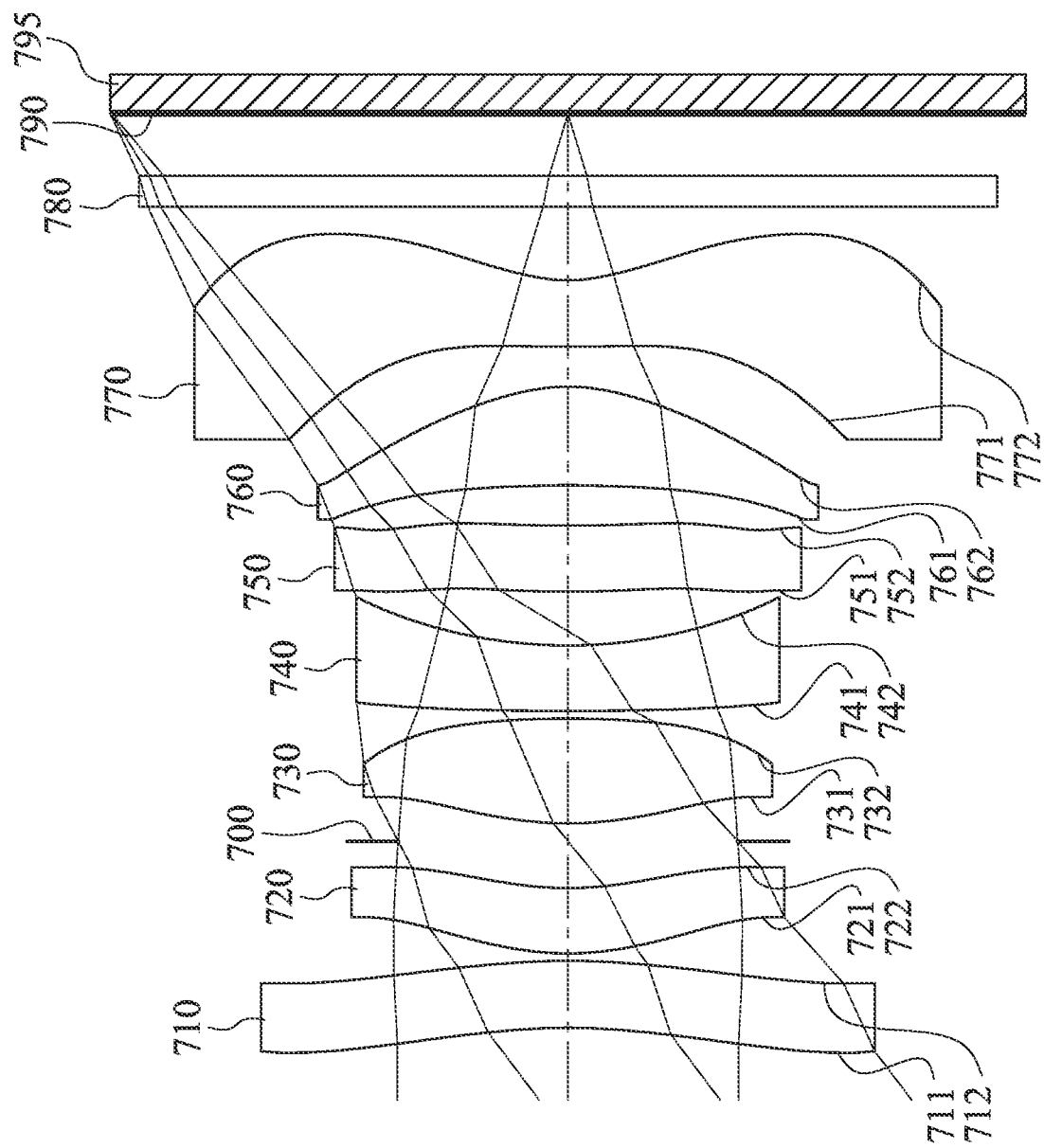
FIG. 13 is a schematic view of an image capturing apparatus according to the 7th embodiment of the present disclosure.
Figure 14:
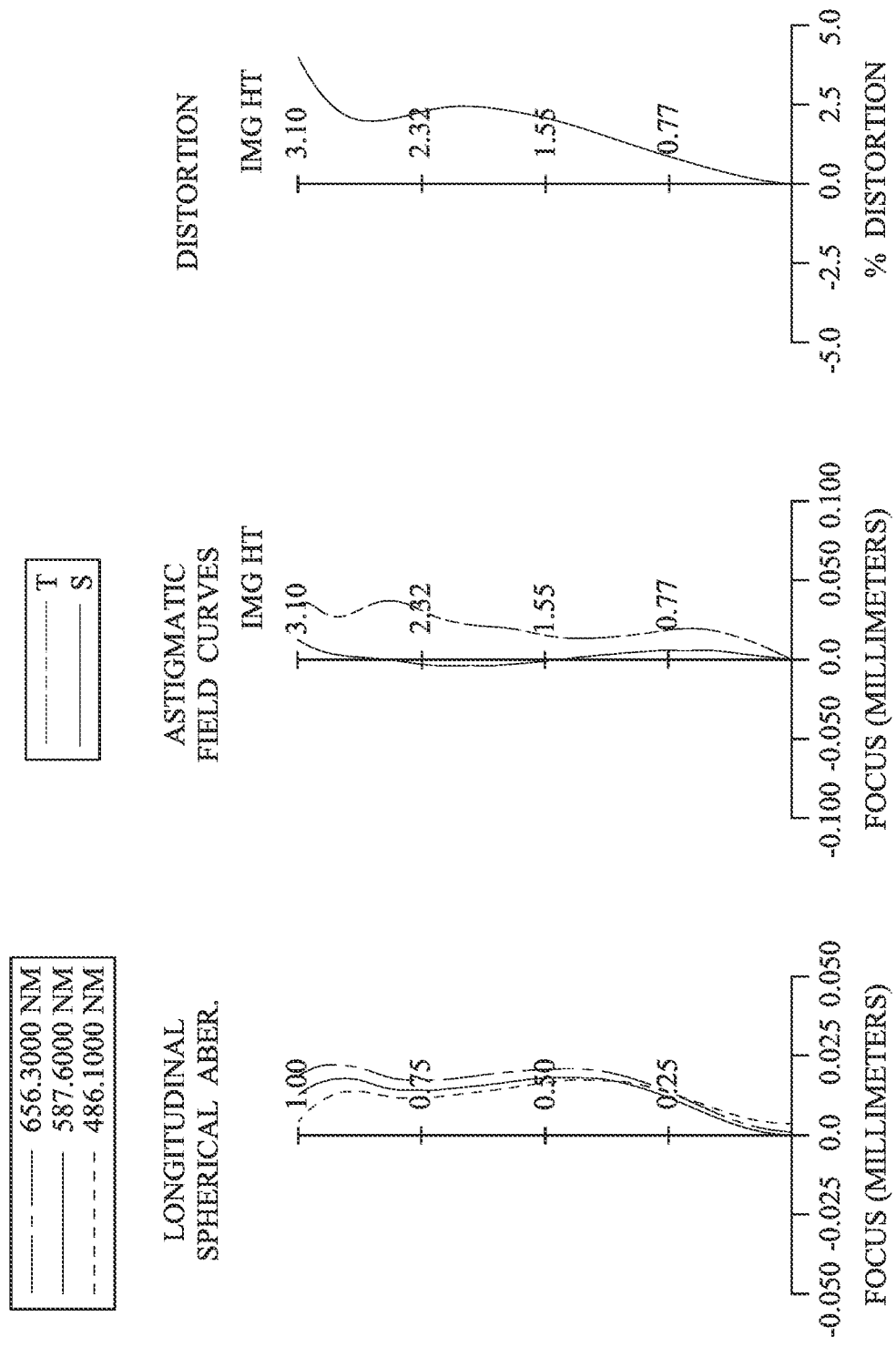
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to FIG. 13. In FIG. 13, the image capturing apparatus includes the image picking-up system (its reference numeral is omitted) and an image sensor 795. The image picking-up system includes, in order from an object side to an image side, a first lens element 710, a second lens element 720, an aperture stop 700, a third lens element 730, a fourth lens element 740, a fifth lens element 750, a sixth lens element 760, a seventh lens element 770, an IR-cut filter 780 and an image surface 790. The image sensor 795 is disposed on the image surface 790 of the image picking-up system. The image picking-up system Includes a first lens group (its reference numeral is omitted), a second lens group (its reference numeral is omitted) and a third lens group (its reference numeral is omitted), wherein the first lens group includes the first lens element 710 and the second lens element 720, the second lens group includes the third lens element 730 and the fourth lens element 740, and the third lens group includes the fifth lens element 750, the sixth lens element 760 and the seventh lens element 770. The image picking-up system Includes seven lens elements (710, 720, 730, 740, 750, 760 and 770) without additional one or more lens elements inserted between the first lens element 710 and the seventh lens element 770.

The first lens element 710 with negative refractive power has an object-side surface 711 being concave in a paraxial region thereof and an image-side surface 712 being convex in a paraxial region thereof. The first lens element 710 is made of a plastic material, and has the object-side surface 711 and the image-side surface 712 being both aspheric.

The second lens element 720 with positive refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being concave in a paraxial region thereof. The fifth lens element 750 is made of a plastic material, and has the object-side surface 751 and the image-side surface 752 being both aspheric.

The sixth lens element 760 with positive refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric.

The seventh lens element 770 with negative refractive power has an object-side surface 771 being convex in a paraxial region thereof and an image-side surface 772 being concave in a paraxial region thereof. The seventh lens element 770 is made of a plastic material, and has the object-side surface 771 and the image-side surface 772 being both aspheric. Furthermore, the image-side surface 772 of the seventh lens element 770 includes at least one convex shape in an off-axial region thereof.

The IR-cut filter 780 is made of a glass material and located between the seventh lens element 770 and the image surface 790, and will not affect the focal length of the image picking-up system.

The detailed optical data of the 7th embodiment are shown in TABLE 13 and the aspheric surface data are shown in TABLE 14 below.

TABLE 13

7th Embodiment
f = 3.93 mm, Fno = 1.70, HFOV = 37.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −4.121 | ASP | 0.454 | Plastic | 1.639 | 23.2 | −51.11 |
| 2 | | −4.919 | ASP | 0.050 | | | | |
| 3 | Lens 2 | 2.009 | ASP | 0.443 | Plastic | 1.544 | 55.9 | 19.18 |
| 4 | | 2.294 | ASP | 0.318 | | | | |
| 5 | Ape. Stop | Plano | | 0.121 | | | | |
| 6 | Lens 3 | 2.463 | ASP | 0.712 | Plastic | 1.544 | 55.9 | 3.30 |
| 7 | | −5.977 | ASP | 0.050 | | | | |
| 8 | Lens 4 | 55.728 | ASP | 0.444 | Plastic | 1.671 | 19.5 | −5.23 |
| 9 | | 3.289 | ASP | 0.364 | | | | |
| 10 | Lens 5 | 5.730 | ASP | 0.449 | Plastic | 1.511 | 56.8 | 37.82 |
| 11 | | 7.930 | ASP | 0.275 | | | | |
| 12 | Lens 6 | −6.925 | ASP | 0.668 | Plastic | 1.544 | 55.9 | 2.73 |
| 13 | | −1.265 | ASP | 0.271 | | | | |
| 14 | Lens 7 | 12.166 | ASP | 0.451 | Plastic | 1.534 | 55.9 | −2.36 |
| 15 | | 1.129 | ASP | 0.500 | | | | |
| 16 | IR-cut filter | Plano | | 0.210 | Glass | 1.517 | 64.2 | — |
| 17 | | Plano | | 0.420 | | | | |
| 18 | Image | Plano | | — | | | | |

Reference wavelength is 587.6 nm (d-line).

TABLE 14

Aspheric Coefficients

| Surface # | 1 | 2 | 3 | 4 | 6 | 7 | 8 |
|---|---|---|---|---|---|---|---|
| k = | −3.4932E+01 | −4.2229E+01 | −1.2659E+00 | −1.0602E+00 | −6.8367E+00 | −9.0000E+01 | −2.7820E+01 |
| A4 = | −1.4829E−03 | −4.1333E−03 | −6.5110E−02 | −9.9337E−02 | 1.1449E−02 | −2.4295E−03 | 6.6588E−02 |
| A6 = | 2.6026E−03 | 4.3582E−03 | 2.1164E−02 | 2.2378E−02 | −2.9721E−02 | −1.0599E−01 | −1.2652E−01 |
| A8 = | −4.2301E−04 | −1.0768E−03 | −1.6518E−02 | −1.3467E−02 | 2.3685E−03 | 8.9346E−02 | 1.1508E−01 |
| A10 = | 4.0904E−05 | 1.3236E−04 | 3.7607E−03 | 4.3572E−03 | 5.3958E−04 | −3.5575E−02 | −5.1208E−02 |
| A12 = | | | | | | 5.1224E−03 | 1.0236E−02 |
| A14 = | | | | | | | −5.7273E−04 |

| Surface # | 9 | 10 | 11 | 12 | 13 | 14 | 15 |
|---|---|---|---|---|---|---|---|
| k = | 3.4383E+00 | −8.9992E+01 | −1.8543E+01 | 1.1565E+01 | −5.4318E+00 | 5.2683E+00 | −4.6409E+00 |
| A4 = | −1.9716E−02 | −4.2053E−02 | −4.6387E−02 | 4.8332E−02 | −3.2788E−02 | −6.7773E−02 | −8.5343E−02 |
| A6 = | 7.4464E−03 | −2.4744E−02 | −1.6792E−02 | 7.1987E−03 | 4.8089E−02 | −7.4459E−02 | 3.1162E−02 |
| A8 = | −1.4737E−02 | 4.8701E−03 | −2.6146E−02 | −1.3000E−01 | −8.4033E−02 | 7.4230E−02 | −7.9319E−03 |
| A10 = | 1.0061E−02 | 1.9636E−02 | 4.3531E−02 | 1.4043E−01 | 6.7015E−02 | −2.8597E−02 | 1.3100E−03 |
| A12 = | −2.7274E−03 | −6.6914E−03 | −1.5457E−02 | −6.4840E−02 | −2.4838E−02 | 4.9408E−03 | −1.5997E−04 |
| A14 = | | | 1.5506E−03 | 1.3905E−02 | 3.8886E−03 | −2.7267E−04 | 1.2962E−05 |
| A16 = | | | | −1.1170E−03 | −1.4595E−04 | −8.2399E−06 | −4.8958E−07 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 3.93 | f/f3 | 1.189 |
| Fno | 1.70 | f/f4 | −0.751 |
| HFOV (deg.) | 37.1 | f/f5 | 0.104 |
| Nmax | 1.671 | \|f4/F5\| | 0.138 |
| V3/V4 | 2.87 | f3/f7 | −1.397 |
| CT1/CT6 | 0.68 | \|f/f1\| + \|f/f2\| | 0.282 |
| T12/CTmin | 0.11 | fG2/fG1 | 0.223 |
| (T12 + T23 + T34)/CTmin | 1.22 | Y11/Y72 | 0.82 |
| ATmax/CTmin | 0.99 | SD/TD | 0.75 |
| ATmax/CTmax | 0.62 | TL/f | 1.58 |
| CTmax/Yc72 | 0.45 | TL/ImgH | 2.00 |
| ΣAT/ΣCT | 0.40 | TL/EPD | 2.68 |
| R4/R5 | 0.93 | BL/TL | 0.18 |
| (R3 − R5)/(R3 + R5) | −0.10 | Nv30 | 2 |
| (R13 + R14)/(R13 − R14) | 1.20 | tan(HFOV) | 0.76 |
| f/f2 | 0.205 | | |

In addition, numbers of inflection points of the object-side surfaces and the image-side surfaces of the first lens element 710 (Lens 1) through the seventh lens element 770 (Lens 7) in the 7th embodiment are listed below, wherein each number is calculated for inflection points from an axial vertex to a maximum effective radius position on the corresponding surface.

| 7th Embodiment-Number of inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 1 | 1 | 1 | 0 | 3 | 1 | 2 |
| Image-side surface | 1 | 1 | 0 | 0 | 3 | 1 | 1 |

8th Embodiment

Figure 15:
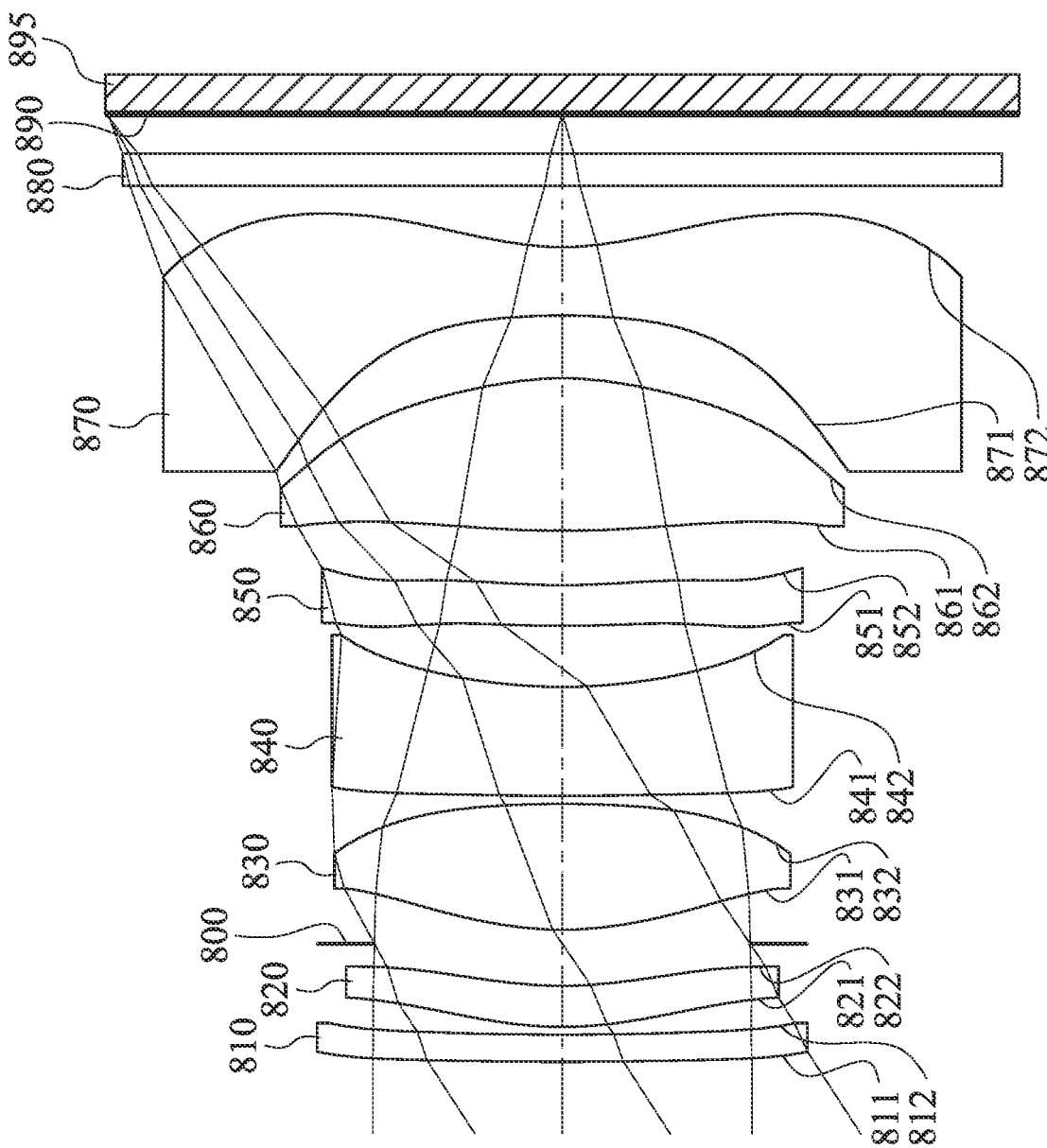
FIG. 15 is a schematic view of an image capturing apparatus according to the 8th embodiment of the present disclosure.
Figure 16:
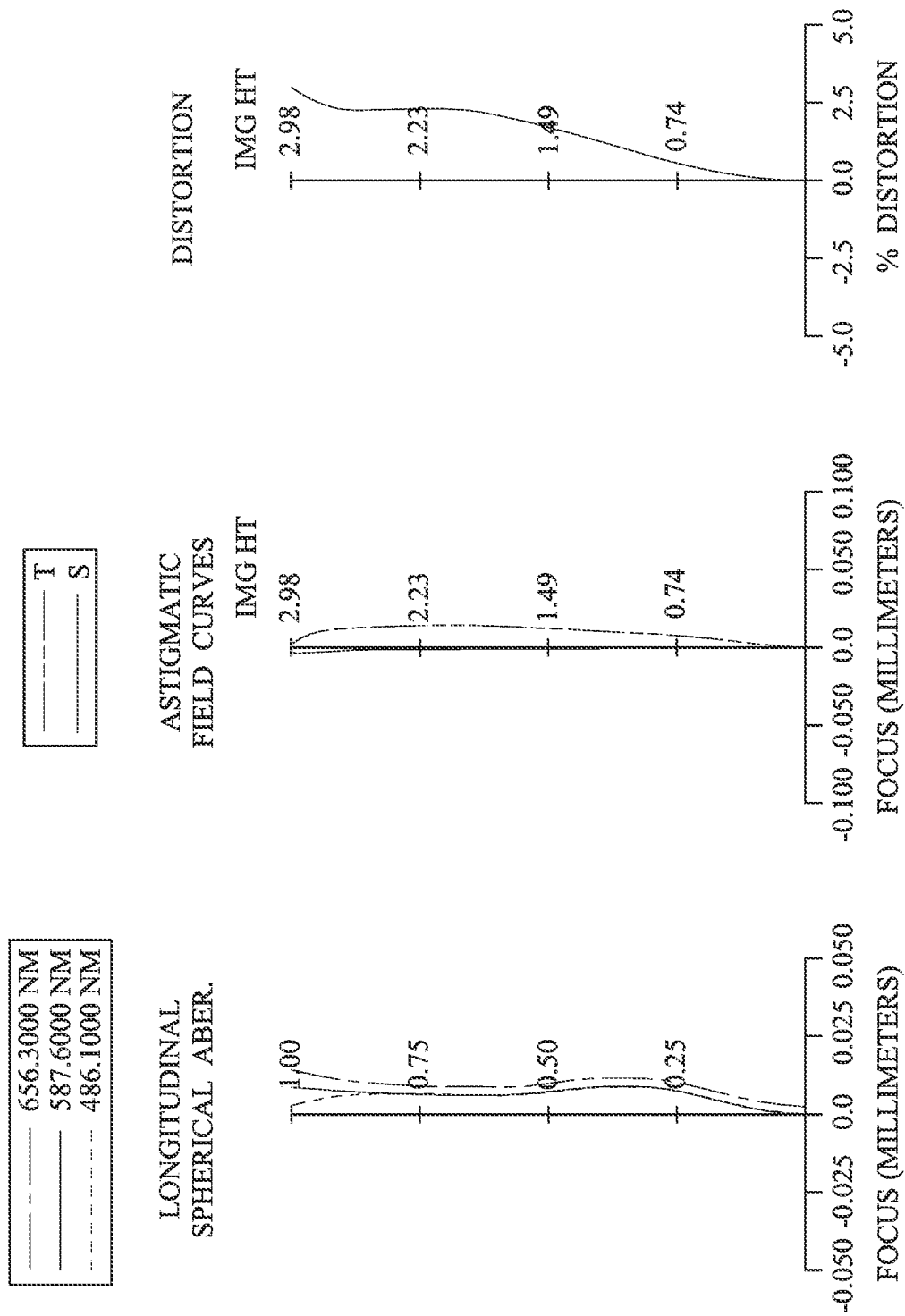
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows, in order from left to right, spherical aberration curves, astigmatic field curves and a distortion curve of the image capturing apparatus according to FIG. 15. In FIG. 15, the image capturing apparatus includes the image picking-up system (its reference numeral is omitted) and an image sensor 895. The image picking-up system includes, in order from an object side to an image side, a first lens element 810, a second lens element 820, an aperture stop 800, a third lens element 830, a fourth lens element 840, a fifth lens element 850, a sixth lens element 860, a seventh lens element 870, an IR-cut filter 880 and an image surface 890. The image sensor 895 is disposed on the image surface 890 of the image picking-up system. The image picking-up system includes a first lens group (its reference numeral is omitted), a second lens group (its reference numeral is omitted) and a third lens group (its reference numeral is omitted), wherein the first lens group includes the first lens element 810 and the second lens element 820, the second lens group Includes the third lens element 830 and the fourth lens element 840, and the third lens group Includes the fifth lens element 850, the sixth lens element 860 and the seventh lens element 870. The image picking-up system includes seven lens elements (810, 820, 830, 840, 850, 860 and 870) without additional one or more lens elements inserted between the first lens element 810 and the seventh lens element 870.

The first lens element 810 with negative refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being convex in a paraxial region thereof and an image-side surface 842 being concave in a paraxial region thereof. The fourth lens element 840 is made of a plastic material, and has the object-side surface 841 and the image-side surface 842 being both aspheric.

The fifth lens element 850 with negative refractive power has an object-side surface 851 being convex in a paraxial region thereof and an image-side surface 852 being concave in a paraxial region thereof. The fifth lens element 850 is made of a plastic material, and has the object-side surface 851 and the image-side surface 852 being both aspheric.

The sixth lens element 860 with positive refractive power has an object-side surface 861 being convex in a paraxial region thereof and an image-side surface 862 being convex in a paraxial region thereof. The sixth lens element 860 is made of a plastic material, and has the object-side surface 861 and the image-side surface 862 being both aspheric.

The seventh lens element 870 with negative refractive power has an object-side surface 871 being concave in a paraxial region thereof and an image-side surface 872 being concave in a paraxial region thereof. The seventh lens element 870 is made of a plastic material, and has the object-side surface 871 and the image-side surface 872 being both aspheric. Furthermore, the image-side surface 872 of the seventh lens element 870 includes at least one convex shape in an off-axial region thereof.

The IR-cut filter 880 is made of a glass material and located between the seventh lens element 870 and the image surface 890, and will not affect the focal length of the image picking-up system.

The detailed optical data of the 8th embodiment are shown in TABLE 15 and the aspheric surface data are shown in TABLE 16 below.

TABLE 15

8th Embodiment f = 4.46 mm, Fno = 1.80, HFOV = 32.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 37.661 | ASP | 0.177 | Plastic | 1.639 | 23.2 | −91.49 |
| 2 | | 22.859 | ASP | 0.053 | | | | |
| 3 | Lens 2 | 2.609 | ASP | 0.267 | Plastic | 1.544 | 55.9 | 65.57 |
| 4 | | 2.714 | ASP | 0.275 | | | | |
| 5 | Ape. Stop | Plano | | 0.092 | | | | |
| 6 | Lens 3 | 2.380 | ASP | 0.824 | Plastic | 1.544 | 55.9 | 3.32 |
| 7 | | −6.598 | ASP | 0.051 | | | | |
| 8 | Lens 4 | 24.553 | ASP | 0.712 | Plastic | 1.671 | 19.5 | −6.20 |
| 9 | | 3.515 | ASP | 0.398 | | | | |
| 10 | Lens 5 | 5.961 | ASP | 0.267 | Plastic | 1.511 | 56.8 | −42.95 |
| 11 | | 4.616 | ASP | 0.358 | | | | |
| 12 | Lens 6 | 8.300 | ASP | 0.995 | Plastic | 1.544 | 55.9 | 3.24 |
| 13 | | −2.147 | ASP | 0.411 | | | | |
| 14 | Lens 7 | −4.801 | ASP | 0.448 | Plastic | 1.534 | 55.9 | −2.46 |
| 15 | | 1.867 | ASP | 0.400 | | | | |
| 16 | IR-cut filter | Plano | | 0.210 | Glass | 1.517 | 64.2 | — |
| 17 | | Plano | | 0.262 | | | | |
| 18 | Image | Plano | | — | | | | |

Reference wavelength is 587.6 nm (d-line).

TABLE 16

Aspheric Coefficients

| Surface # | 1 | 2 | 3 | 4 | 6 | 7 | 8 |
|---|---|---|---|---|---|---|---|
| k = | −3.4934E + 01 | −4.2229E + 01 | −8.8012E − 01 | −5.7180E − 01 | −5.6518E + 00 | −9.0000E + 01 | −2.7820E + 01 |
| A4 = | 6.7354E − 03 | 8.9869E − 03 | −5.7022E − 02 | −9.8243E − 02 | 9.3666E − 03 | −3.7682E − 02 | 4.4672E − 03 |
| A6 = | −1.2806E − 02 | −1.6777E − 02 | 1.8073E − 02 | 3.5960E − 02 | −1.4238E − 02 | −1.4261E − 02 | −2.6670E − 02 |
| A8 = | 7.5696E − 03 | 9.5872E − 03 | −1.6556E − 02 | −2.1159E − 02 | 2.8342E − 03 | 1.3530E − 02 | 2.7706E − 02 |
| A10 = | −1.1094E − 03 | −1.3135E − 03 | 4.7881E − 03 | 6.1334E − 03 | −6.2964E − 04 | −5.4354E − 03 | −1.1612E − 02 |
| A12 = | | | | | | 6.5566E − 04 | 2.2085E − 03 |
| A14 = | | | | | | | −1.1380E − 04 |

| Surface # | 9 | 10 | 11 | 12 | 13 | 14 | 15 |
|---|---|---|---|---|---|---|---|
| k = | 3.6556E + 00 | −8.9992E + 01 | −1.8543E + 01 | 1.1565E + 01 | −5.4313E + 00 | −3.2574E + 01 | −4.6563E + 00 |
| A4 = | −2.9255E − 02 | −7.3597E − 02 | −8.6835E − 02 | 6.2553E − 02 | 4.8130E − 02 | −6.2446E − 02 | −7.8432E − 02 |
| A6 = | 1.6776E − 02 | −4.9627E − 03 | 1.5225E − 02 | −2.8197E − 02 | −5.8892E − 02 | −4.6059E − 02 | 2.8195E − 02 |
| A8 = | −1.4720E − 02 | 2.9900E − 02 | 4.0614E − 03 | 6.9331E − 03 | 2.9547E − 02 | 4.1114E − 02 | −7.3600E − 03 |
| A10 = | 8.9558E − 03 | −6.3732E − 03 | 1.3227E − 02 | 3.9998E − 03 | −1.1715E − 02 | −1.6148E − 02 | 1.3201E − 03 |
| A12 = | −2.0076E − 03 | −4.1913E − 04 | −7.7922E − 03 | −3.1370E − 03 | 3.2458E − 03 | 3.0402E − 03 | −1.7136E − 04 |
| A14 = | | | 1.1034E − 03 | 8.2779E − 04 | −5.6477E − 04 | −2.0182E − 04 | 1.4320E − 05 |
| A16 = | | | | −8.2439E − 05 | 4.9270E − 05 | −2.0660E − 06 | −5.5181E − 07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from TABLE 15 and TABLE 16 as the following values and satisfy the following conditions:

| 8th Embodiment | | | |
|---|---|---|---|
| f (mm) | 4.46 | f/f3 | 1.341 |
| Fno | 1.80 | f/f4 | −0.719 |
| HFOV (deg.) | 32.9 | f/f5 | −0.104 |
| Nmax | 1.671 | |f4/f5| | 0.144 |
| V3/V4 | 2.87 | f3/f7 | −1.350 |
| CT1/CT6 | 0.18 | |f/f1| + |f/f2| | 0.117 |
| T12/CTmin | 0.30 | fG2/fG1 | 0.021 |
| (T12 + T23 + T34)/CTmin | 2.66 | Y11/Y72 | 0.61 |
| ATmax/CTmin | 2.32 | SD/TD | 0.86 |
| ATmax/CTmax | 0.41 | TL/f | 1.39 |
| CTmax/Yc72 | 0.64 | TL/ImgH | 2.08 |
| ΣAT/ΣCT | 0.44 | TL/EPD | 2.50 |
| R4/R5 | 1.14 | BL/TL | 0.14 |
| (R3 − R5)/(R3 + R5) | 0.05 | Nv30 | 2 |
| (R13 + R14)/(R13 − R14) | 0.44 | tan(HFOV) | 0.65 |
| f/f2 | 0.068 | | |

In addition, numbers of Inflection points of the object-side surfaces and the image-side surfaces of the first lens element 810 (Lens 1) through the seventh lens element 870 (Lens 7)

in the 8th embodiment are listed below, wherein each number is calculated for inflection points from an axial vertex to a maximum effective radius position on the corresponding surface.

| 8th Embodiment - Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 0 | 2 | 1 | 0 | 3 | 1 | 1 |
| Image-side surface | 0 | 2 | 0 | 0 | 3 | 1 | 1 |

9th Embodiment

Figure 17:
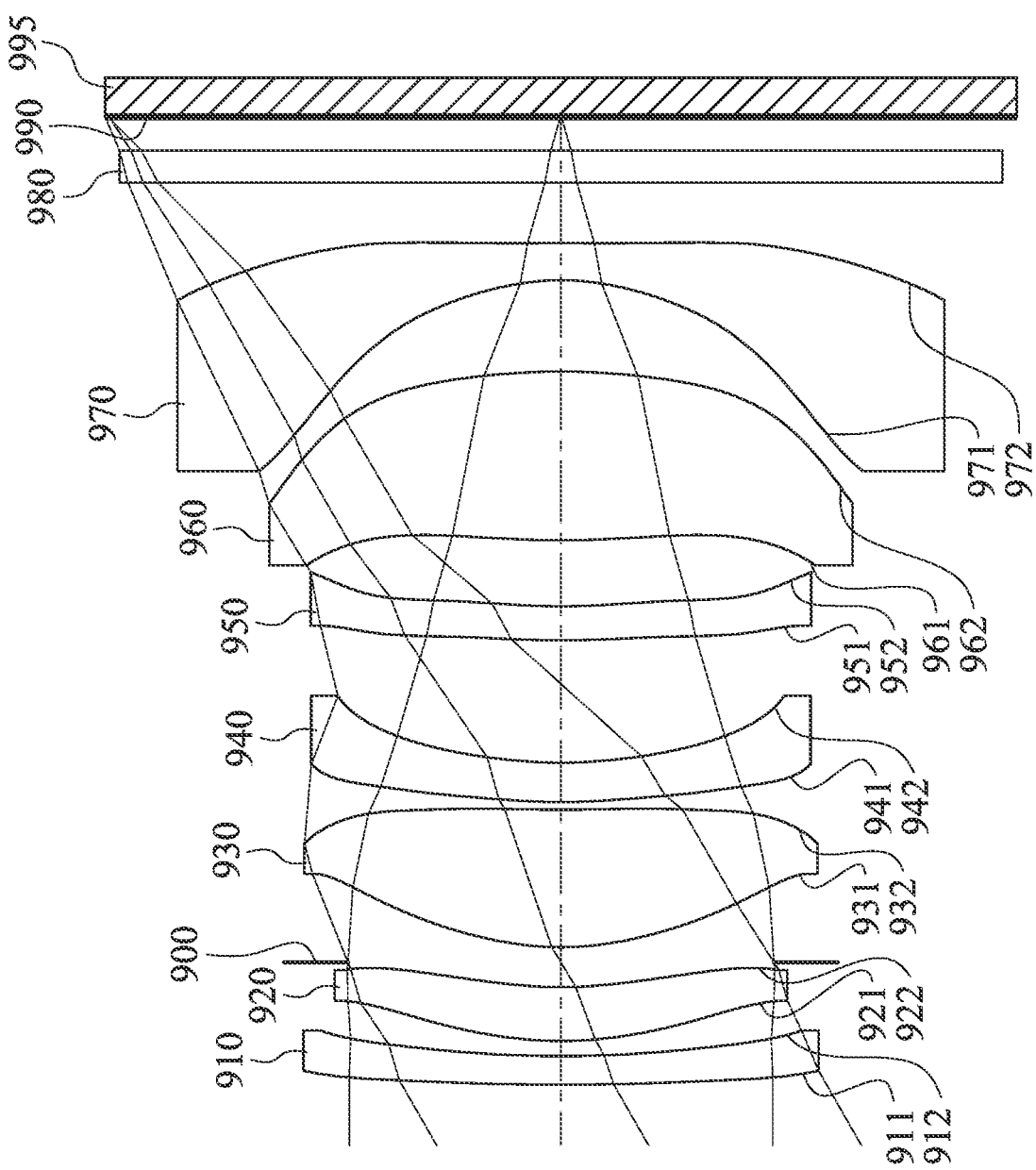
FIG. 17 is a schematic view of an image capturing apparatus according to the 9th embodiment of the present disclosure.
Figure 18:
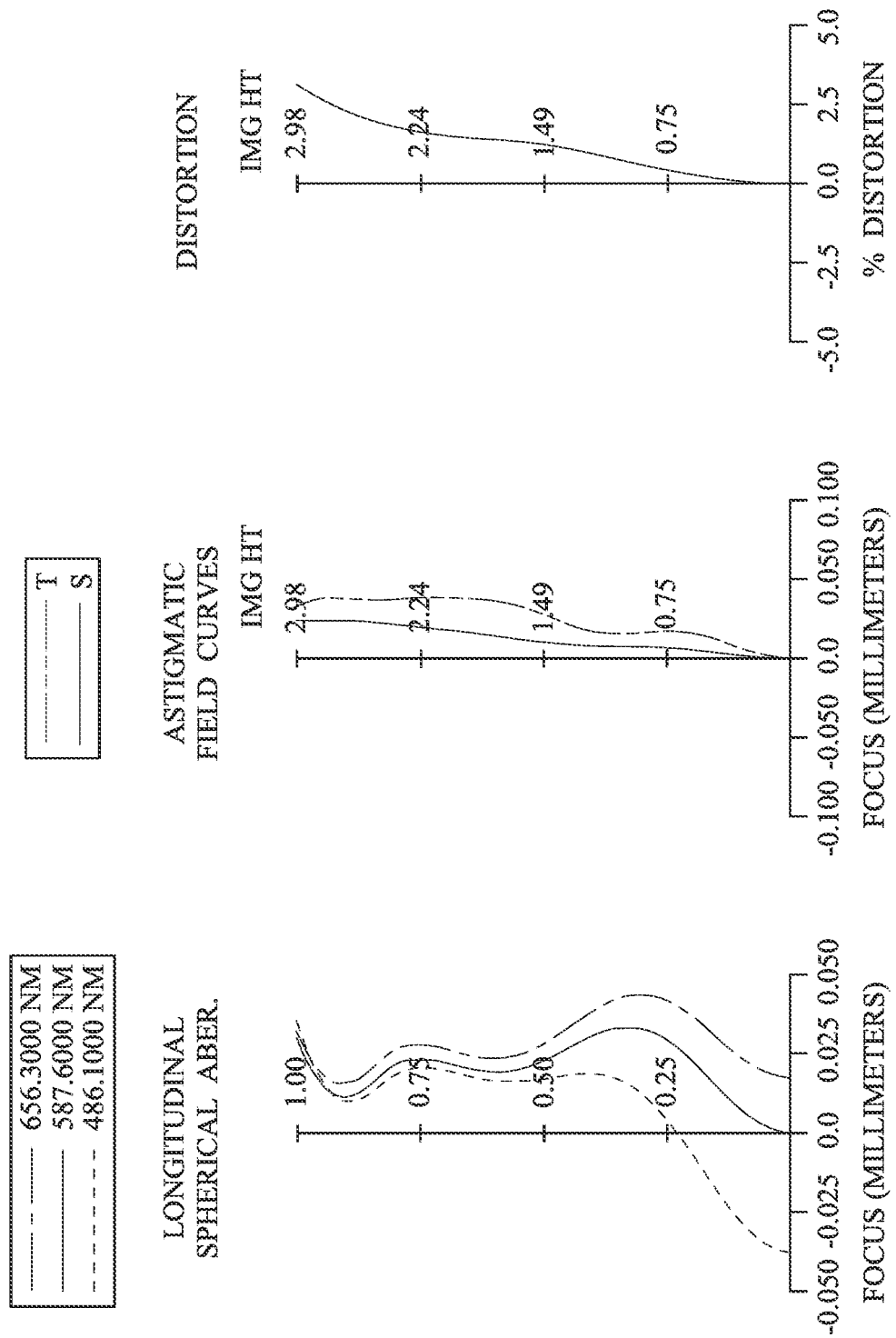
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows, in order from left to right, spherical aberration curves, astigmatic field curves and a distortion curve of the image capturing apparatus according to FIG. 17. In FIG. 17, the image capturing apparatus includes the image picking-up system (its reference numeral is omitted) and an image sensor 995. The image picking-up system includes, in order from an object side to an image side, a first lens element 910, a second lens element 920, an aperture stop 900, a third lens element 930, a fourth lens element 940, a fifth lens element 950, a sixth lens element 960, a seventh lens element 970, an IR-cut filter 980 and an image surface 990. The image sensor 995 is disposed on the image surface 990 of the image picking-up system. The image picking-up system includes a first lens group (its reference numeral is omitted), a second lens group (its reference numeral is omitted) and a third lens group (its reference numeral is omitted), wherein the first lens group includes the first lens element 910 and the second lens element 920, the second lens group includes the third lens element 930 and the fourth lens element 940, and the third lens group includes the fifth lens element 950, the sixth lens element 960 and the seventh lens element 970. The image picking-up system includes seven lens elements (910, 920, 930, 940, 950, 960 and 970) without additional one or more lens elements inserted between the first lens element 910 and the seventh lens element 970.

The first lens element 910 with negative refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric.

The second lens element 920 with positive refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being concave in a paraxial region thereof. The third lens element 930 is made of a plastic material, and has the object-side surface 931 and the image-side surface 932 being both aspheric.

The fourth lens element 940 with negative refractive power has an object-side surface 941 being convex in a paraxial region thereof and an image-side surface 942 being concave in a paraxial region thereof. The fourth lens element 940 is made of a plastic material, and has the object-side surface 941 and the image-side surface 942 being both aspheric.

The fifth lens element 950 with negative refractive power has an object-side surface 951 being convex in a paraxial region thereof and an image-side surface 952 being concave in a paraxial region thereof. The fifth lens element 950 is made of a plastic material, and has the object-side surface 951 and the image-side surface 952 being both aspheric.

The sixth lens element 960 with positive refractive power has an object-side surface 961 being convex in a paraxial region thereof and an image-side surface 962 being convex in a paraxial region thereof. The sixth lens element 960 is made of a plastic material, and has the object-side surface 961 and the image-side surface 962 being both aspheric.

The seventh lens element 970 with negative refractive power has an object-side surface 971 being concave in a paraxial region thereof and an image-side surface 972 being convex in a paraxial region thereof. The seventh lens element 970 is made of a plastic material, and has the object-side surface 971 and the image-side surface 972 being both aspheric. Furthermore, the image-side surface 972 of the seventh lens element 970 includes at least one convex shape in an off-axial region thereof.

The IR-cut filter 980 is made of a glass material and located between the seventh lens element 970 and the image surface 990, and will not affect the focal length of the image picking-up system.

The detailed optical data of the 9th embodiment are shown in TABLE 17 and the aspheric surface data are shown in TABLE 18 below.

TABLE 17

9th Embodiment f = 5.03 mm, Fno = 1.80, HFOV = 29.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 17.055 | ASP | 0.190 | Plastic | 1.639 | 23.2 | −28.47 |
| 2 | | 8.763 | ASP | 0.100 | | | | |
| 3 | Lens 2 | 2.623 | ASP | 0.356 | Plastic | 1.544 | 55.9 | 47.96 |
| 4 | | 2.777 | ASP | 0.164 | | | | |

TABLE 17-continued

9th Embodiment f = 5.03 mm, Fno = 1.80, HFOV = 29.8 deg.

| Surface # | | Curvature Radius | | Thickness | Material | Index | Abbe # | Focal Length |
|---|---|---|---|---|---|---|---|---|
| 5 | Ape. Stop | Plano | | 0.100 | | | | |
| 6 | Lens 3 | 1.981 | ASP | 0.909 | Plastic | 1.544 | 55.9 | 4.54 |
| 7 | | 8.366 | ASP | 0.050 | | | | |
| 8 | Lens 4 | 3.071 | ASP | 0.261 | Plastic | 1.671 | 19.5 | −53.40 |
| 9 | | | ASP | 0.808 | | | | |
| 10 | Lens 5 | 5.386 | ASP | 0.225 | Plastic | 1.511 | 56.8 | −31.58 |
| 11 | | 3.981 | ASP | 0.437 | | | | |
| 12 | Lens 6 | 6.024 | ASP | 1.115 | Plastic | 1.544 | 55.9 | 4.98 |
| 13 | | −4.612 | ASP | 0.604 | | | | |
| 14 | Lens 7 | −1.624 | ASP | 0.245 | Plastic | 1.534 | 55.9 | −3.19 |
| 15 | | −35.714 | ASP | 0.400 | | | | |
| 16 | IR-cut filter | Plano | | 0.210 | Glass | 1.517 | 64.2 | — |
| 17 | | Plano | | 0.225 | | | | |
| 18 | Image | Plano | | — | | | | |

Reference wavelength is 587.6 nm (d-line).

TABLE 18

Aspheric Coefficients

| Surface # | 1 | 2 | 3 | 4 | 6 | 7 | 8 |
|---|---|---|---|---|---|---|---|
| k = | −3.4934E + 01 | −4.2370E + 01 | −5.0519E − 02 | −3.8361E − 01 | −3.7686E + 00 | −8.9603E + 01 | −2.7279E + 01 |
| A4 = | 8.1544E − 03 | 2.9446E − 02 | −3.2411E − 02 | −1.2015E − 01 | −1.2952E − 02 | −1.5784E − 01 | −1.2944E − 01 |
| A6 = | −1.8116E − 02 | −3.1380E − 02 | 1.1916E − 02 | 7.0322E − 02 | 1.2982E − 02 | 1.9450E − 01 | 1.8699E − 01 |
| A8 = | 9.8382E − 03 | 1.3095E − 02 | −9.9394E − 03 | −3.0051E − 02 | 2.2270E − 03 | −1.1487E − 01 | −1.0870E − 01 |
| A10 = | −1.7835E − 03 | −1.5525E − 03 | 1.4148E − 03 | 4.3470E − 03 | −2.0795E − 03 | 3.0343E − 02 | 2.4030E − 02 |
| A12 = | 9.9399E − 05 | | | | | −3.1207E − 03 | 1.5088E − 04 |
| A14 = | | | | | | | −4.1799E − 04 |

| Surface # | 9 | 10 | 11 | 12 | 13 | 14 | 15 |
|---|---|---|---|---|---|---|---|
| k = | 2.7373E + 00 | −8.9741E + 01 | −1.8580E + 01 | 1.1322E + 01 | −5.3713E + 00 | −4.8372E + 00 | −4.6564E + 00 |
| A4 = | −8.2127E − 02 | −5.8663E − 02 | −1.2105E − 01 | −6.2483E − 02 | −1.9636E − 03 | −1.6754E − 02 | 6.1171E − 02 |
| A6 = | 8.2677E − 02 | 1.6093E − 02 | 9.1385E − 02 | 2.3129E − 02 | 9.3172E − 03 | 4.1616E − 03 | −6.4107E − 02 |
| A8 = | −4.7292E − 02 | 2.2265E − 02 | −5.1490E − 02 | −4.2024E − 02 | −3.0281E − 02 | −4.5848E − 02 | 2.6253E − 02 |
| A10 = | 1.1704E − 02 | −1.0773E − 02 | 3.6125E − 02 | 3.6979E − 02 | 1.7123E − 02 | 3.3391E − 02 | −5.9641E − 03 |
| A12 = | −4.3895E − 04 | 1.1272E − 03 | −1.3288E − 02 | −1.8384E − 02 | −4.8942E − 03 | −1.0901E − 02 | 7.8766E − 04 |
| A14 = | | | 1.7020E − 03 | 4.8636E − 03 | 7.1616E − 04 | 1.8087E − 03 | −5.6801E − 05 |
| A16 = | | | | −5.4087E − 04 | −4.0176E − 05 | −1.2242E − 04 | 1.7260E − 06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again. It is noted that the image-side surface 972 of the seventh lens element 970 includes two critical points in the off-axial region thereof, thereby two values of parameter CTmax/Yc72 from left to right in the following table respectively refer to the corresponding values from an optical axis to a maximum effective radius position.

Moreover, these parameters can be calculated from TABLE 17 and TABLE 18 as the following values and satisfy the following conditions:

| 9th Embodiment | | | |
|---|---|---|---|
| f (mm) | 5.03 | f/f3 | 1.108 |
| Fno | 1.80 | f/f4 | −0.094 |
| HFOV (deg.) | 29.8 | f/f5 | −0.159 |

| 9th Embodiment | | | |
|---|---|---|---|
| Nmax | 1.671 | |f4/f5| | 1.691 |
| V3/V4 | 2.87 | f3/f7 | −1.422 |
| CT1/CT6 | 0.17 | |f/f1| + |f/f2| | 0.282 |
| T12/CTmin | 0.53 | fG2/fG1 | −0.075 |
| (T12 + T23 + T34)/CTmin | 2.18 | Y11/Y72 | 0.67 |
| ATmax/CTmin | 4.25 | SD/TD | 0.85 |
| ATmax/GTmax | 0.72 | TL/f | 1.27 |
| CTmax/Yc72 | 2.899  1.181 | TL/ImgH | 2.14 |
| ΣAT/ΣCT | 0.69 | TL/EPD | 2.29 |
| R4/R5 | 1.40 | BL/TL | 0.13 |
| (R3 − R5)/(R3 + R5) | 0.14 | Nv30 | 2 |
| (R13 + R14)/(R13 − R14) | −1.10 | tan(HFOV) | 0.57 |
| f/f2 | 0.105 | | |

In addition, numbers of Inflection points of the object-side surfaces and the image-side surfaces of the first lens element 910 (Lens 1) through the seventh lens element 970 (Lens 7) in the 9th embodiment are listed below, wherein each number is calculated for inflection points from an axial vertex to a maximum effective radius position on the corresponding surface.

| 9th Embodiment - Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 0 | 1 | 1 | 2 | 3 | 2 | 2 |
| Image-side surface | 0 | 1 | 1 | 0 | 4 | 1 | 2 |

10th Embodiment

Figure 19:
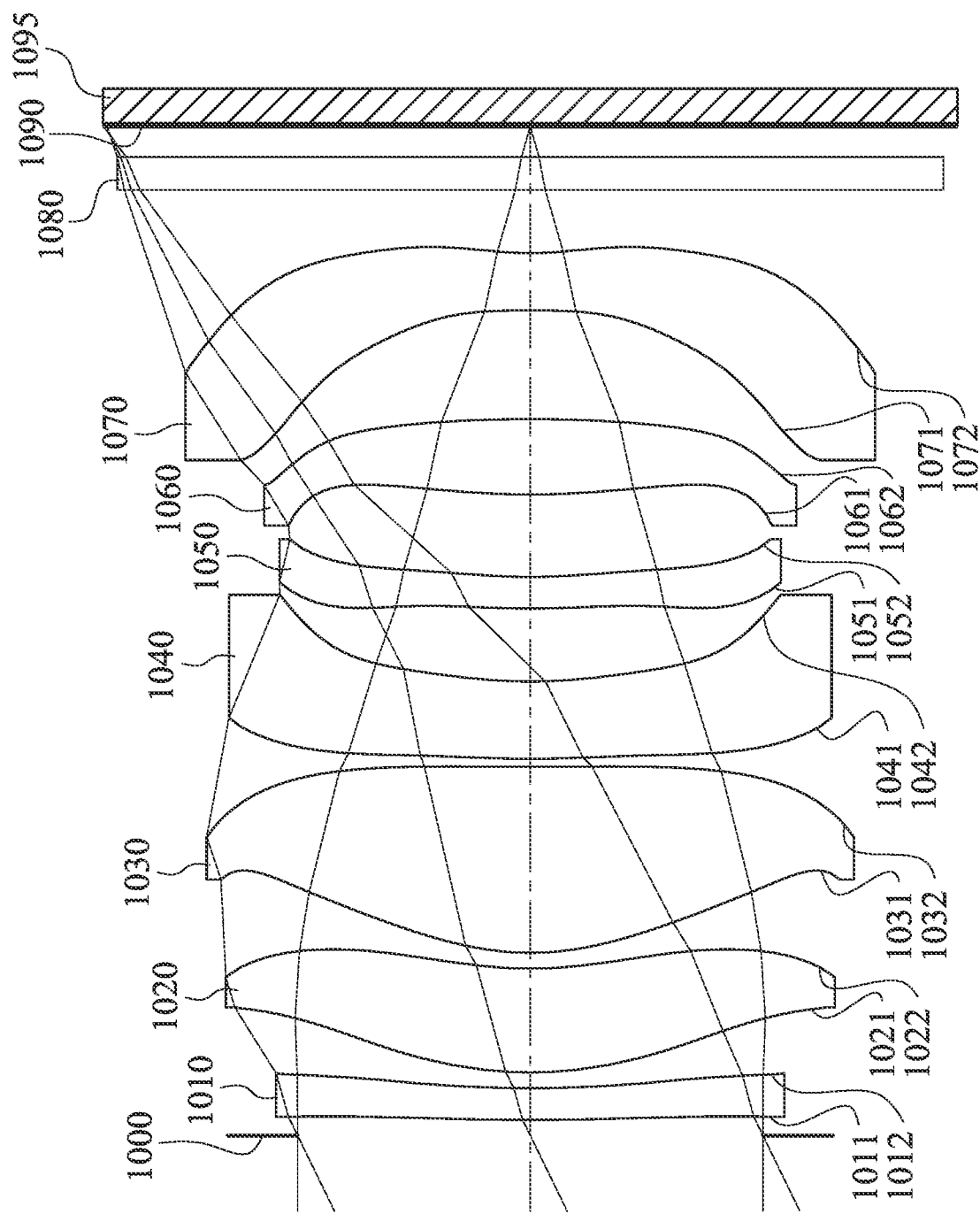
FIG. 19 is a schematic view of an image capturing apparatus according to the 10th embodiment of the present disclosure.
Figure 20:
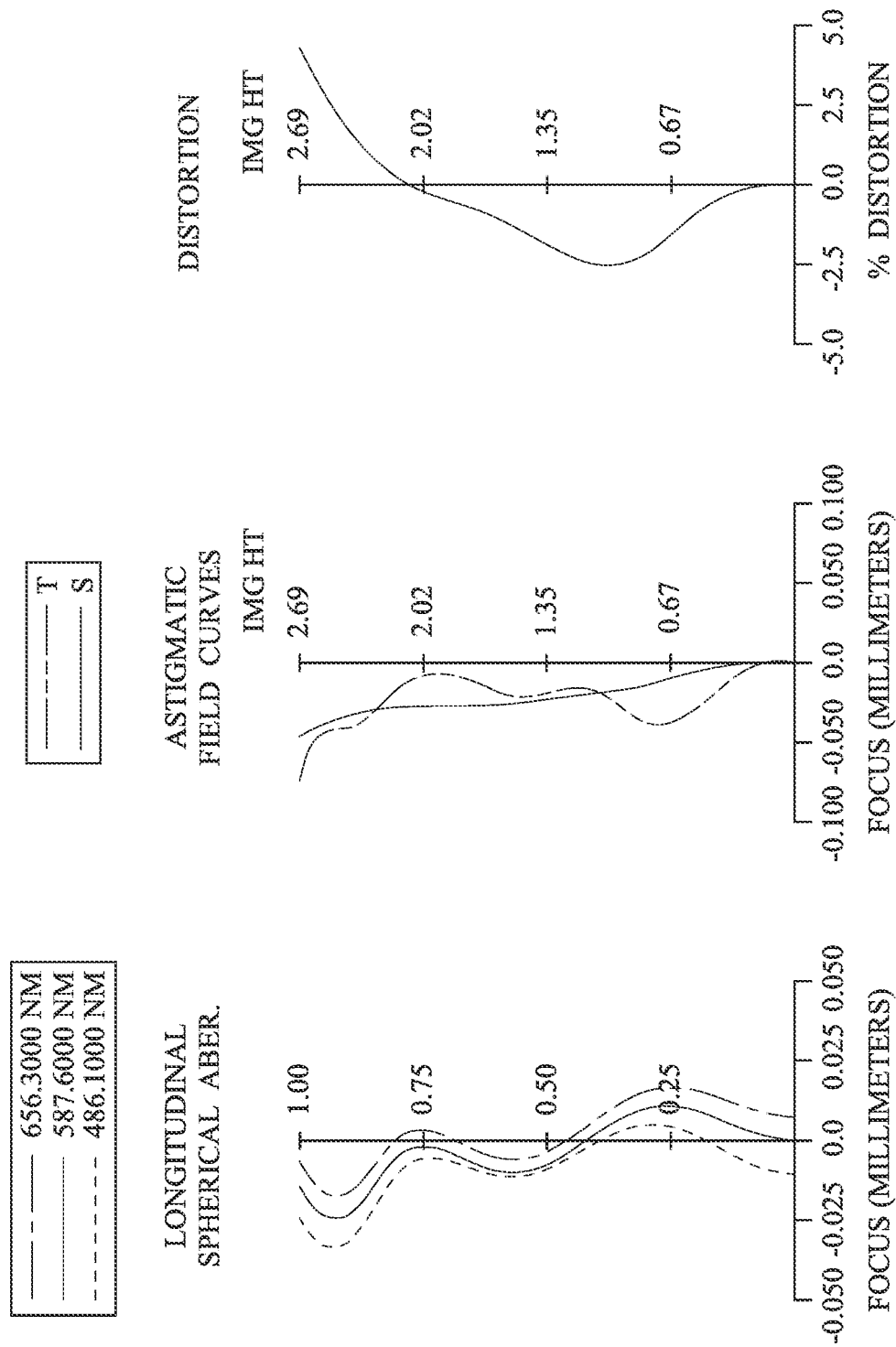
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows, in order from left to right, spherical aberration curves, astigmatic field curves and a distortion curve of the image capturing apparatus according to FIG. 19. In FIG. 19, the image capturing apparatus Includes the image picking-up system (its reference numeral is omitted) and an image sensor 1095. The image picking-up system includes, in order from an object side to an image side, an aperture stop 1000, a first lens element 1010, a second lens element 1020, a third lens element 1030, a fourth lens element 1040, a fifth lens element 1050, a sixth lens element 1060, a seventh lens element 1070, an IR-cut filter 1080 and an image surface 1090. The image sensor 1095 is disposed on the image surface 1090 of the image picking-up system. The image picking-up system Includes a first lens group (its reference numeral is omitted), a second lens group (Its reference numeral is omitted) and a third lens group (Its reference numeral is omitted), wherein the first lens group includes the first lens element 1010 and the second lens element 1020, the second lens group includes the third lens element 1030 and the fourth lens element 1040, and the third lens group Includes the fifth lens element 1050, the sixth lens element 1060 and the seventh lens element 170. The image picking-up system Includes seven lens elements (1010, 1020, 1030, 1040, 1050, 1060 and 1070) without additional one or more lens elements inserted between the first lens element 1010 and the seventh lens element 1070.

The first lens element 1010 with negative refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with positive refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being concave in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being convex in a paraxial region thereof and an image-side surface 1042 being concave in a paraxial region thereof. The fourth lens element 1040 is made of a plastic material, and has the object-side surface 1041 and the image-side surface 1042 being both aspheric.

The fifth lens element 1050 with negative refractive power has an object-side surface 1051 being convex in a paraxial region thereof and an image-side surface 1052 being concave in a paraxial region thereof. The fifth lens element 1050 is made of a plastic material, and has the object-side surface 1051 and the image-side surface 1052 being both aspheric.

The sixth lens element 1060 with positive refractive power has an object-side surface 1061 being convex in a paraxial region thereof and an image-side surface 1062 being convex in a paraxial region thereof. The sixth lens element 1060 is made of a plastic material, and has the object-side surface 1061 and the image-side surface 162 being both aspheric.

The seventh lens element 1070 with negative refractive power has an object-side surface 1071 being concave in a paraxial region thereof and an image-side surface 1072 being concave in a paraxial region thereof. The seventh lens element 1070 is made of a plastic material, and has the object-side surface 1071 and the image-side surface 1072 being both aspheric. Furthermore, the image-side surface 1072 of the seventh lens element 1070 includes at least one convex shape in an off-axial region thereof.

The IR-cut filter 1080 is made of a glass material and located between the seventh lens element 1070 and the image surface 1090, and will not affect the focal length of the image picking-up system.

The detailed optical data of the 10th embodiment are shown in TABLE 19 and the aspheric surface data are shown in TABLE 20 below.

TABLE 19

10th Embodiment f = 5.30 mm, Fno = 1.80, HFOV = 26.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.100 | | | | |
| 2 | Lens 1 | 22.647 | ASP | 0.200 | Plastic | 1.639 | 23.2 | −23.41 |
| 3 | | 8.974 | ASP | 0.100 | | | | |
| 4 | Lens 2 | 2.680 | ASP | 0.657 | Plastic | 1.544 | 55.9 | 53.12 |
| 5 | | 2.699 | ASP | 0.100 | | | | |
| 6 | Lens 3 | 1.784 | ASP | 1.179 | Plastic | 1.544 | 55.9 | 3.37 |

TABLE 19-continued

10th Embodiment f = 5.30 mm, Fno = 1.80, HFOV = 26.0 deg.

| Surface # | | Curvature Radius | Thickness | | Material | Index | Abbe # | Focal Length |
|---|---|---|---|---|---|---|---|---|
| 7 | | 51.756 | ASP | 0.050 | | | | |
| 8 | Lens 4 | 6.492 | ASP | 0.489 | Plastic | 1.671 | 19.5 | −9.25 |
| 9 | | 3.076 | ASP | 0.463 | | | | |
| 10 | Lens 5 | 5.078 | ASP | 0.200 | Plastic | 1.511 | 56.8 | −27.03 |
| 11 | | 3.663 | ASP | 0.523 | | | | |
| 12 | Lens 6 | 5.658 | ASP | 0.478 | Plastic | 1.544 | 55.9 | 5.96 |
| 13 | | −7.361 | ASP | 0.689 | | | | |
| 14 | Lens 7 | −8.241 | ASP | 0.362 | Plastic | 1.534 | 55.9 | −3.03 |
| 15 | | 2.040 | ASP | 0.400 | | | | |
| 16 | IR-cut filter | Plano | | 0.210 | Glass | 1.517 | 64.2 | — |
| 17 | | Plano | | 0.200 | | | | |
| 18 | Image | Plano | | — | | | | |

Reference wavelength is 587.6 nm (d-line).

TABLE 20

Aspheric Coefficients

| Surface # | 2 | 3 | 4 | 5 | 6 | 7 | 8 |
|---|---|---|---|---|---|---|---|
| k = | −3.4934E + 01 | −4.2370E + 01 | 4.4561E − 01 | −4.0423E − 01 | −4.0808E + 00 | −8.9603E + 01 | −2.7271E + 01 |
| A4 = | 2.6995E − 03 | 2.7802E − 02 | 5.6240E − 03 | −9.4052E − 02 | 4.7304E − 03 | −1.9380E − 02 | −7.9849E − 02 |
| A6 = | −3.5958E − 03 | −2.6926E − 02 | −1.9583E − 02 | 1.5119E − 02 | −1.9473E − 02 | 1.6003E − 04 | 4.0958E − 02 |
| A8 = | −3.3910E − 03 | 6.1263E − 03 | 2.4286E − 03 | −4.3866E − 04 | 1.0904E − 02 | −4.3929E − 04 | 6.4609E − 03 |
| A10 = | 2.1870E − 03 | −1.2504E − 04 | −5.4050E − 05 | −2.8227E − 04 | −1.8970E − 03 | 1.2433E − 04 | −9.6133E − 03 |
| A12 = | −3.1393E − 04 | | | | 9.6287E − 06 | −3.2848E − 05 | 2.6095E − 03 |
| A14 = | | | | | | | −2.2666E − 04 |

| Surface # | 9 | 10 | 11 | 12 | 13 | 14 | 15 |
|---|---|---|---|---|---|---|---|
| k = | 2.4369E + 00 | −8.9741E + 01 | −1.8622E + 01 | 1.1288E + 01 | −5.3713E + 00 | 6.1029E +00 | −4.6825E + 00 |
| A4 = | −1.2050E − 01 | −1.1615E − 01 | −1.2842E − 01 | 3.5184E − 02 | 7.9924E − 02 | −3.9573E − 01 | −4.5811E − 01 |
| A6 = | 8.4153E − 02 | 5.8903E − 02 | 1.2695E − 01 | −2.2421E − 01 | −2.5759E − 01 | 3.2503E − 01 | 4.2321E − 01 |
| A8 = | −4.1469E − 02 | 8.9014E − 04 | −7.3877E − 02 | 3.2001E − 01 | 3.8084E − 01 | −5.2538E − 02 | −2.1372E − 01 |
| A10 = | 2.2648E − 02 | −2.4087E − 03 | 4.2912E − 02 | −2.5442E − 01 | −3.0837E − 01 | −7.9235E − 02 | 6.1138E − 02 |
| A12 = | −5.0561E − 03 | 1.8878E − 04 | −1.6743E − 02 | 1.0628E − 01 | 1.3449E − 01 | 4.7093E − 02 | −1.0053E − 02 |
| A14 = | | | 2.7750E − 03 | −2.0878E − 02 | −3.0616E − 02 | −9.8452E − 03 | 8.8416E − 04 |
| A16 = | | | | 1.2942E − 03 | 2.8989E − 03 | 7.3132E − 04 | −3.1992E − 05 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from TABLE 19 and TABLE 20 as the following values and satisfying the following conditions:

| 10th Embodiment | | | |
|---|---|---|---|
| f (mm) | 5.30 | f/f3 | 1.575 |
| Fno | 1.80 | f/f4 | −0.573 |
| HFOV (deg.) | 26.0 | f/f5 | −0.196 |
| Nmax | 1.671 | |f4/f5| | 0.342 |
| V3/V4 | 2.87 | f3/f7 | −1.113 |
| CT1/CT6 | 0.42 | |f/f1| + |f/f2| | 0.326 |
| T12/CTmin | 0.50 | fG2/fG1 | −0.117 |
| (T12 + T23 + T34)/CTmin | 1.25 | Y11/Y72 | 0.70 |

| 10th Embodiment | | | |
|---|---|---|---|
| ATmax/CTmin | 3.44 | SD/TD | 1.02 |
| ATmax/CTmax | 0.58 | TL/f | 1.19 |
| CTmax/Yc72 | 1.86 | TL/ImgH | 2.34 |
| ΣAT/ΣCT | 0.54 | TL/EPD | 2.14 |
| R4/R5 | 1.51 | BL/TL | 0.13 |
| (R3 − R5)/(R3 + R5) | 0.20 | Nv30 | 2 |
| (R13 + R14)/(R13 − R14) | 0.60 | tan(HFOV) | 0.49 |
| f/f2 | 0.100 | | |

In addition, numbers of infection points of the object-side surfaces and the image-side surfaces of the first lens element 1010 (Lens 1) through the seventh lens element 1070 (Lens 7) in the 10th embodiment are listed below, wherein each number is calculated for inflection points from an axial vertex to a maximum effective radius position on the corresponding surface.

| 10th Embodiment - Number of Inflection Points | | | | | | | |
|---|---|---|---|---|---|---|---|
| | Lens 1 | Lens 2 | Lens 3 | Lens 4 | Lens 5 | Lens 6 | Lens 7 |
| Object-side surface | 2 | 2 | 1 | 2 | 2 | 1 | 1 |
| Image-side surface | 2 | 1 | 1 | 0 | 2 | 1 | 1 |

11th Embodiment

Figure 21:
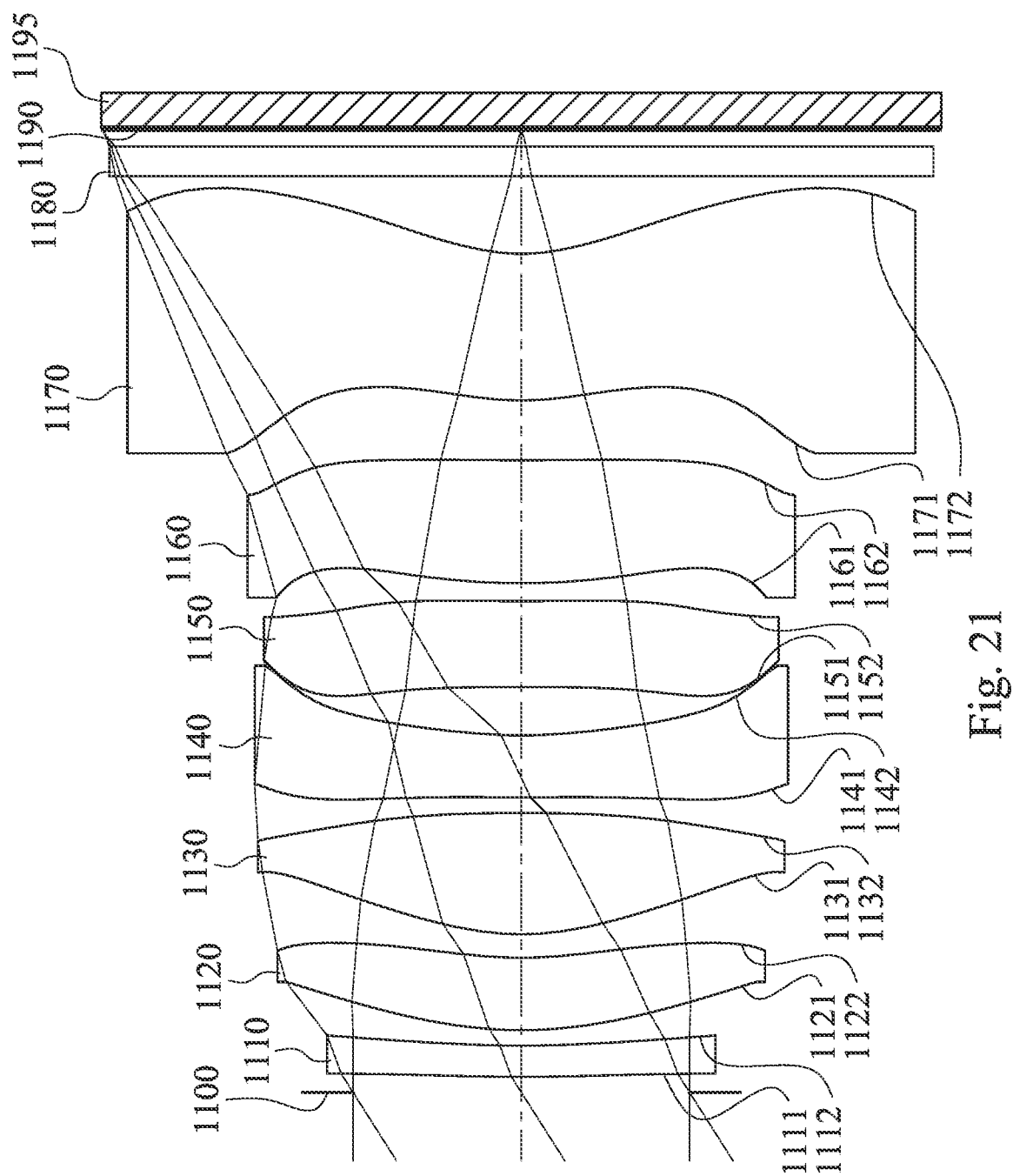
FIG. 21 is a schematic view of an image capturing apparatus according to the 11th embodiment of the present disclosure.
Figure 22:
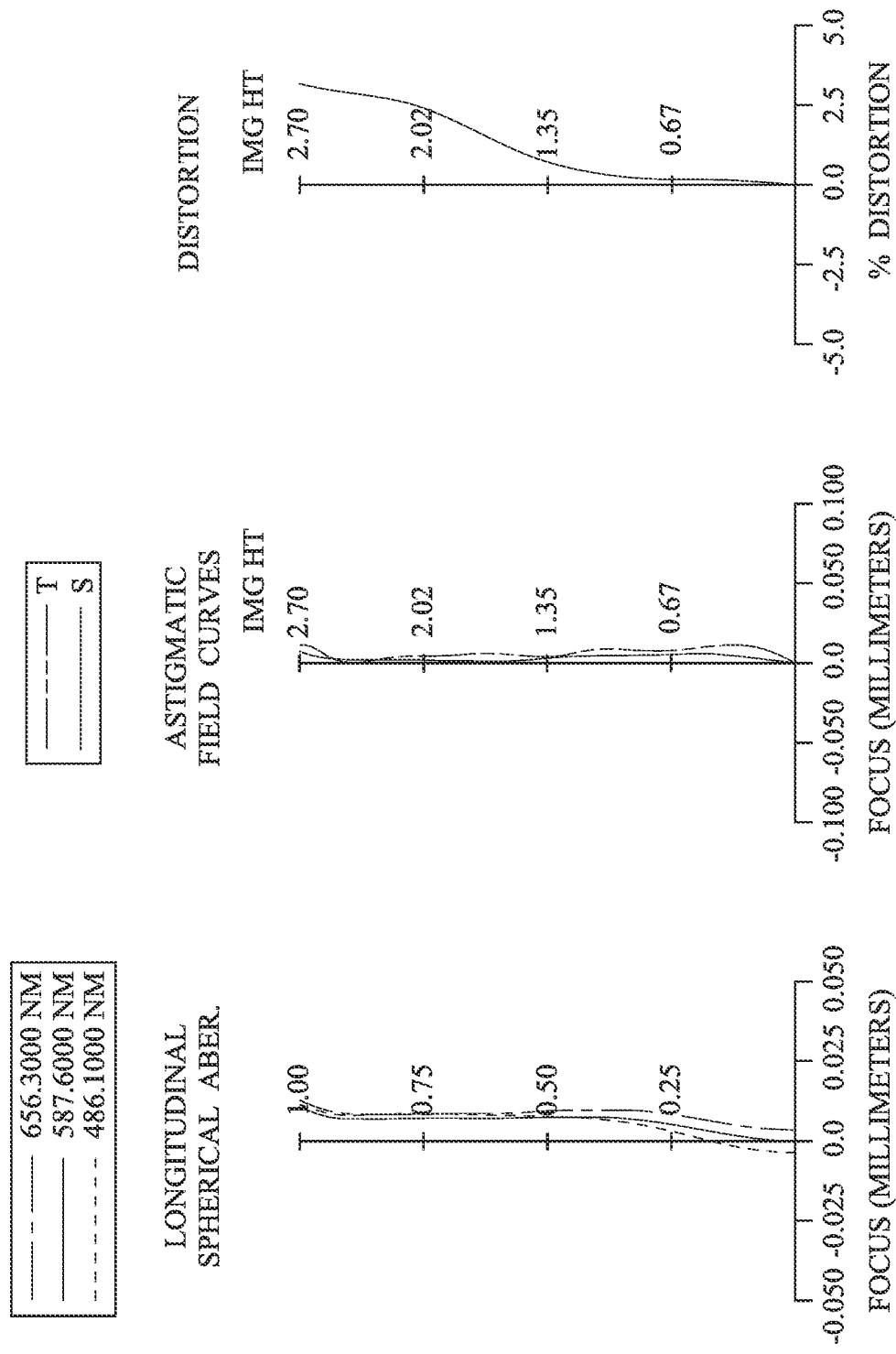
FIG. 22 shows spherical aberration curves, astigmatic field curves and a distortion curve of the image capturing apparatus according to the 11th embodiment.

FIG. 21 is a schematic view of an image capturing apparatus according to the 11th embodiment of the present disclosure. FIG. 22 shows, in order from left to right, spherical aberration curves, astigmatic field curves and a distortion curve of the image capturing apparatus according to FIG. 21. In FIG. 21, the image capturing apparatus includes the image picking-up system (its reference numeral is omitted) and an image sensor 1195. The image picking-up system includes, in order from an object side to an image side, an aperture stop 1100, a first lens element 1110, a second lens element 1120, a third lens element 1130, a fourth lens element 1140, a fifth lens element 1150, a sixth lens element 1160, a seventh lens element 1170, an IR-cut filter 1180 and an image surface 1190. The image sensor 1195 is disposed on the image surface 1190 of the image picking-up system. The image picking-up system includes a first lens group (its reference numeral is omitted), a second lens group (Its reference numeral is omitted) and a third lens group (its reference numeral is omitted), wherein the first lens group Includes the first lens element 1110 and the second lens element 1120, the second lens group Includes the third lens element 1130 and the fourth lens element 1140, and the third lens group Includes the fifth lens element 1150, the sixth lens element 1160 and the seventh lens element 1170. The image picking-up system includes seven lens elements (1110, 1120, 1130, 1140, 1150, 1160 and 1170) without additional one or more lens elements inserted between the first lens element 1110 and the seventh lens element 1170.

The first lens element 1110 with negative refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with positive refractive power has an object-side surface 1121 being convex in a paraxial region thereof and an image-side surface 1122 being concave in a paraxial region thereof. The second lens element 1120 is made of a plastic material, and has the object-side surface 1121 and the image-side surface 1122 being both aspheric.

The third lens element 1130 with positive refractive power has an object-side surface 1131 being convex in a paraxial region thereof and an image-side surface 1132 being convex in a paraxial region thereof. The third lens element 1130 is made of a plastic material, and has the object-side surface 1131 and the image-side surface 1132 being both aspheric.

The fourth lens element 1140 with negative refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric.

The fifth lens element 1150 with negative refractive power has an object-side surface 1151 being convex in a paraxial region thereof and an image-side surface 1152 being concave in a paraxial region thereof. The fifth lens element 1150 is made of a plastic material, and has the object-side surface 1151 and the image-side surface 1152 being both aspheric.

The sixth lens element 1160 with positive refractive power has an object-side surface 1161 being convex in a paraxial region thereof and an image-side surface 1162 being concave in a paraxial region thereof. The sixth lens element 1160 is made of a plastic material, and has the object-side surface 1161 and the image-side surface 1162 being both aspheric.

The seventh lens element 1170 with negative refractive power has an object-side surface 1171 being convex in a paraxial region thereof and an image-side surface 1172 being concave in a paraxial region thereof. The seventh lens element 1170 is made of a plastic material, and has the object-side surface 1171 and the image-side surface 1172 being both aspheric. Furthermore, the image-side surface 1172 of the seventh lens element 1170 includes at least one convex shape in an off-axial region thereof.

The IR-cut filter 1180 is made of a glass material and located between the seventh lens element 1170 and the image surface 1190, and will not affect the focal length of the image picking-up system.

The detailed optical data of the 11th embodiment are shown in TABLE 21 and the aspheric surface data are shown in TABLE 22 below.

TABLE 21

11th Embodiment f = 4.11 mm, Fno = 1.90, HFOV = 32.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | 0.100 | | | | |
| 2 | Lens 1 | 14.447 | ASP | 0.200 | Plastic | 1.544 | 55.9 | −29.45 |
| 3 | | 7.560 | ASP | 0.100 | | | | |
| 4 | Lens 2 | 2.803 | ASP | 0.465 | Plastic | 1.544 | 55.9 | 82.43 |
| 5 | | 2.815 | ASP | 0.151 | | | | |

TABLE 21-continued

11th Embodiment f = 4.11 mm, Fno = 1.90, HFOV = 32.4 deg.

| Surface # | | Curvature Radius | Thickness | | Material | Index | Abbe # | Focal Length |
|---|---|---|---|---|---|---|---|---|
| 6 | Lens 3 | 1.802 | ASP | 0.779 | Plastic | 1.544 | 55.9 | 3.04 |
| 7 | | −17.091 | ASP | 0.100 | | | | |
| 8 | Lens 4 | 16.573 | ASP | 0.399 | Plastic | 1.671 | 19.5 | −6.19 |
| 9 | | 3.290 | ASP | 0.309 | | | | |
| 10 | Lens 5 | 108.630 | ASP | 0.554 | Plastic | 1.511 | 56.8 | −73.35 |
| 11 | | 27.813 | ASP | 0.115 | | | | |
| 12 | Lens 6 | 4.921 | ASP | 0.789 | Plastic | 1.544 | 55.9 | 14.39 |
| 13 | | 12.500 | ASP | 0.386 | | | | |
| 14 | Lens 7 | 1.881 | ASP | 0.942 | Plastic | 1.534 | 55.9 | −15.43 |
| 15 | | 1.264 | ASP | 0.500 | | | | |
| 16 | IR-cut filter | Plano | | 0.190 | Glass | 1.517 | 64.2 | — |
| 17 | | Plano | | 0.113 | | | | |
| 18 | Image | Plano | | — | | | | |

Reference wavelength is 587.6 nm (d-line).

TABLE 22

Aspheric Coefficients

| Surface # | 2 | 3 | 4 | 5 | 6 | 7 | 8 |
|---|---|---|---|---|---|---|---|
| k = | −3.4934E + 01 | −4.2370E + 01 | 5.0391E − 01 | −5.6778E − 01 | −4.7393E + 00 | −8.9603E + 01 | −2.7274E + 01 |
| A4 = | −1.7315E − 02 | −1.3930E − 02 | −3.5233E − 02 | −1.2944E − 01 | −6.3583E − 03 | −6.2708E − 02 | −1.3162E − 01 |
| A6 = | 8.3421E − 03 | 6.1378E − 03 | 4.6578E − 03 | 4.3413E − 02 | −2.1587E − 02 | 5.2052E − 02 | 1.6803E − 01 |
| A8 = | −1.0964E − 02 | −5.0130E − 03 | −1.7164E − 04 | −4.4728E − 03 | 2.1482E − 02 | −2.8259E − 02 | −1.1363E − 01 |
| A10 = | 7.1429E − 03 | 2.5193E − 03 | −3.5730E − 04 | −1.1992E − 03 | −7.1771E − 03 | 8.9273E − 03 | 4.3334E − 02 |
| A12 = | −1.4666E − 03 | | | | 6.8119E − 04 | −1.1547E − 03 | −7.9226E − 03 |
| A14 = | | | | | | | 5.0566E − 04 |

| Surface # | 9 | 10 | 11 | 12 | 13 | 14 | 15 |
|---|---|---|---|---|---|---|---|
| k = | 2.1832E + 00 | −8.9741E + 01 | −1.8802E + 01 | 7.7633E + 00 | −5.3713E + 00 | −1.1403E + 01 | −4.4196E + 00 |
| A4 = | −1.3285E − 01 | −1.0174E − 01 | −2.5419E − 02 | 2.0118E − 02 | −1.3875E − 01 | −1.2333E − 01 | −5.6476E − 02 |
| A6 = | 1.5819E − 01 | 5.9957E − 02 | −3.8916E − 02 | −3.4621E − 02 | 2.1970E − 01 | 1.8173E − 02 | 1.9856E − 02 |
| A8 = | −1.1795E − 01 | −1.5563E − 02 | −8.2948E − 03 | −2.3950E − 02 | −1.8936E − 01 | 3.0994E − 02 | 4.4143E − 03 |
| A10 = | 4.7332E − 02 | 8.4294E − 03 | 4.1148E − 02 | 2.1707E − 02 | 8.3711E − 02 | −3.1339E − 02 | 5.1467E − 04 |
| A12 = | −7.1941E − 03 | −1.7303E − 03 | −1.9657E − 02 | −5.3037E − 03 | −1.9870E − 02 | 1.1448E − 02 | −3.1678E − 05 |
| A14 = | | | 2.8246E − 03 | −2.0090E − 04 | 2.1432E − 03 | −1.8084E − 03 | 9.5449E − 07 |
| A16 = | | | | 1.0242E − 04 | −3.4647E − 05 | 1.0525E − 04 | −1.0727E − 08 |

In the 11th embodiment, the equation of the aspheric surface profiles of the aforementioned lens elements is the same as the equation of the 1st embodiment. Also, the definitions of these parameters shown in the following table are the same as those stated in the 1 st embodiment with corresponding values for the 11th embodiment, so an explanation in this regard will not be provided again.

Moreover, these parameters can be calculated from TABLE 21 and TABLE 22 as the following values and satisfy the following conditions:

| 11th Embodiment | | | |
|---|---|---|---|
| f (mm) | 4.11 | f/f3 | 1.351 |
| Fno | 1.90 | f/f4 | −0.663 |
| HFOV (deg.) | 32.4 | f/f5 | −0.056 |
| Nmax | 1.671 | |f4/f5| | 0.084 |
| V3/V4 | 2.87 | f3/f7 | −0.197 |
| CT1/CT6 | 0.25 | |f/f1| + |f/f2| | 0.189 |
| T12/CTmin | 0.50 | fG2/fG1 | −0.112 |
| (T12 + T23 + T34)/CTmin | 1.75 | Y11/Y72 | 0.46 |
| ATmax/CTmin | 1.93 | SD/TD | 1.02 |
| ATmax/CTmax | 0.41 | TL/f | 1.48 |
| CTmax/Yc72 | 0.49 | TL/ImgH | 2.26 |
| ΣAT/ΣCT | 0.28 | TL/EPD | 2.82 |
| R4/R5 | 1.56 | BL/TL | 0.13 |
| (R3 − R5)/(R3 + R5) | 0.22 | Nv30 | 1 |
| (R13 + R14)/(R13 − R14) | 5.10 | tan(HFOV) | 0.64 |
| f/f2 | 0.050 | | |

In addition, numbers of Inflection points of the object-side surfaces and the image-side surfaces of the first lens element 1110 (Lens 1) through the seventh lens element 1170 (Lens 7) In the 11th embodiment are listed below, wherein each number is calculated for inflection points from an axial vertex to a maximum effective radius position on the corresponding surface.

11th Embodiment - Number of Inflection Points

| | Lens 1 | Lens 2 | Lens 3 | Lens 4 | Lens 5 | Lens 6 | Lens 7 |
|---|---|---|---|---|---|---|---|
| Object-side surface | 1 | 1 | 1 | 3 | 3 | 1 | 2 |
| Image-side surface | 2 | 1 | 2 | 1 | 2 | 2 | 1 |

12th Embodiment

Figure 23:
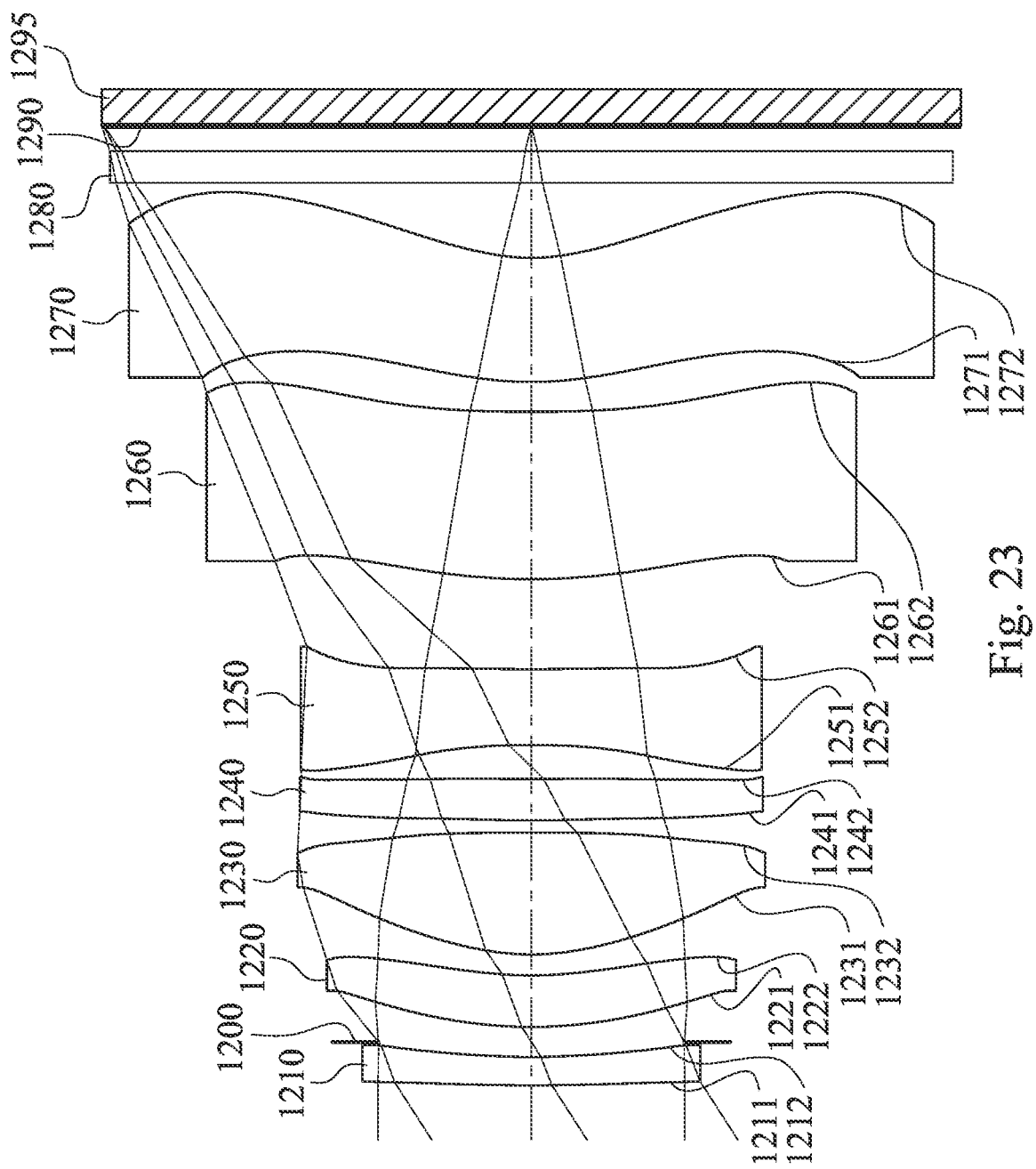
FIG. 23 is a schematic view of an image capturing apparatus according to the 12th embodiment of the present disclosure.
Figure 24:
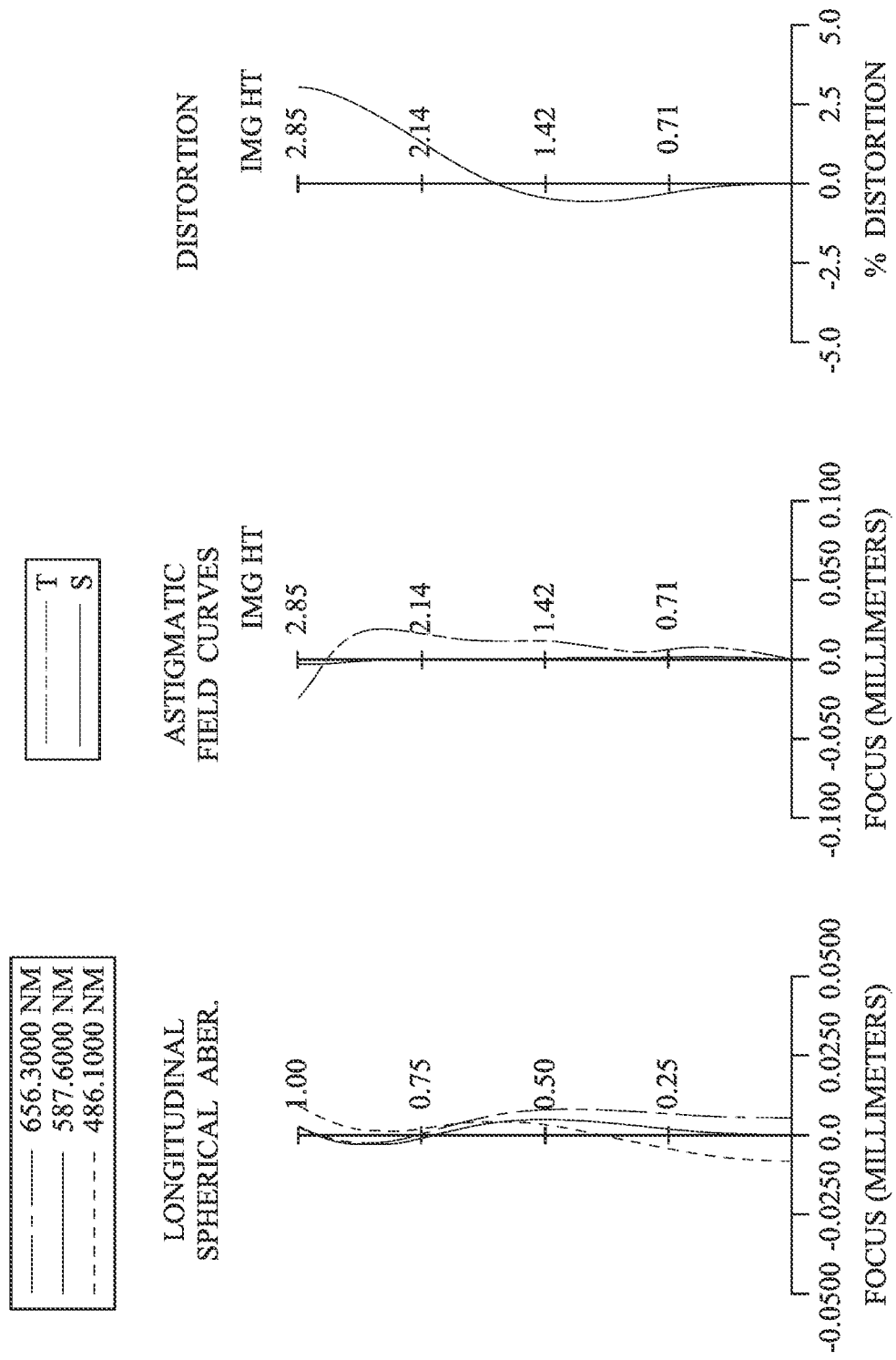
FIG. 24 shows spherical aberration curves, astigmatic field curves and a distortion curve of the image capturing apparatus according to the 12th embodiment.

FIG. 23 is a schematic view of an image capturing apparatus according to the 12th embodiment of the present disclosure. FIG. 24 shows, in order from left to right, spherical aberration curves, astigmatic field curves and a distortion curve of the image capturing apparatus according to FIG. 23. In FIG. 23, the image capturing apparatus Includes the image picking-up system (its reference numeral is omitted) and an image sensor 1295. The image picking-up system includes, in order from an object side to an image side, a first lens element 1210, an aperture stop 1200, a second lens element 1220, a third lens element 1230, a fourth lens element 1240, a fifth lens element 1250, a sixth lens element 1260, a seventh lens element 1270, an IR-cut filter 1280 and an image surface 1290. The image sensor 1295 is disposed on the image surface 1290 of the image picking-up system. The image picking-up system Includes a first lens group (its reference numeral is omitted), a second lens group (its reference numeral is omitted) and a third lens group (Its reference numeral is omitted), wherein the first lens group includes the first lens element 1210 and the second lens element 1220, the second lens group Includes the third lens element 1230 and the fourth lens element 1240, and the third lens group Includes the fifth lens element 1250, the sixth lens element 1260 and the seventh lens element 1270. The image picking-up system includes seven lens elements (1210, 1220, 1230, 1240, 1250, 1260 and 1270) without additional one or more lens elements Inserted between the first lens element 1210 and the seventh lens element 1270.

The first lens element 1210 with negative refractive power has an object-side surface 1211 being convex in a paraxial region thereof and an image-side surface 1212 being concave in a paraxial region thereof. The first lens element 1210 is made of a plastic material, and has the object-side surface 1211 and the image-side surface 1212 being both aspheric.

The second lens element 1220 with negative refractive power has an object-side surface 1221 being convex in a paraxial region thereof and an image-side surface 1222 being concave in a paraxial region thereof. The second lens element 1220 is made of a plastic material, and has the object-side surface 1221 and the image-side surface 1222 being both aspheric.

The third lens element 1230 with positive refractive power has an object-side surface 1231 being convex in a paraxial region thereof and an image-side surface 1232 being concave in a paraxial region thereof. The third lens element 1230 is made of a plastic material, and has the object-side surface 1231 and the image-side surface 1232 being both aspheric.

The fourth lens element 1240 with positive refractive power has an object-side surface 1241 being convex in a paraxial region thereof and an image-side surface 1242 being concave in a paraxial region thereof. The fourth lens element 1240 is made of a plastic material, and has the object-side surface 1241 and the image-side surface 1242 being both aspheric.

The fifth lens element 1250 with negative refractive power has an object-side surface 1251 being concave in a paraxial region thereof and an image-side surface 1252 being concave in a paraxial region thereof. The fifth lens element 1250 is made of a plastic material, and has the object-side surface 1251 and the image-side surface 1252 being both aspheric.

The sixth lens element 1260 with positive refractive power has an object-side surface 1261 being convex in a paraxial region thereof and an image-side surface 1262 being concave in a paraxial region thereof. The sixth lens element 1260 is made of a plastic material, and has the object-side surface 1261 and the image-side surface 1262 being both aspheric.

The seventh lens element 1270 with negative refractive power has an object-side surface 1271 being convex in a paraxial region thereof and an image-side surface 1272 being concave in a paraxial region thereof. The seventh lens element 1270 is made of a plastic material, and has the object-side surface 1271 and the image-side surface 1272 being both aspheric. Furthermore, the image-side surface 1272 of the seventh lens element 1270 includes at least one convex shape in an off-axial region thereof.

The IR-cut filter 1280 is made of a glass material and located between the seventh lens element 1270 and the image surface 1290, and will not affect the focal length of the image picking-up system.

The detailed optical data of the 12th embodiment are shown in TABLE 23 and the aspheric surface data are shown in TABLE 24 below.

TABLE 23

11th Embodiment f = 4.11 mm, Fno = 1.90, HFOV = 32.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 11.342 | ASP | 0.190 | Plastic | 1.535 | 56.3 | −20.10 |
| 2 | | 5.485 | ASP | 0.100 | | | | |
| 3 | Ape. Stop | Plano | | 0.100 | | | | |

TABLE 23-continued

11th Embodiment f = 4.11 mm, Fno = 1.90, HFOV = 32.4 deg.

| Surface # | | Curvature Radius | Thickness | Material | Index | Abbe # | Focal Length |
|---|---|---|---|---|---|---|---|
| 4 | Lens 2 | 3.052 ASP | 0.344 | Plastic | 1.530 | 55.8 | −76.25 |
| 5 | | 2.727 ASP | 0.139 | | | | |
| 6 | Lens 3 | 1.735 ASP | 0.811 | Plastic | 1.544 | 55.9 | 3.23 |
| 7 | | 112.278 ASP | 0.083 | | | | |
| 8 | Lens 4 | 8.158 ASP | 0.276 | Plastic | 1.544 | 55.9 | 29.62 |
| 9 | | 16.325 ASP | 0.227 | | | | |
| 10 | Lens 5 | −7.275 ASP | 0.506 | Plastic | 1.671 | 19.5 | −6.79 |
| 11 | | 12.517 ASP | 0.601 | | | | |
| 12 | Lens 6 | 4.571 ASP | 1.116 | Plastic | 1.544 | 55.9 | 11.33 |
| 13 | | 16.143 ASP | 0.198 | | | | |
| 14 | Lens 7 | 2.315 ASP | 0.829 | Plastic | 1.639 | 26.5 | −9.33 |
| 15 | | 1.435 ASP | 0.500 | | | | |
| 16 | IR-cut filter | Plano | 0.210 | Glass | 1.517 | 64.2 | — |
| 17 | | Plano | 0.170 | | | | |
| 18 | Image | Plano | — | | | | |

Reference wavelength is 587.6 nm (d-line).

TABLE 24

Aspheric Coefficients

| Surface # | 1 | 2 | 4 | 5 | 6 | 7 | 8 |
|---|---|---|---|---|---|---|---|
| k = | −3.4934E + 01 | −4.2370E + 01 | 7.3528E − 01 | −6.9568E − 01 | −4.0053E + 00 | −8.9604E + 01 | −4.1192E + 01 |
| A4 = | −3.5225E − 02 | −2.4863E − 03 | −6.7385E − 03 | −9.7509E − 02 | −4.6751E − 03 | −8.1861E − 02 | −1.0654E − 01 |
| A6 = | 2.5192E − 02 | 1.1580E − 03 | −2.9192E − 02 | 1.3430E − 02 | −1.1234E − 02 | 2.7206E − 02 | 1.0782E − 01 |
| A8 = | −1.0550E − 02 | 9.4716E − 03 | 2.9023E − 02 | 1.6472E − 02 | 1.7760E − 02 | 2.0732E − 02 | −3.1327E − 02 |
| A10 = | 2.6958E − 03 | −3.6718E − 03 | −9.9154E − 03 | −8.6493E − 03 | −5.5933E − 03 | −1.3178E − 02 | −1.3996E − 02 |
| A12 = | −2.6169E − 04 | | | | | 1.6431E − 03 | 1.1117E − 02 |
| A14 = | | | | | | | −1.9637E − 03 |

| Surface # | 9 | 10 | 11 | 12 | 13 | 14 | 15 |
|---|---|---|---|---|---|---|---|
| k = | −2.5791E + 00 | −8.9741E + 01 | −1.8593E + 01 | 4.6105E + 00 | −5.3713E + 00 | −9.9286E + 00 | −4.7064E + 00 |
| A4 = | −1.3116E − 01 | −2.0164E − 01 | −9.3846E − 02 | 1.6488E − 02 | 6.6033E − 02 | −1.2394E − 02 | −3.9236E − 02 |
| A6 = | 1.7944E − 01 | 2.0193E − 01 | 8.6202E − 02 | −6.1973E − 02 | −3.8992E − 02 | −1.8225E − 02 | 1.2540E − 02 |
| A8 = | −1.0737E − 01 | −6.5789E − 02 | −2.3093E − 02 | 3.1272E − 02 | 1.2473E − 02 | 1.6521E − 02 | −3.1722E − 03 |
| A10 = | 2.6796E − 02 | −4.9917E − 04 | 8.1282E − 03 | −1.1827E − 02 | −2.9750E − 03 | −7.4591E − 03 | 5.2704E − 04 |
| A12 = | −1.8280E − 03 | 2.8007E − 03 | −4.6316E − 03 | 2.2093E − 03 | 5.1948E − 04 | 1.8078E − 03 | −5.8765E − 05 |
| A14 = | | | 9.7846E − 04 | −6.0635E − 05 | −5.7128E − 05 | −2.2392E − 04 | 3.7041E − 06 |
| A16 = | | | | −3.5267E − 05 | 2.5156E − 06 | 1.0955E − 05 | −9.4344E − 08 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from TABLE 23 and TABLE 24 as the following values and satisfy the following conditions:

| 12th Embodiment | | | |
|---|---|---|---|
| f (mm) | 4.29 | f/f3 | 1.327 |
| Fno | 2.10 | f/f4 | 0.145 |
| HFOV (deg.) | 32.8 | f/f5 | −0.631 |
| Nmax | 1.671 | |f4/f5| | 4.362 |
| V3/V4 | 1.00 | f3/f7 | −0.346 |
| CT1/CT6 | 0.17 | |f/f1| + |f/f2| | 0.270 |
| T12/CTmin | 1.05 | fG2/fG1 | −0.192 |
| (T12 + T23 + T34)/CTmin | 2.22 | Y11/Y72 | 0.42 |

-continued

| 12th Embodiment | | | |
|---|---|---|---|
| ATmax/CTmin | 3.16 | SD/TD | 0.95 |
| ATmax/CTmax | 0.54 | TL/f | 1.49 |
| CTmax/Yc72 | 0.55 | TL/ImgH | 2.25 |
| ΣAT/ΣCT | 0.36 | TL/EPD | 3.13 |
| R4/R5 | 1.57 | BL/TL | 0.14 |
| (R3 − R5)/(R3 + R5) | 0.28 | Nv30 | 2 |
| (R13 + R14)/(R13 − R14) | 4.26 | tan(HFOV) | 0.64 |
| f/f2 | −0.056 | | |

In addition, numbers of Inflection points of the object-side surfaces and the image-side surfaces of the first lens element 1210 (Lens 1) through the seventh lens element 1270 (Lens 7) In the 12th embodiment are listed below, wherein each number is calculated for inflection points from an axial vertex to a maximum effective radius position on the corresponding surface.

12th Embodiment - Number of Inflection Points

|  | Lens 1 | Lens 2 | Lens 3 | Lens 4 | Lens 5 | Lens 6 | Lens 7 |
|---|---|---|---|---|---|---|---|
| Object-side surface | 2 | 1 | 1 | 3 | 1 | 1 | 1 |
| Image-side surface | 0 | 1 | 3 | 4 | 2 | 1 | 1 |

13th Embodiment

Figure 28:
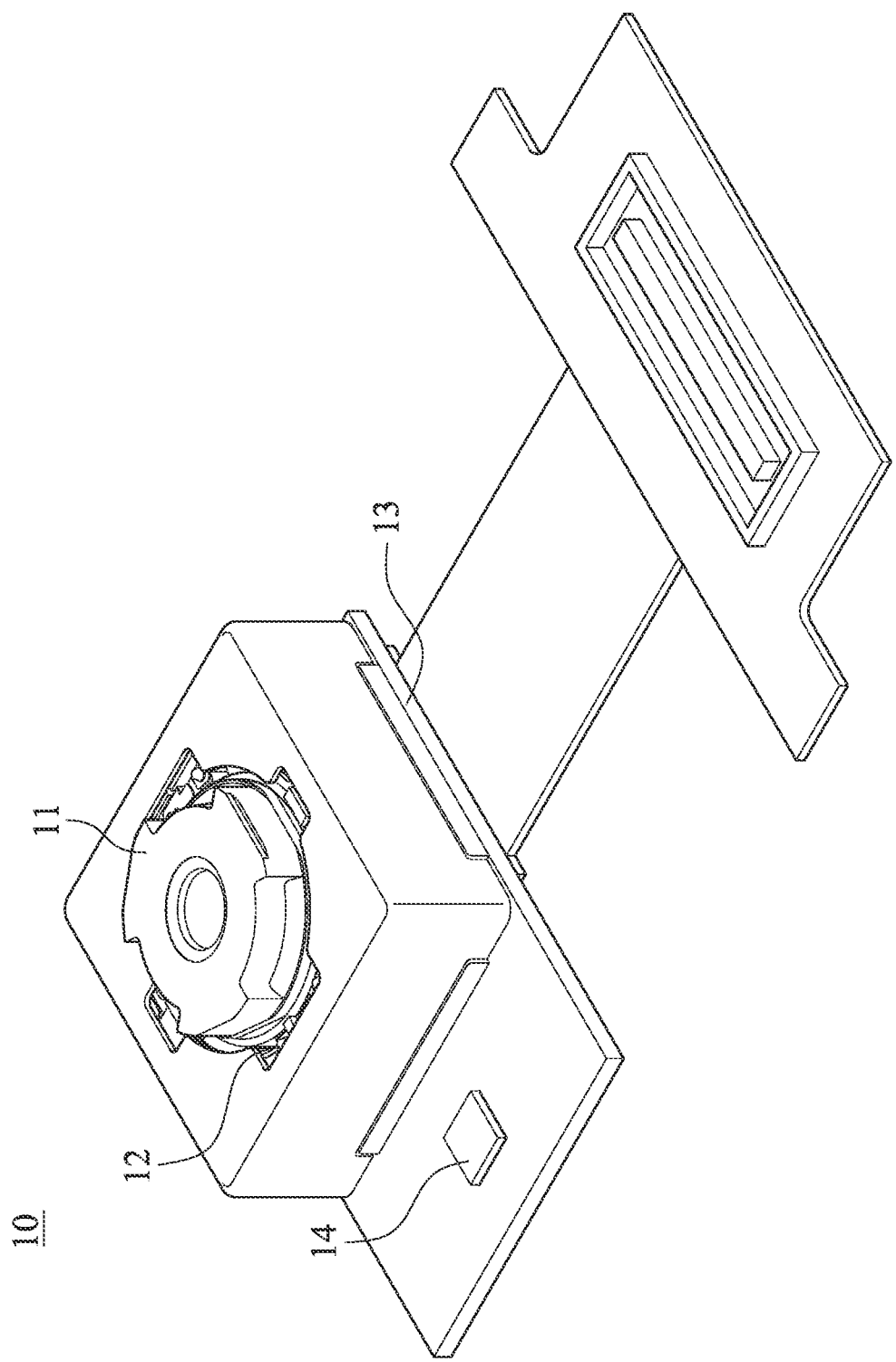
FIG. 28 is a three dimensional schematic view of an image capturing apparatus according to the 13th embodiment of the present disclosure.

FIG. 28 is a three dimensional schematic view of an image capturing apparatus 10 according to the 13th embodiment of the present disclosure. In FIG. 28, the image capturing apparatus 10 of the 13th embodiment is a camera module, the image capturing apparatus 10 includes an imaging lens assembly 11, a driving unit 12 and an image sensor 13, wherein the imaging lens assembly 11 includes the image picking-up system of the 1st embodiment and a lens barrel (not shown in drawings) for carrying the image picking-up system. The image capturing apparatus 10 can focus light from an imaged object via the Imaging lens assembly 11, perform image focusing by the driving unit 12, and generate an image on the image sensor 13, and the imaging information can be output.

The driving apparatus 12 can be an auto-focus module, which can be driven by driving systems, such as voice coil motors (VCM), micro electro-mechanical systems (MEMS), piezoelectric systems, and shape memory alloys etc. The image picking-up. system can obtain a favorable imaging position by the driving apparatus 12 so as to capture clear Images when the imaged object is disposed at different object distances.

The image capturing apparatus 10 can Include the image sensor 13 located on the image surface of the image picking-up system, such as CMOS and CCD, which has superior photosensitivity and low noise, thus it is favorable for providing realistic images with high definition image quality thereof.

Moreover, the image capturing apparatus 10 can further include an image stabilization module 14, which can be a kinetic energy sensor, such as an accelerometer, a gyroscope, and a Hall effect sensor. In the 13th embodiment, the image stabilization module 14 is a gyroscope, but not limited thereto. The variation of different axial directions of the image picking-up system can be adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

14th Embodiment

Figure 29A:
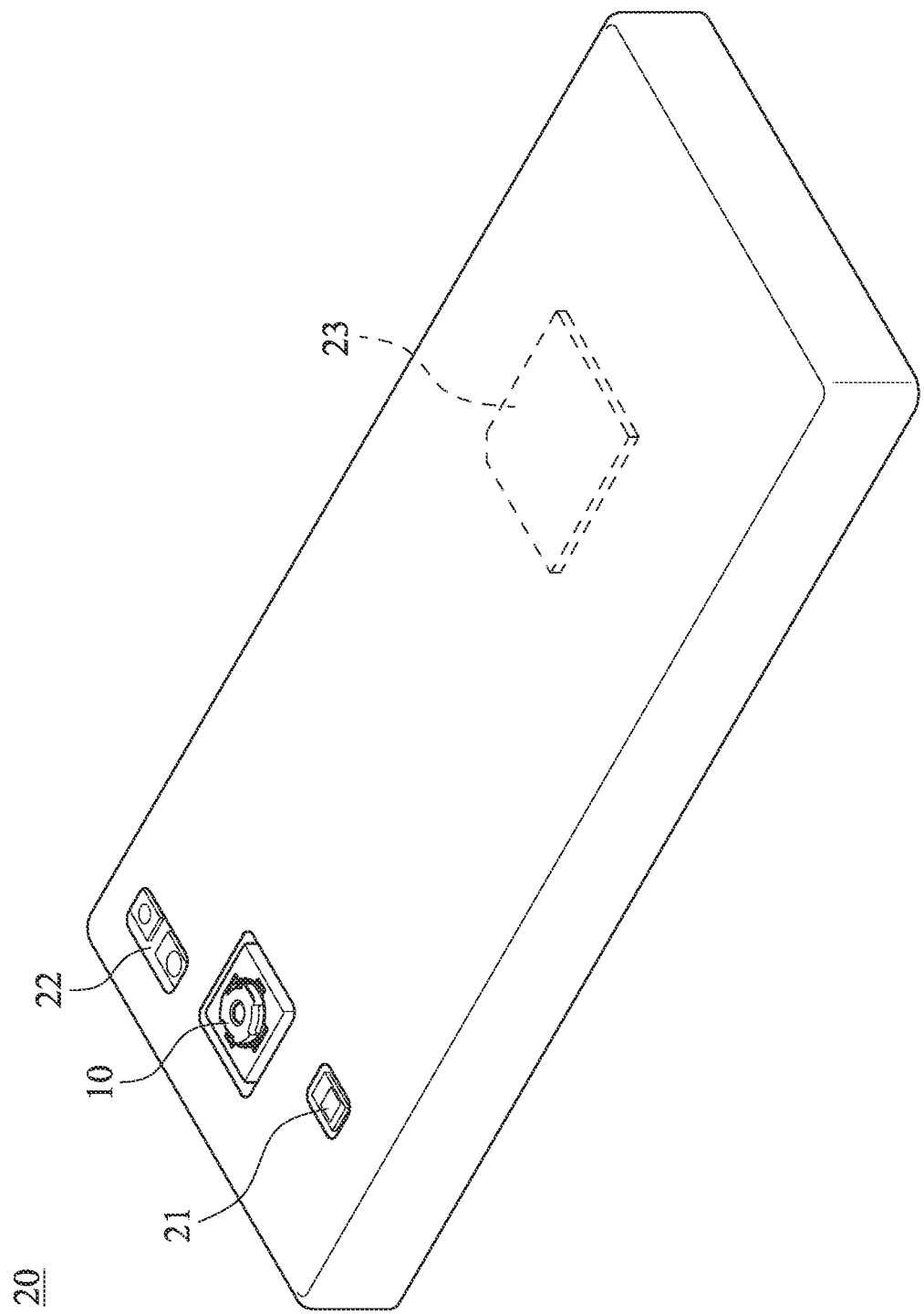
FIG. 29A is a schematic view of one side of an electronic device according to the 14th embodiment of the present disclosure.
Figure 29B:
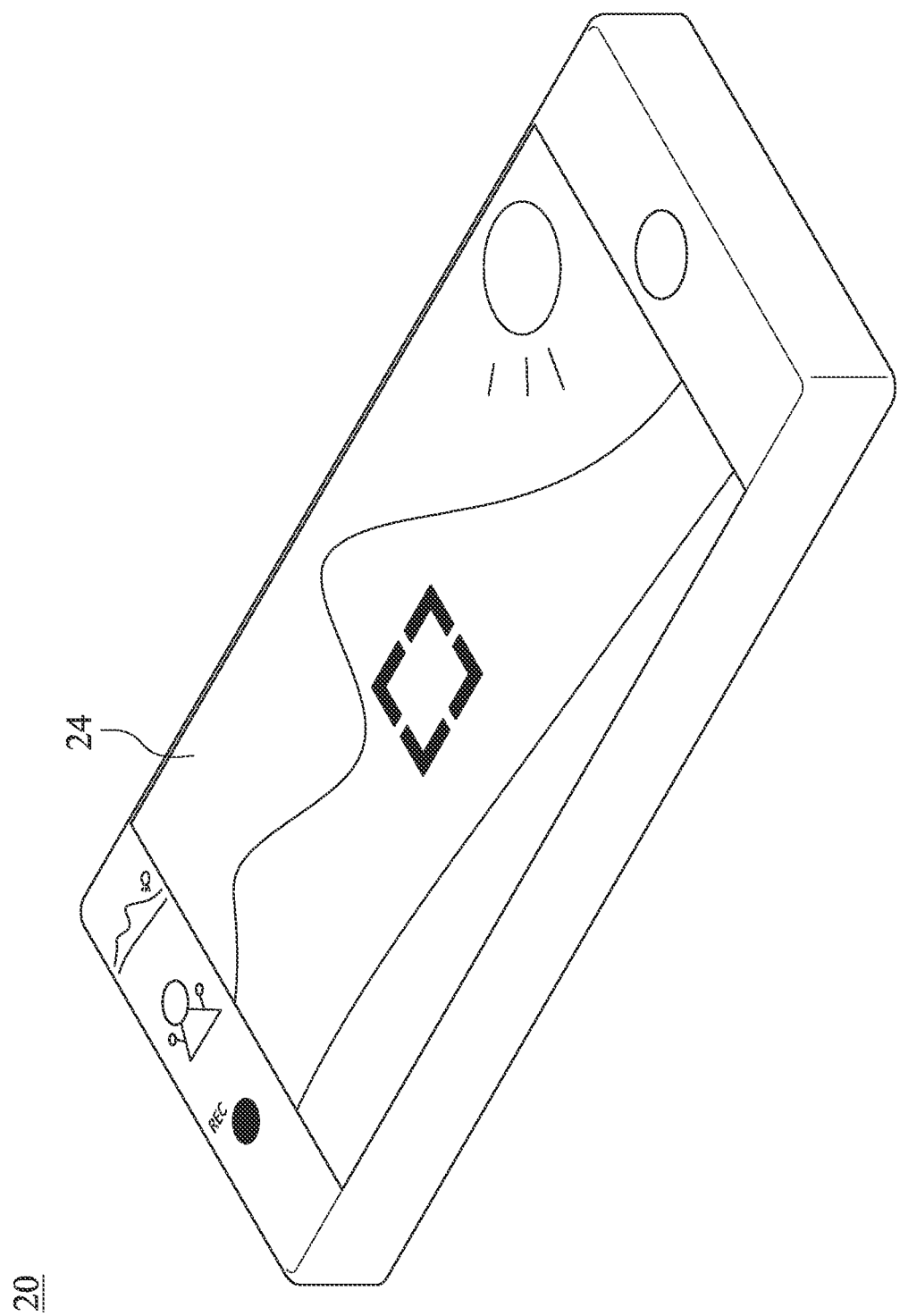
FIG. 29B is a schematic view of another side of the electronic device of FIG. 29A.
Figure 29C:
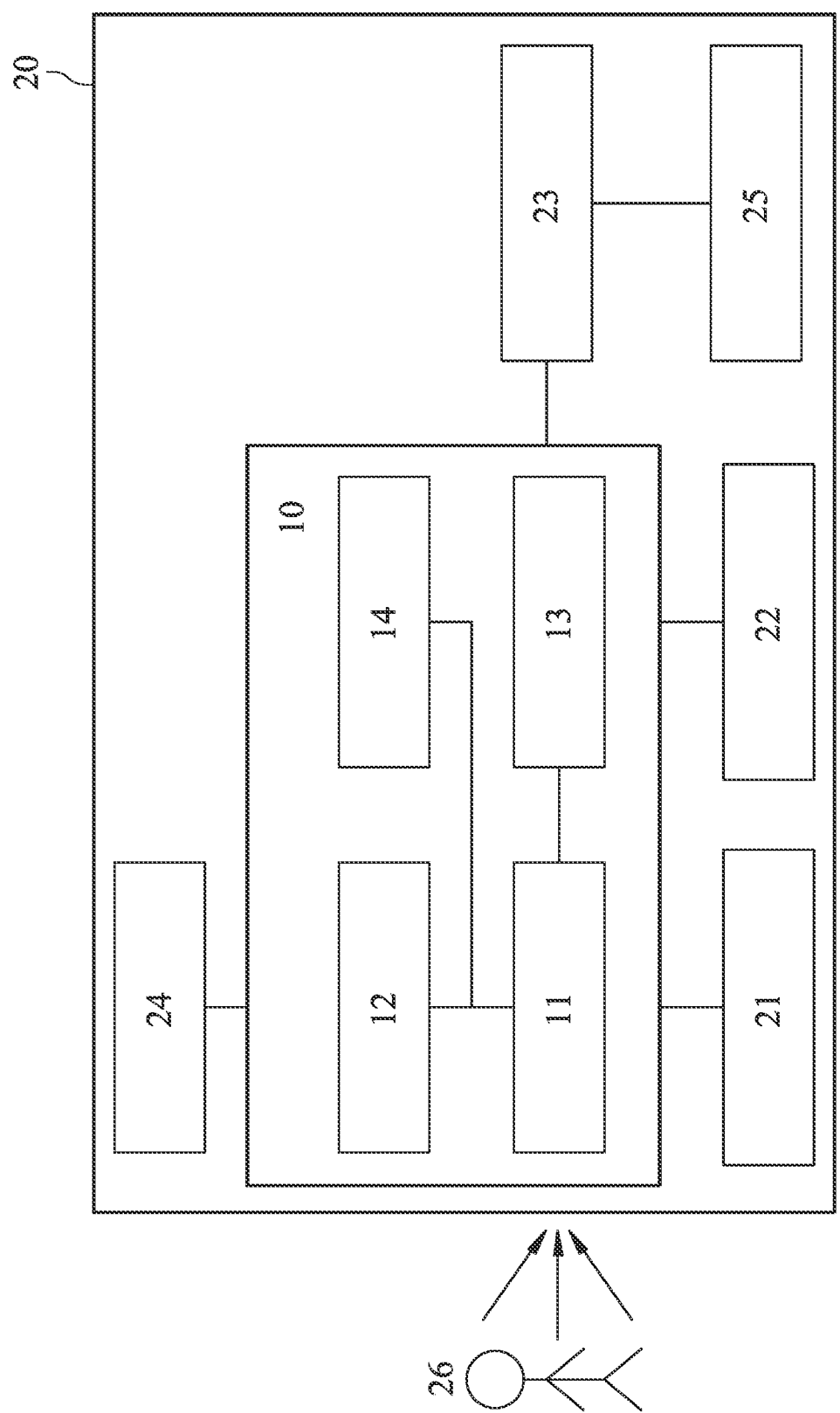
FIG. 29C is a system schematic view of the electronic device of FIG. 29A.

FIG. 29A is a schematic view of one side of an electronic device 20 according to the 14th embodiment of the present disclosure, FIG. 29B is a schematic view of another side of the electronic device 20 of FIG. 29A, and FIG. 29C is a system schematic view of the electronic device 20 of FIG. 29A. In FIG. 29A, FIG. 29B and FIG. 29C, the electronic device 20 according to the 14th embodiment is a smartphone, the electronic device 20 includes an image capturing apparatus 10, a flash module 21, a focusing assisting module 22, an image signal processor 23, a user Interface 24 and an image software processor 25. When the user captures images via the user interface 24, the electronic device 20 focuses and generates an image via the image capturing apparatus 10 while compensating for low illumination via the flash module 21. Then, the electronic device 20 quickly focuses on an imaged object 26 according to its object distance information provided by the focusing assisting module 22, and optimizes the image via the image signal processor 23 and the image software processor 25. Thus, the image quality can be further enhanced. The focusing assisting module 22 can adopt infrared or laser for obtaining quick focusing, and the user interface 24 can utilize a touch screen or a physical button for capturing and processing the image with various functions of the image processing software.

The image capturing apparatus 10 of the 14th embodiment is the same as the aforementioned image capturing apparatus 10 of the 13th embodiment, and will not be stated herein again.

15th Embodiment

Figure 30:
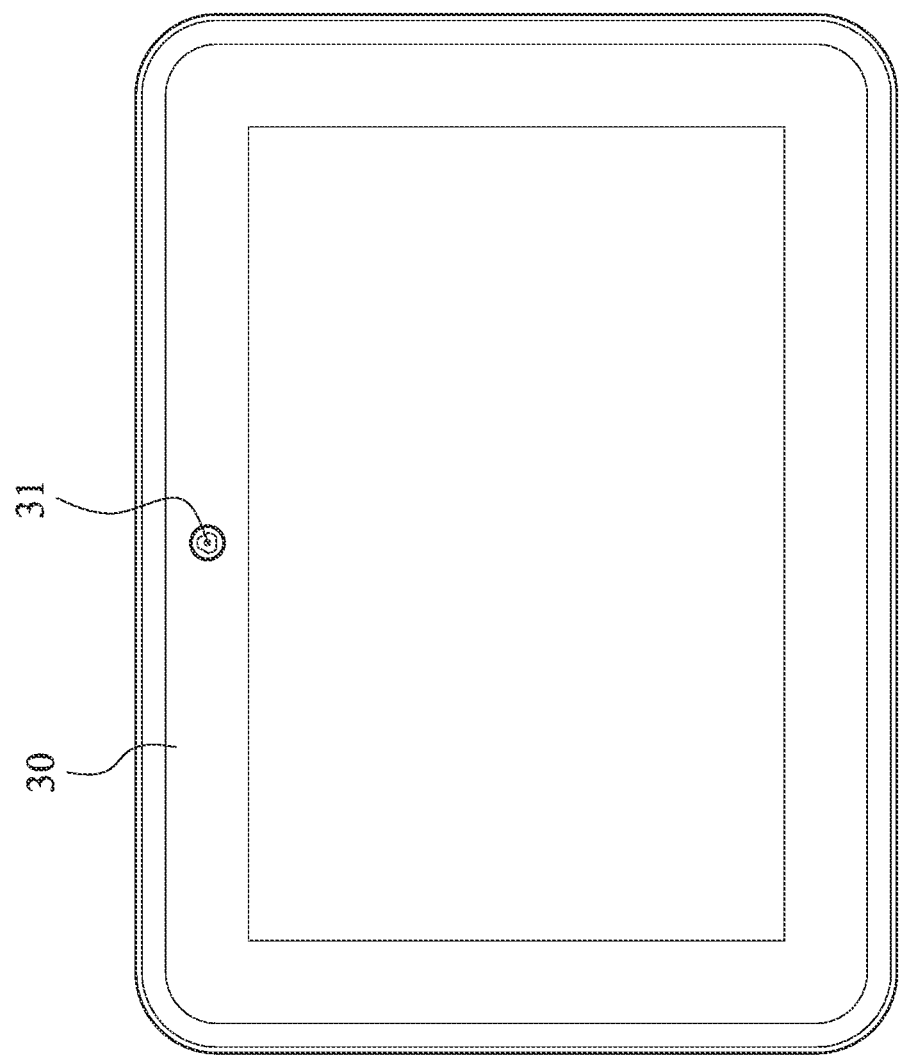
FIG. 30 is a schematic view of an electronic device according to the 15th embodiment of the present disclosure.

FIG. 30 is a schematic view of an electronic device 30 according to the 15th embodiment of the present disclosure. The electronic device 30 of the 15th embodiment is a tablet personal computer, wherein the electronic device 30 includes an image capturing apparatus 31. The image capturing apparatus 31 can be the same as the aforementioned image capturing apparatuses of the 1st to the 13th embodiments, and will not be stated herein again.

16th Embodiment

Figure 31:
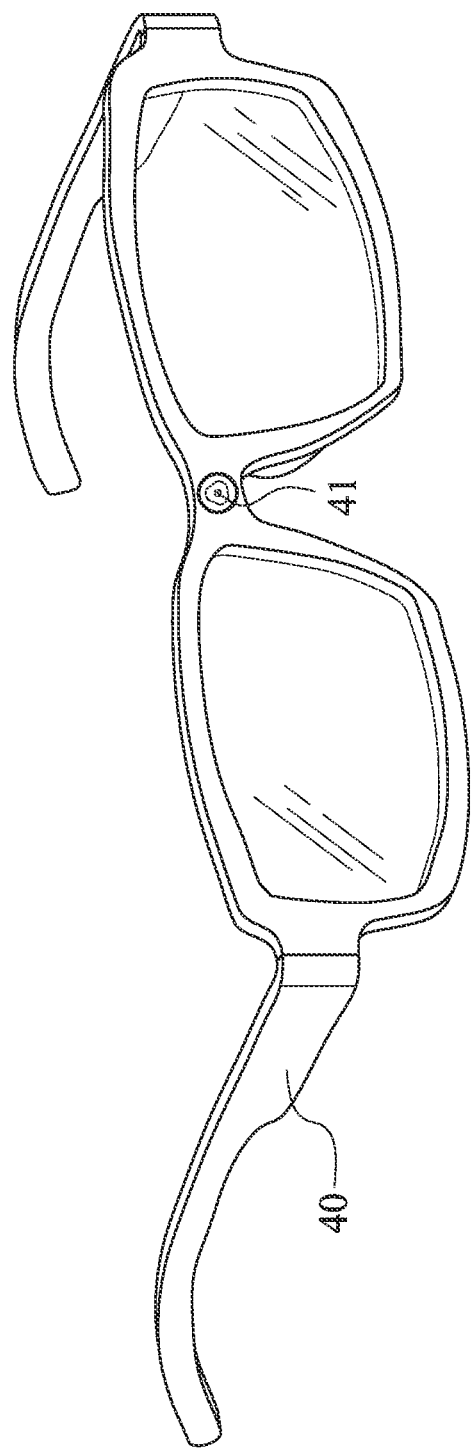
FIG. 31 is a schematic view of an electronic device according to the 16th embodiment of the present disclosure.

FIG. 31 is a schematic view of an electronic device 40 according to the 16th embodiment of the present disclosure. The electronic device 40 of the 16th embodiment is a wearable device, wherein the electronic device 40 includes an image capturing apparatus 41. The image capturing apparatus 41 can be the same as the aforementioned image capturing apparatuses of the 1st to the 13th embodiments, and will not be stated herein again.

The foregoing description, for purpose of explanation, has been described with reference to specific embodiments. It is to be noted that Tables 1-24 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An image picking-up system comprising seven lens elements, the seven lens elements being, in order from an object side to an image side:

a first lens element, a second lens element, a third lens element, a fourth lens element, a fifth lens element, a sixth lens element and a seventh lens element;

wherein each of the seven lens elements has an object-side surface facing towards the object side and an image-side surface facing towards the image side;

wherein the first lens element has negative refractive power; the image-side surface of the second lens element is concave in a paraxial region thereof; the third lens element has positive refractive power; the object-side surface of the seventh lens element is convex in a paraxial region thereof, and the image-side surface of the seventh lens element is concave in a paraxial region thereof and comprises at least one convex shape in an off-axis region thereof;

wherein a focal length of the image picking-up system is f, a focal length of the third lens element is f3, a maximum among refractive indices of all lens elements of the image picking-up system is Nmax, an f-number of the image picking-up system is Fno, and the following conditions are satisfied:

$0.70 < f/f3 < 2.50$;

$1.639 \leq Nmax < 1.72$; and $1.20 < Fno < 2.60$.

2. The image picking-up system of claim 1, wherein the seventh lens element has negative refractive power.

3. The image picking-up system of claim 1, wherein the object-side surface of the second lens element is convex in a paraxial region thereof.

4. The image picking-up system of claim 1, wherein a number of the lens elements of the image picking-up system having an Abbe number smaller than 30 is Nv30, and the following condition is satisfied:

$3 \leq Nv30$.

5. The image picking-up system of claim 1, wherein a maximum among axial distances between each of adjacent lens elements of the image picking-up system is ATmax, a minimum among central thicknesses of all lens elements of the image picking-up system is CTmin, and the following condition is satisfied:

$0.40 < ATmax/CTmin \leq 3.16$.

6. The image picking-up system of claim 1, wherein the maximum among the refractive indices of all lens elements of the image picking-up system is Nmax, and the following condition is satisfied:

$1.671 \leq Nmax < 1.72$.

7. The image picking-up system of claim 1, wherein an axial distance between the image-side surface of the seventh lens element and an image surface is BL, an axial distance between the object-side surface of the first lens element and the image surface is TL, an axial distance between the first lens element and the second lens element is T12, a minimum among central thicknesses of all lens elements of the image picking-up system is CTmin, and the following conditions are satisfied:

$0.10 < BL/TL < 0.35$; and $T12/CTmin < 2.50$.

8. The image picking-up system of claim 1, wherein the f-number of the image picking-up system is Fno, and the following condition is satisfied:

$1.20 < Fno \leq 2.20$.

9. The image picking-up system of claim 1, wherein each of the seven lens elements is a non-cemented lens element; a vertical distance between a maximum effective radius position of the object-side surface of the first lens element and an optical axis is Y11, a vertical distance between a maximum effective radius position of the image-side surface of the seventh lens element and the optical axis is Y72, and the following condition is satisfied:

$0.25 < Y11/Y72 < 1.30$.

10. The image picking-up system of claim 1, further comprising:
an aperture stop disposed between the second lens element and the third lens element.

11. The image picking-up system of claim 1, wherein an axial distance between the object-side surface of the first lens element and an image surface is TL, the focal length of the image picking-up system is f, a curvature radius of the object-side surface of the seventh lens element is R13, a curvature radius of the image-side surface of the seventh lens element is R14, and the following conditions are satisfied:

$0.80 < TL/f < 2.50$; and $0 < (R13+R14)/(R13-R14) < 10.0$.

12. An image capturing apparatus, comprising:
the image picking-up system of claim 1; and
an image sensor disposed on an image surface of the image picking-up system.

13. An electronic device, comprising:
the image capturing apparatus of claim 12.

14. An image picking-up system comprising seven lens elements, the seven lens elements being, in order from an object side to an image side:

a first lens element, a second lens element, a third lens element, a fourth lens element, a fifth lens element, a sixth lens element and a seventh lens element;

wherein each of the seven lens elements has an object-side surface facing towards the object side and an image-side surface facing towards the image side;

wherein the third lens element has positive refractive power; the image-side surface of the fifth lens element is concave in a paraxial region thereof; the image-side surface of the seventh lens element is concave in a paraxial region thereof and comprises at least one convex shape in an off-axis region thereof;

wherein a focal length of the image picking-up system is f, a focal length of the third lens element is f3, a maximum among refractive indices of all lens elements of the image picking-up system is Nmax, an f-number of the image picking-up system is Fno, and the following conditions are satisfied:

$0.70 < f/f3 < 2.50$;

$1.660 \leq Nmax < 1.72$; and $1.20 < Fno < 2.60$.

15. The image picking-up system of claim 14, wherein the first lens element has negative refractive power, and at least one of the object-side and the image-side surfaces of the first lens element comprises at least one Inflection point.

16. The image picking-up system of claim 14, wherein the sixth lens element has positive refractive power; an axial distance between the first lens element and the second lens element is T12, a minimum among central thicknesses of all lens elements of the image picking-up system is CTmin, and the following condition is satisfied:

$T12/CTmin \leq 1.05$.

17. The image picking-up system of claim 14, wherein the f-number of the image picking-up system is Fno, and the following condition is satisfied:

$1.20 < Fno \leq 1.90$.

18. The image picking-up system of claim 14, wherein the maximum among the refractive indices of all lens elements of the image picking-up system is Nmax, and the following condition is satisfied:

$1.671 \leq Nmax < 1.72$.

19. The image picking-up system of claim 14, wherein a half of a maximum field of view of the image picking-up system is HFOV, and the following condition is satisfied:

$0.20 < \tan(HFOV) < 1.50$.

20. The image picking-up system of claim 14, wherein the focal length of the image picking-up system is f, a focal length of the second lens element is f2, a focal length of the fourth lens element is f4, and the following conditions are satisfied:

$-0.20 < f/f2 < 0.50$; and $-2.80 < f/f4 < -0.40$.

21. The image picking-up system of claim 14, wherein a sum of axial distances between each of adjacent lens elements of the image picking-up system is ΣAT, a sum of central thicknesses of all lens elements of the image picking-up system is ΣCT, a maximum among the central thicknesses of all lens elements of the image picking-up system is CTmax, a vertical distance between a critical point in the off-axis region on the image-side surface of the seventh lens element and an optical axis is Yc72, and the following conditions are satisfied:

$\Sigma AT/\Sigma CT < 0.75$; and $0.20 < CTmax/Yc72 < 4.0$.

22. The image picking-up system of claim 14, further comprising:

an aperture stop disposed on an object side of the fourth lens element, wherein an axial distance between the object-side surface of the first lens element and an image surface is TL, a maximum image height of the image picking-up system is ImgH, an axial distance between the aperture stop and the image-side surface of the seventh lens element is SD, an axial distance between the object-side surface of the first lens element and the image-side surface of the seventh lens element is TD, and the following conditions are satisfied:

$1.0 < TL/ImgH \leq 2.0$; and $0.50 < SD/TD < 1.20$.

* * * * *